United States Patent
Hashimoto et al.

(10) Patent No.: US 6,526,146 B1
(45) Date of Patent: Feb. 25, 2003

(54) INFORMATION RECORDING SYSTEM

(75) Inventors: Megumu Hashimoto, Kanagawa (JP); Yoshitomo Osawa, Kanagawa (JP); Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/250,983

(22) Filed: Feb. 16, 1999

(30) Foreign Application Priority Data

Feb. 18, 1998 (JP) ............................................ 10-035697
May 6, 1998 (JP) ............................................ 10-123223

(51) Int. Cl.$^7$ ............................. G06F 12/14; G11B 7/20
(52) U.S. Cl. ..................... 380/201; 380/202; 380/203; 713/179; 713/181; 713/200; 713/201; 705/51; 705/52; 705/57; 369/84
(58) Field of Search ................................. 713/152, 160, 713/176, 179, 181, 200, 201; 380/201, 202, 203; 705/51, 52, 54, 56, 57, 58, 59; 360/60; 369/84; 386/94

(56) References Cited

U.S. PATENT DOCUMENTS

| 5,144,658 A | * | 9/1992 | Takahashi | 380/3 |
| 5,315,448 A | * | 5/1994 | Ryan | 360/60 |
| 5,673,357 A | * | 9/1997 | Shima | 386/94 |
| 5,689,559 A | | 11/1997 | Park | 360/60 |
| 5,729,516 A | | 3/1998 | Tozaki et al. | 360/60 |
| 6,301,430 B1 | | 10/2001 | Oguro et al. | 369/275.3 |

FOREIGN PATENT DOCUMENTS

| DE | 38 06 414 A | * | 9/1989 | G11B/23/28 |
| EP | 0 648 050 A2 | * | 4/1995 | H04N/5/91 |
| EP | 0 675 647 A1 | * | 10/1995 | H04N/5/913 |
| EP | 0 789 361 A2 | * | 8/1997 | G11B/27/034 |
| WO | WO 98/02881 | * | 1/1998 | G11B/20/10 |

* cited by examiner

Primary Examiner—Gilberto Barrón
Assistant Examiner—Justin T. Darrow
(74) Attorney, Agent, or Firm—Frommer Lawrence & Haug LLP; William S. Frommer; Darren M. Simon

(57) ABSTRACT

An optical disc recorder/reproducer, a personal computer, a television receiver, an IRD and so forth are connected mutually via a 1394 serial bus. When data transmitted from the personal computer to the optical disc recorder/reproducer via the 1394 serial bus are to be recorded, an isochronous packet is sent to the recorder/reproducer inclusive of the data to indicate whether the personal computer is a device capable of cognizing copy control information. And depending on whether the source of the transmitted data is a copy control information cognizant device or not, the optical disc recorder/reproducer updates the copy control information with reference to a selected table, and then the updated copy control information is recorded on the optical disc. This system can distinguish between a prerecorded disc and a user-recorded disc, hence achieving exact management of copy control information.

14 Claims, 67 Drawing Sheets

FIG. 5

TABLE 1: PRESCRIPTION OF COPY CONTROL INFORMATION IN RECORDING MODE

| Source | Input CCI  EMI (CGMS-A) | Cognizant recording CCID  EMID | Non-cognizant recording CCID  EMID |
|---|---|---|---|
| Cognizant device | free  free<br>free  once<br>once  once<br>free  proh<br>once  proh<br>proh  proh | LIST 1<br>free  free<br>free  proh<br>proh  proh<br>free  proh<br>proh  proh<br>......  ...... | LIST 4<br>free  free<br>free  proh<br>once  proh<br>......  ......<br>......  ......<br>......  ...... |
| Non-cognizant device | free  free<br>free  proh<br>once  proh<br>proh  proh<br>free  once<br>once  once | LIST 2<br>free  free<br>free  free<br>......  ......<br>......  ......<br>free  proh<br>proh  proh | LIST 5<br>free  free<br>......  ......<br>......  ......<br>......  ......<br>free  proh<br>once  proh |
| Analog (CGMS-A) | free<br>once<br>proh | LIST 3<br>free  free<br>proh  proh<br>......  ...... | ......  ......<br>......  ......<br>......  ...... |
| REFERENCE | | CCI  EMI (CCI&EMI) | NON-COGNIZABLE  EMI |

STEP S3 (STEP S4)

STEP S8

STEP S23 (STEP S24)

EMI (IN PACKET HEADER) →→→→→ EMID (IN HEADER)
                        UPDATE
CCI (IN DATA) →→→→→→→→→→→→→→→ CCID (IN DATA)
                UPDATE (NO CHANGE)

FIG. 11

TABLE 1: PRESCRIPTION OF COPY CONTROL INFORMATION IN REPRODUCTION MODE

| On disc | | Cognizant playback to 1394 | | Cognizant playback to Analog | Non-cognizant playback to 1394 | |
|---|---|---|---|---|---|---|
| CCID | EMID | CCI | EMI | CGMS-A | CCI | EMI |
| | | LIST 6 | | LIST 7 | LIST 8 | |
| free | free | free | free | free | free | free |
| free | proh | free | proh | free | free | proh |
| proh | proh | proh | proh | proh | proh | proh |
| free | once | free | once | free | free | once |
| once | once | once | once | once | once | once |
| once | proh | proh | proh | proh | once | proh |
| REFERENCE | | ··· EMID (CCID&EMID) | | CCID | NON-COGNIZABLE | EMID |

FIG. 12

STEP S42

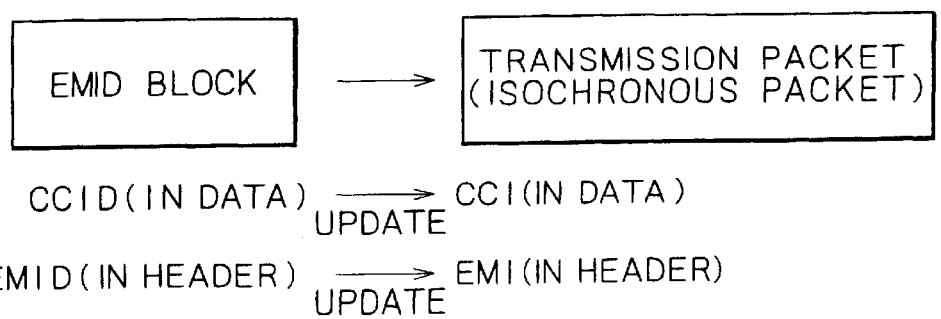

CCID(IN DATA) →(UPDATE)→ CCI(IN DATA)

EMID(IN HEADER) →(UPDATE)→ EMI(IN HEADER)

STEP S45

STEP S61

F I G. 17
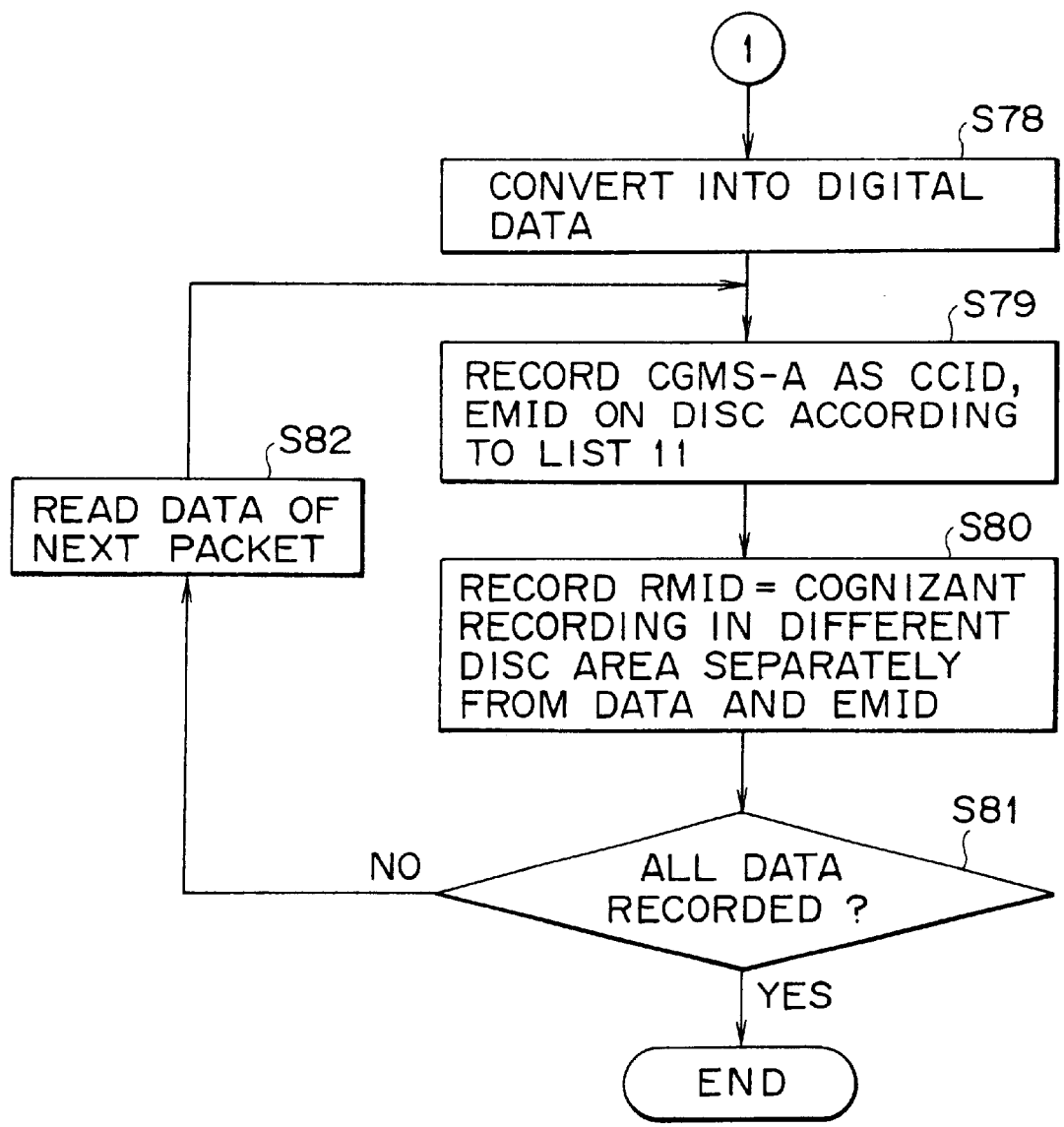

FIG. 18

TABLE 3: PRESCRIPTION OF COPY CONTROL INFORMATION IN RECORDING MODE (USING RMID)

| Source | Input<br>CCI  EMI<br>(CGMS-A) | Cognizant recording<br>CCID  EMID | Non-cognizant recording<br>CCID  EMID |
|---|---|---|---|
| Cognizant device | free  free<br>free  once<br>once  once<br>free  proh<br>once  proh<br>proh  proh | LIST 9<br>free  free<br>free  proh<br>proh  proh<br>free  proh<br>proh  proh<br>···  ··· | LIST 12<br>free  free<br>free  proh<br>once  proh<br>···  ···<br>···  ···<br>···  ··· |
| Non-cognizant device | free  free<br>free  proh<br>once  proh<br>proh  proh<br>free  once<br>once  once | LIST 10<br>free  free<br>free  free<br>···  ···<br>···  ···<br>free  proh<br>proh  proh | LIST 13<br>free  free<br>···  ···<br>···  ···<br>···  ···<br>free  proh<br>once  proh |
| Analog (CGMS-A) | free<br>once<br>proh | LIST 11<br>free  free<br>proh  proh<br>···  ··· | ···  ···<br>···  ···<br>···  ··· |
| REFERENCE |  | CCI  EMI<br>(CCI&EMI) | NON-COGNIZABLE  EMI |

FIG. 22

TABLE 1: PRESCRIPTION OF COPY CONTROL INFORMATION IN REPRODUCTION MODE (USING RMID)

| On disc RMID | | Cognizant playback to 1394 | | Cognizant playback to Analog | Non-cognizant playback to 1394 | |
|---|---|---|---|---|---|---|
| CCID | EMID | CCI | EMI | CGMS-A | CCI | EMI |
| Cognizant recording | | LIST 14 | | LIST 16 | LIST 18 | |
| free | free | free | free | free | free | free |
| free | proh | free | proh | free | free | proh |
| proh | proh | proh | proh | proh | proh | proh |
| free | once | free | once | free | free | once |
| once | once | once | once | once | once | once |
| once | proh | once | proh | once | once | proh |
| Non-cognizant recording | | LIST 15 | | LIST 17 | LIST 19 | |
| free | free | free | free | free | free | free |
| free | proh | free | proh | free | free | proh |
| once | proh | proh | proh | proh | once | proh |
| REFERENCE | | ...... (CCID) | EMID | CCID | NON-COGNIZABLE | EMID |

FIG.23

IN RMID = cognizant recording MODE

| CCID/EMID | CORRECT EMI | EMI ON LIST 14 |
|---|---|---|
| free/proh | free | proh |
| free/once | free | once |
| once/proh | once | proh |

IN RMID = non-cognizant recording MODE

| CCID/EMID | CORRECT EMI | EMI ON LIST 15 |
|---|---|---|
| free/proh | free | proh |
| once/proh | once | proh |

FIG. 27

TABLE 5: PRESCRIPTION OF COPY CONTROL INFORMATION IN RECORDING MODE (WITH CORRESPONDENCE BETWEEN Cognizant AND Non-cognizant RECORDING/REPRODUCTION)

| Source | Input CCI  EMI (CGMS-A) | Cognizant recording CCID  EMID | Non-cognizant recording CCID  EMID |
|---|---|---|---|
| Cognizant device | free  free<br>free  once<br>once  once<br>free  proh<br>once  proh<br>proh  proh | LIST20<br>free  free<br>free  proh<br>proh  proh<br>free  proh<br>proh  proh<br>...  ... | LIST23<br>free  free<br>free  proh<br>once  proh<br>...  ...<br>...  ...<br>...  ... |
| Non-cognizant device | free  free<br>free  proh<br>once  proh<br>proh  proh<br>free  once<br>once  once | LIST21<br>free  free<br>free  free<br>...  ...<br>...  ...<br>free  proh<br>proh  proh | LIST24<br>free  free<br>...  ...<br>...  ...<br>...  ...<br>free  proh<br>once  proh |
| Analog (CGMS-A) | free<br>once<br>proh | LIST22<br>free  free<br>proh  proh<br>...  ... | ...  ...<br>...  ...<br>...  ... |
| REFERENCE | | CCI  EMI (CCI&EMI) | NON-COGNIZABLE  EMI |

F I G. 28
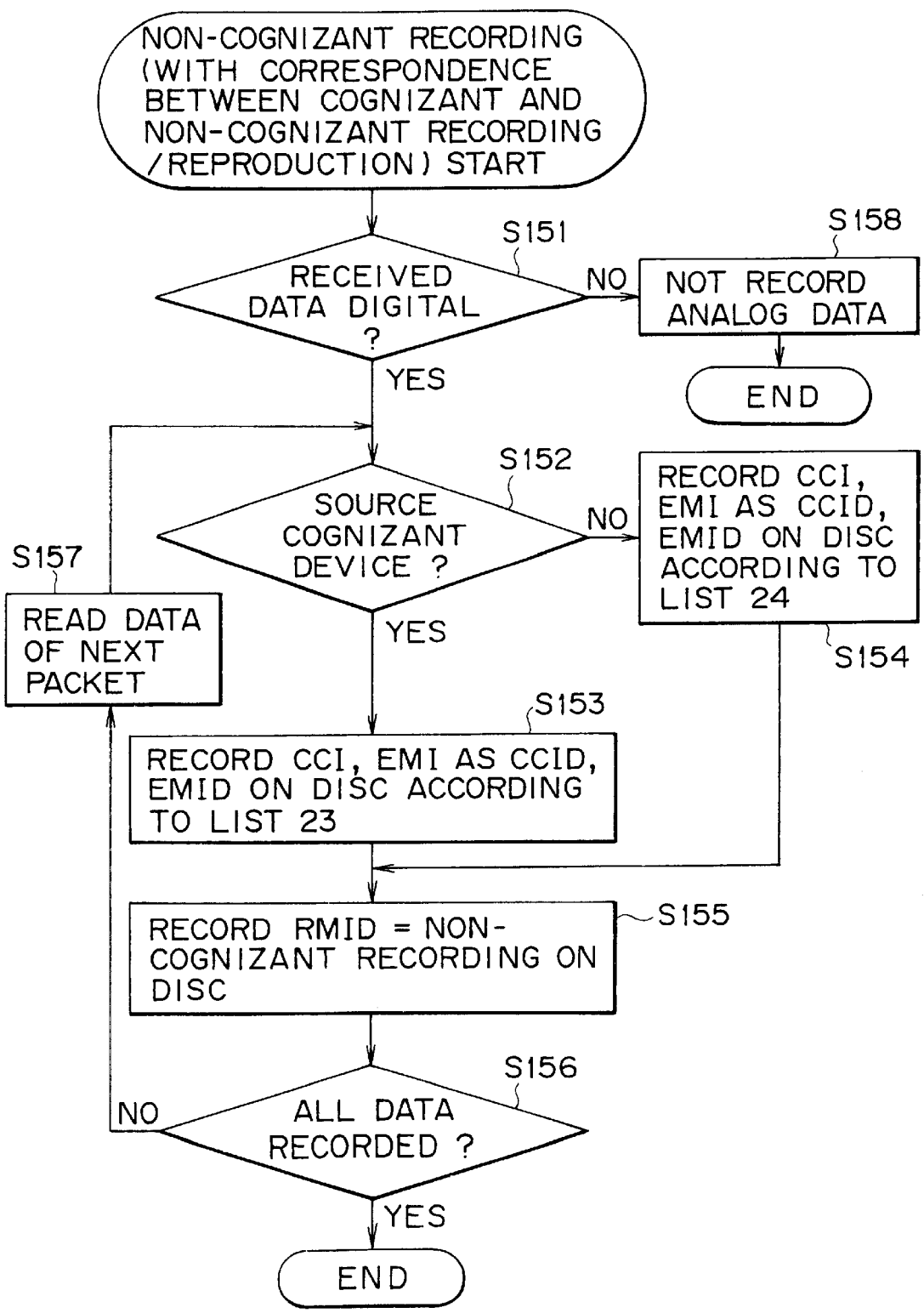

FIG. 31

TABLE 6: PRESCRIPTION OF COPY CONTROL INFORMATION IN RECORDING MODE (WITH CORRESPONDENCE BETWEEN Cognizant AND Non-cognizant RECORDING/REPRODUCTION)

| RMID | On disc | | Cognizant playback to 1394 | | Cognizant playback to Analog CGMS-A | Non-cognizant playback to 1394 | |
|---|---|---|---|---|---|---|---|
| | CCID | EMID | CCI | EMI | | CCI | EMI |
| Cognizant recording | free | free | LIST25 | | LIST26 | LIST27 | |
| | | | free | free | free | free | free |
| | free | proh | free | proh | free | free | proh |
| | proh | proh | proh | proh | proh | | |
| | free | once | free | once | free | | |
| | once | once | once | once | once | once | proh |
| | once | proh | once | proh | once | | |
| Non-cognizant recording | free | free | ... | ... | ... | ... | ... |
| | free | proh | ... | ... | ... | ... | ... |
| | once | proh | ... | ... | ... | ... | ... |
| REFERENCE | | | (CCID) EMID | | CCID | NON-COGNIZABLE EMID | |

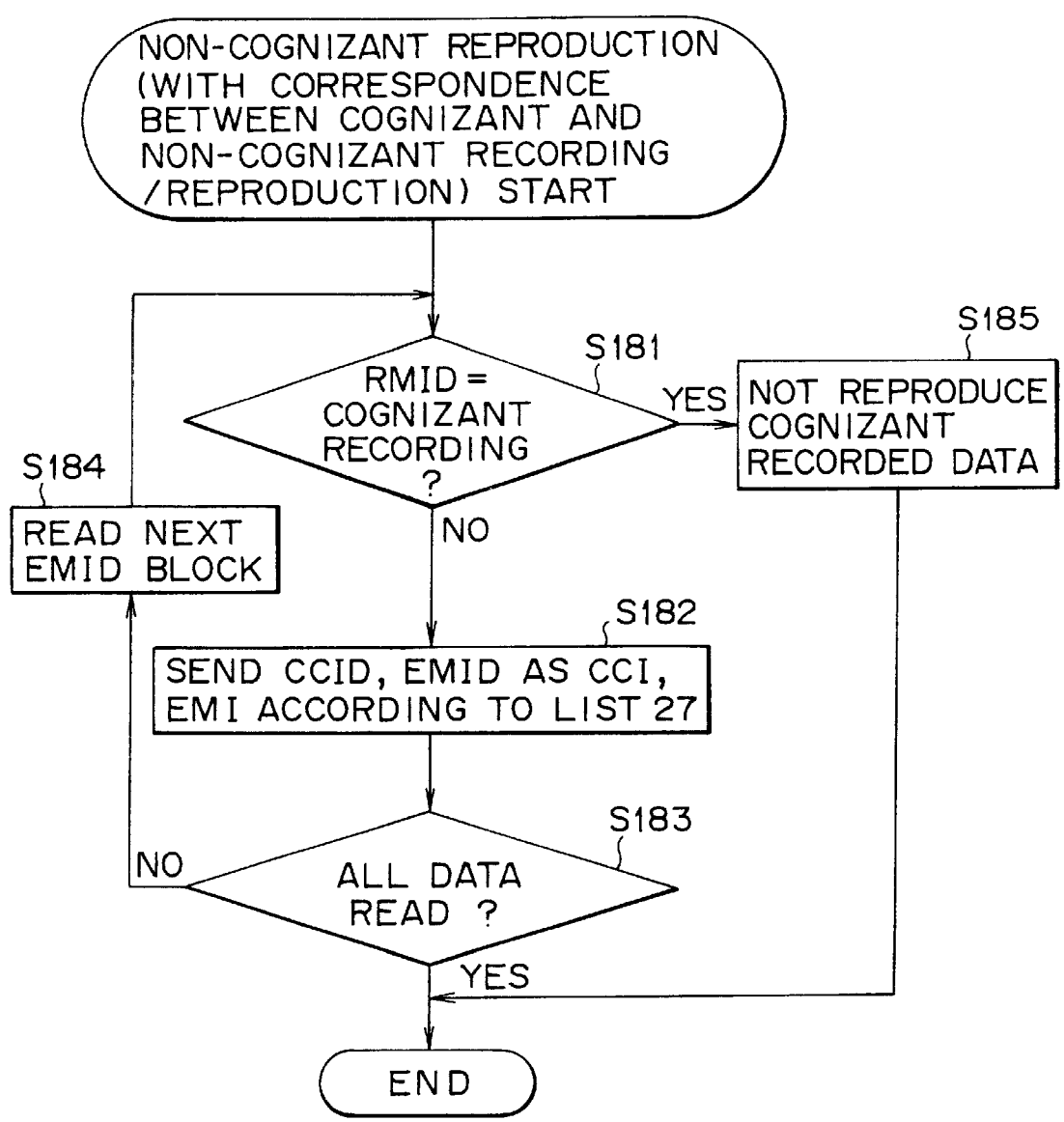
F I G. 32

FIG.36

TABLE 7: PRESCRIPTION OF COPY CONTROL INFORMATION IN RECORDING MODE
(USING pre-rec flag AND RMID)

| Source | Pre-rec flag | Input CCI | Input EMI | Cognizant recording CCID | Cognizant recording EMID | Non-cognizant recording CCID | Non-cognizant recording EMID |
|---|---|---|---|---|---|---|---|
| Cognizant device | 0 | | | LIST28 | | LIST33 | |
| | | free | free | free | free | free | free |
| | | free | once | free | proh | free | proh |
| | | once | once | proh | proh | once | proh |
| | | free | proh | free | proh | ... | ... |
| | | once | proh | proh | proh | ... | ... |
| | | proh | proh | ... | ... | ... | ... |
| | 1 | | | LIST29 | | LIST34 | |
| | | free | free | free | free | free | free |
| | | free | once | free | proh | free | proh |
| | | once | once | proh | proh | once | proh |
| | | free | proh | free | proh | ... | ... |
| | | once | proh | proh | proh | ... | ... |
| | | proh | proh | ... | ... | ... | ... |
| Non-cognizant device | 0 | | | LIST30 | | LIST35 | |
| | | free | free | free | free | free | free |
| | | free | proh | free | free | ... | ... |
| | | once | proh | ... | ... | ... | ... |
| | | proh | proh | ... | ... | ... | ... |
| | 1 | | | LIST31 | | LIST36 | |
| | | free | free | free | free | free | free |
| | | free | once | free | proh | free | proh |
| | | once | once | proh | proh | once | proh |
| | | free | proh | free | free | ... | ... |
| | | once | proh | proh | proh | ... | ... |
| | | proh | proh | ... | ... | ... | ... |
| Analog (CGMS-A) | | free | | LIST32 | | ... | ... |
| | | free | | free | free | ... | ... |
| | | once | | proh | proh | ... | ... |
| | | proh | | ... | ... | ... | ... |
| REFERENCE | | | | CCI | EMI | NON-COGNIZABLE | EMI |

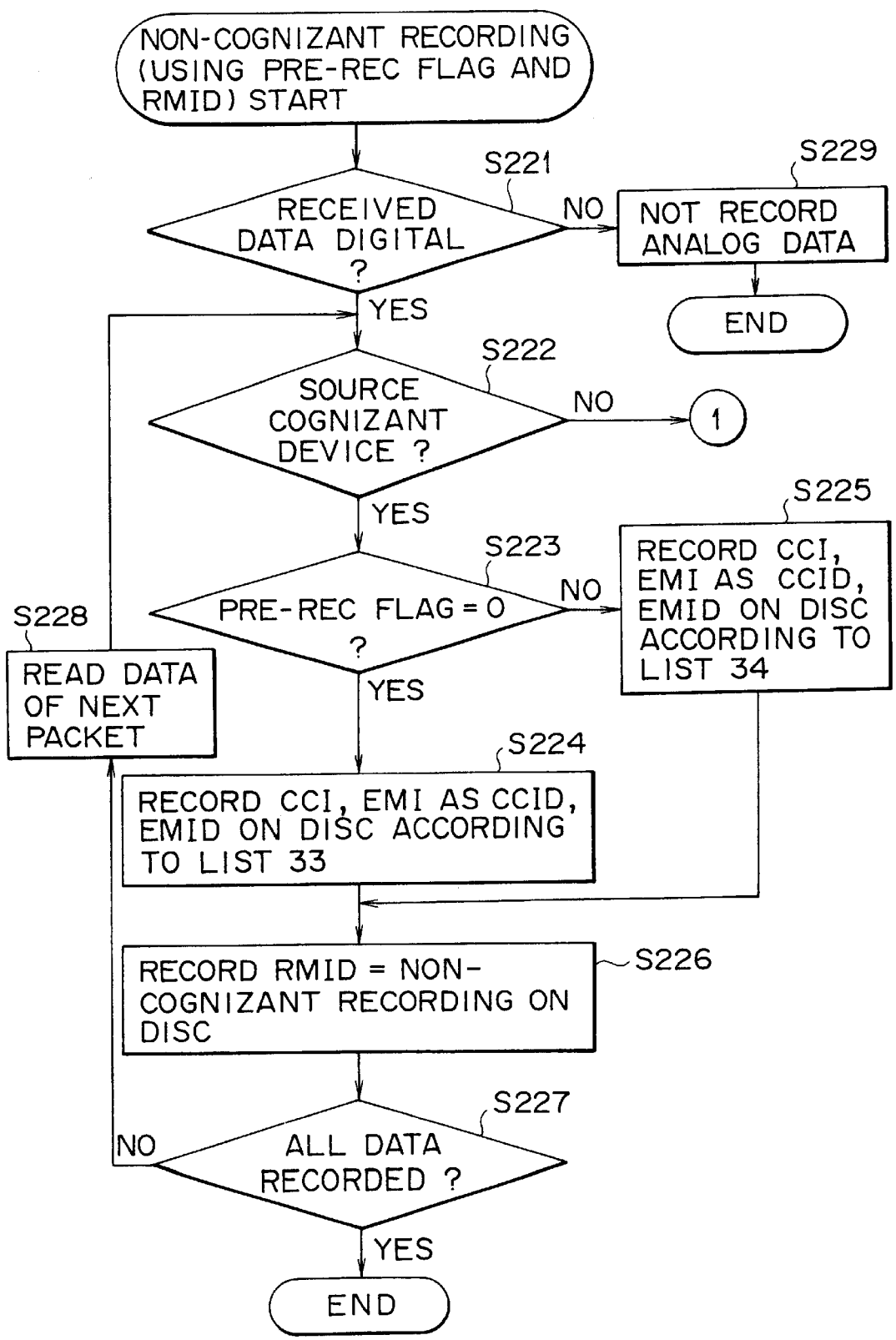

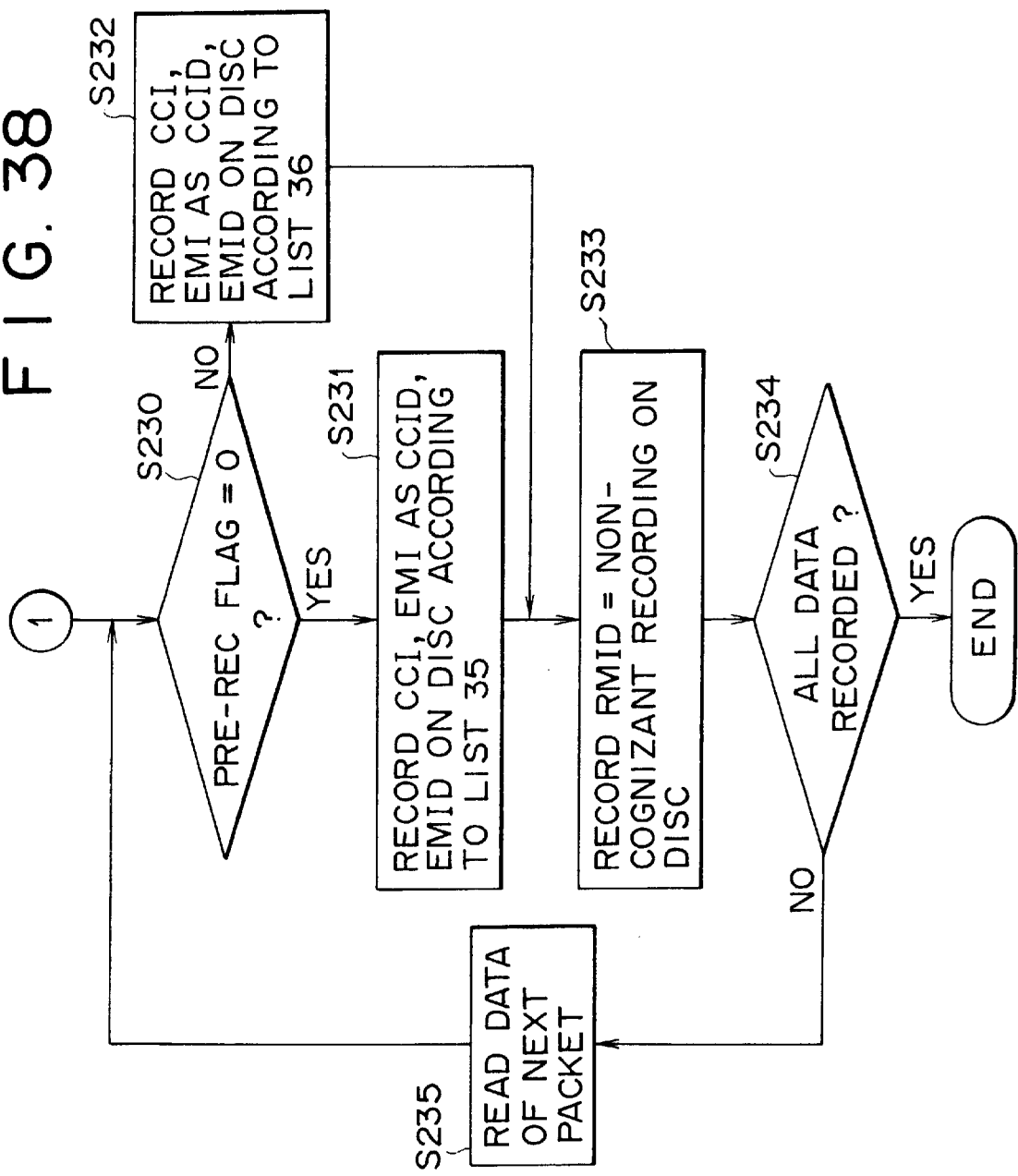
F I G. 38

FIG. 41

TABLE 8: PRESCRIPTION OF COPY CONTROL INFORMATION IN REPRODUCTION MODE (USING pre-rec flag AND RMID)

| RMID/ pre-rec flag | On disc | | Cognizant playback to 1394 | | Cognizant playback to Analog | Non-cognizant playback to 1394 | |
|---|---|---|---|---|---|---|---|
| | CCID | EMID | CCI | EMI | CGMS-A | CCI | EMI |
| Cognizant recording | free free once | free proh proh | LIST37 free free free once once proh | free proh proh proh proh proh | LIST40 free free free once once proh | LIST43 free free proh | free proh proh |
| Non-cognizant recording | free free once | free proh proh | LIST38 free free free once once proh | free proh proh proh proh proh | LIST41 free free free once once proh | LIST44 free free once | free proh proh |
| Pre-recorded disc | free free once once | free once proh proh | LIST39 free free free once once proh | free once proh proh proh proh | LIST42 free free once free once proh | LIST45 free free once once proh | free once once proh proh |
| REFERENCE | ..... (CCD) | | ..... EMID | | CCID | NON-COGNIZABLE | EMID |

S262(S264),(S265)

EMID(IN HEADER) ⟶ EMI(IN HEADER)
      UPDATE
CCID(IN DATA) ⟶ CCI(IN DATA)
    NO CHANGE pre-rec flag=0 (IN HEADER)

IN CASE OF DATA TRANSMITTED
FROM Cognizant DEVICE

| CCI/EMI | CCID/EMID |
|---|---|
| free/once | free/proh |
| once/once | proh/proh |
| once/proh | proh/proh |

IN CASE OF DATA TRANSMITTED
FROM Non-Cognizant DEVICE

| | |
|---|---|
| free/proh | free/free |
| free/once | free/proh |
| once/once | proh/proh |

FIG. 48

TABLE: 9

| Source | Input CCI | Input EMI | Cognizant recording CCID | Cognizant recording EMID | Non-cognizant recording CCID | Non-cognizant recording EMID |
|---|---|---|---|---|---|---|
| Cognizant device | free<br>free<br>once<br>free<br>once<br>proh | free<br>once<br>once<br>proh<br>proh<br>proh | LIST46<br>free<br>free<br>proh<br>free<br>proh<br>...... | <br>free<br>proh<br>proh<br>proh<br>proh<br>...... | LIST49<br>free<br>free<br>once<br>......<br>......<br>...... | <br>free<br>proh<br>proh<br>......<br>......<br>...... |
| Non-cognizant device | free<br>free<br>once<br>proh | free<br>proh<br>proh<br>proh | LIST47<br>free<br>free<br>......<br>...... | <br>free<br>free<br>......<br>...... | LIST50<br>free<br>......<br>......<br>...... | <br>free<br>......<br>......<br>...... |
| Analog (CGMS-A) | free<br>once<br>proh | | LIST48<br>free<br>proh<br>...... | <br>free<br>proh<br>...... | ......<br>......<br>...... | ......<br>......<br>...... |
| REFERENCE | | | CCI (CCI&EMI) | EMI | NON-COGNIZABLE | EMI |

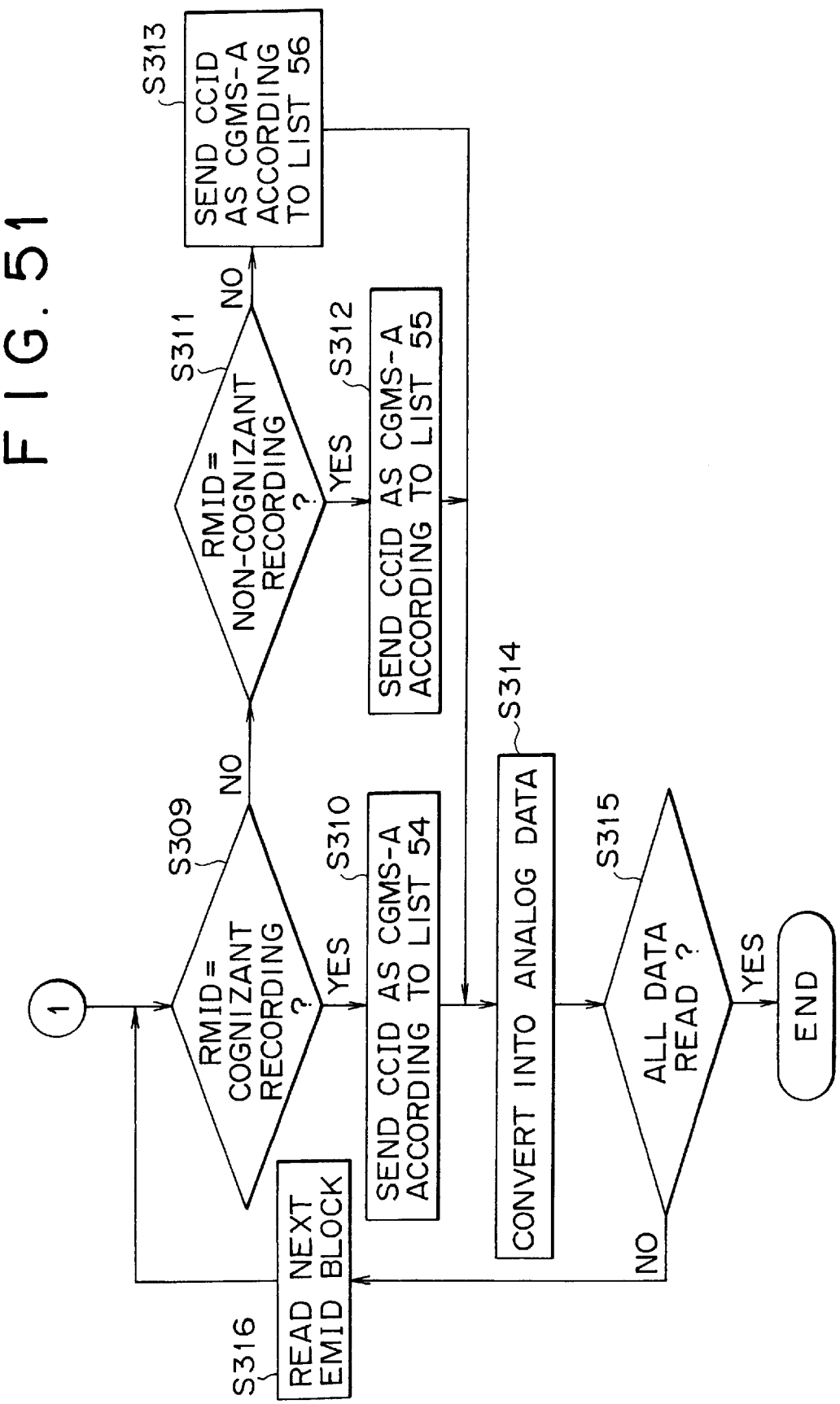

FIG. 52

TABLE10:

| On disc | | | Cognizant playback to 1394 | | Cognizant playback to Analog | Non-cognizant playback to 1394 | |
|---|---|---|---|---|---|---|---|
| RMID | CCID | EMID | CCI | EMI | CGMS-A | CCI | EMI |
| Cognizant recording | free<br>free<br>proh | free<br>proh<br>proh | LIST51<br>free free<br>free proh<br>proh proh | | LIST54<br>free<br>free<br>proh | LIST57<br>free free<br>free proh<br>proh proh | |
| Non-cognizant recording | free<br>free<br>once | free<br>proh<br>proh | LIST52<br>free free<br>free proh<br>proh proh | | LIST55<br>free<br>free<br>proh | LIST58<br>free free<br>free proh<br>once proh | |
| Pre-recorded disc | free<br>free<br>once<br>free<br>once<br>proh | free<br>once<br>once<br>proh<br>proh<br>proh | LIST53<br>free free<br>free once<br>once once<br>free proh<br>once proh<br>proh proh | | LIST56<br>free<br>free<br>once<br>free<br>once<br>proh | ...<br>...<br>...<br>...<br>...<br>... | ...<br>...<br>...<br>...<br>...<br>... |
| REFERENCE | | | ...... EMID (CCD) | | CCID | NON-COGNIZABLE | EMID |

FIG. 56

TABLE 11:

| Source | Input CCI | Input EMI | Cognizant recording CCID | Cognizant recording EMID | Non-cognizant recording CCID | Non-cognizant recording EMID |
|---|---|---|---|---|---|---|
| Cognizant device | | | LIST59 | | LIST62 | |
| | free | free | free | free | free | free |
| | free | once | free | proh | free | proh |
| | once | once | proh | proh | once | proh |
| | free | proh | free | proh | ... | ... |
| | once | proh | proh | proh | ... | ... |
| | proh | proh | ... | ... | ... | ... |
| Non-cognizant device | | | LIST60 | | LIST63 | |
| | free | free | free | free | free | free |
| | free | proh | free | free | ... | ... |
| | once | proh | ... | ... | ... | ... |
| | proh | proh | ... | ... | ... | ... |
| | once | once | proh | proh | once | proh |
| Analog (CGMS-A) | free | | LIST61 free | free | ... | ... |
| | once | | proh | proh | ... | ... |
| | proh | | ... | ... | ... | ... |
| REFERENCE | | | CCI  EMI (CCI&EMI) | | NON-COGNIZABLE | EMI |

F I G. 59
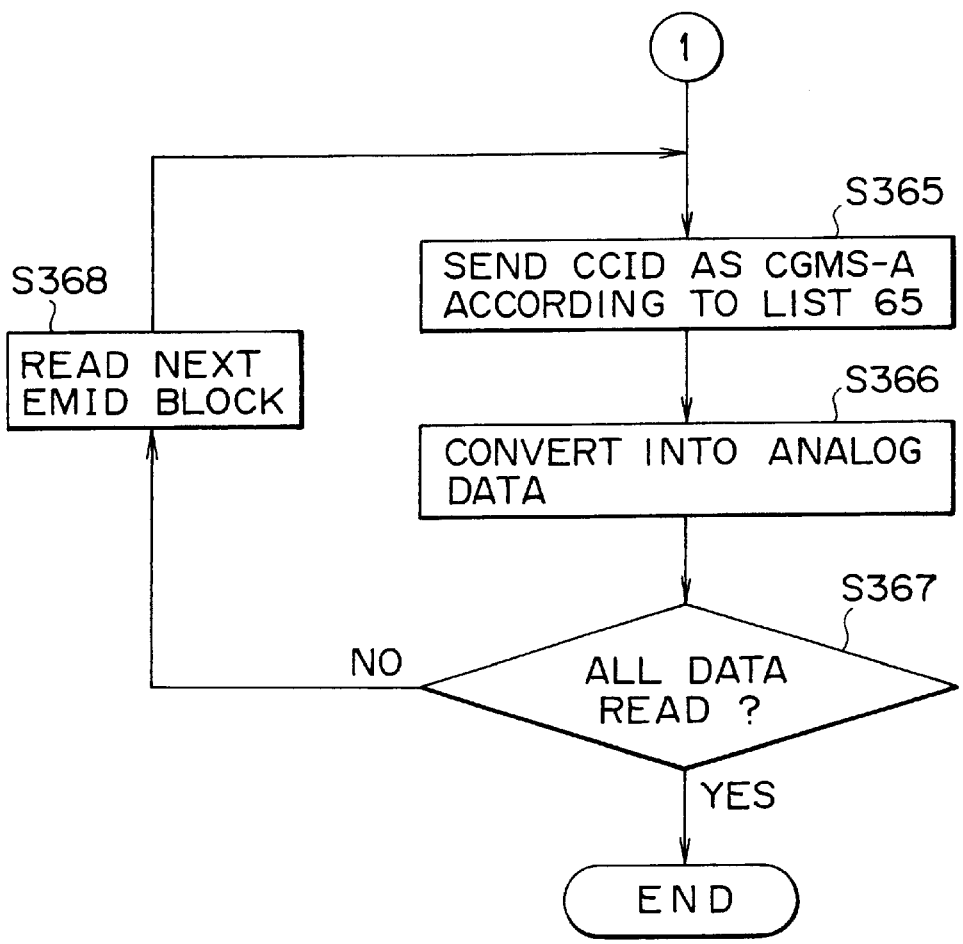

FIG. 60

TABLE 12 : PRESCRIPTION OF COPY CONTROL INFORMATION IN REPRODUCTION MODE

| On disc | | Cognizant playback to 1394 | | Cognizant playback to Analog | Non-cognizant playback to 1394 | |
|---|---|---|---|---|---|---|
| CCID | EMID | CCI | EMI | CGMS-A | CCI | EMI |
| | | LIST64 | | LIST65 | LIST66 | |
| free | free | free | free | free | free | free |
| free | proh | free | proh | free | free | proh |
| proh | proh | proh | proh | proh | proh | proh |
| once | once | once | once | once | once | once |
| once | proh | proh | proh | proh | once | proh |
| REFERENCE | | ······ EMID (CCID & EMID) | | CCID | NON-COGNIZABLE | EMID |

F I G. 61
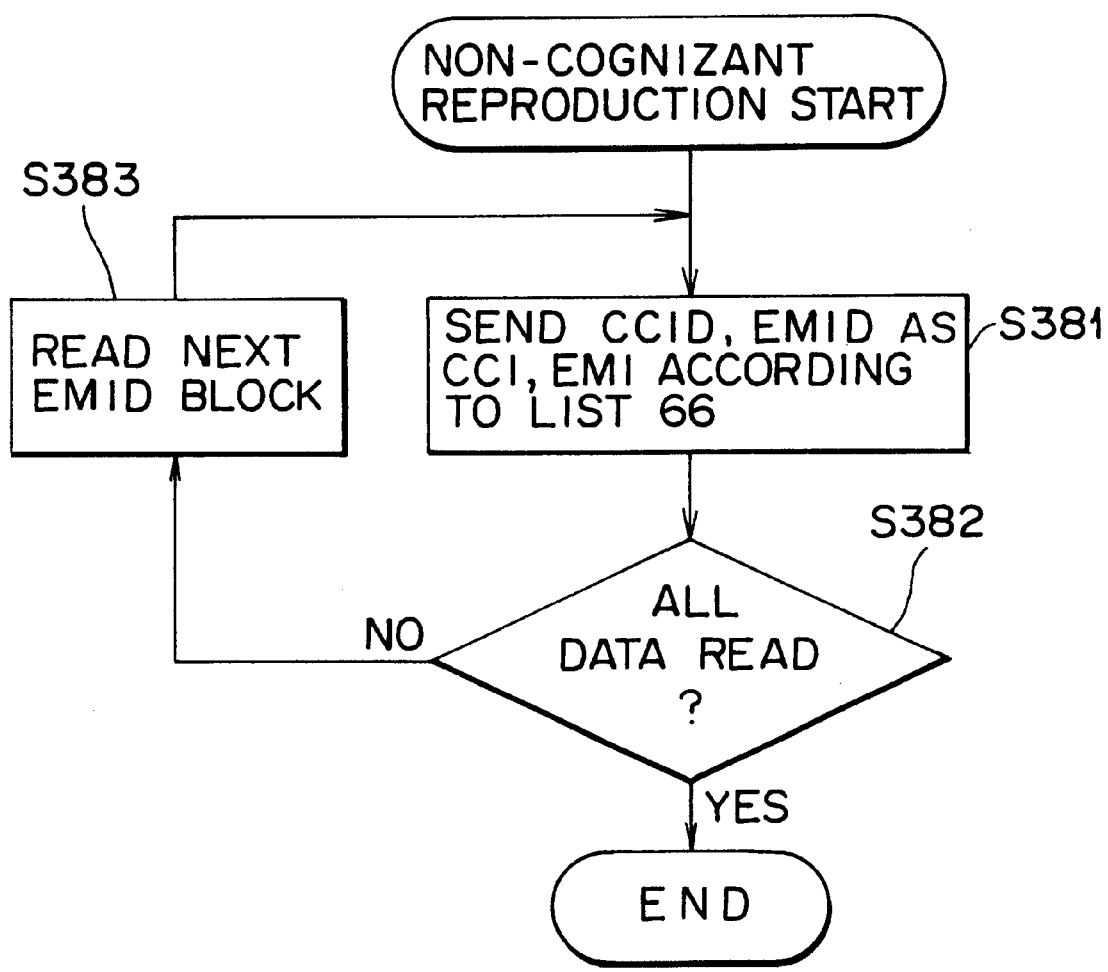

FIG.64

TABLE 13-1

| Source | Input CCI EMI | Cognizant recording CCID EMID | Non-cognizant recording CCID EMID |
|---|---|---|---|
| Cognizant device | free    free<br>free    once<br>once   once<br>free    no-more<br>proh    no-more<br>free    never<br>once   never<br>proh    never | LIST67<br>free    free<br>free    no-more<br>proh    no-more<br>free    free<br>...    ...<br>free    no-more<br>proh    no-more<br>...    ... | LIST70<br>free    free<br>free    no-more<br>once   no-more<br>...    ...<br>...    ...<br>...    ...<br>...    ...<br>...    ... |
| Non-cognizant device | free    free<br>free    once<br>once   once<br>free    no-more<br>once   no-more<br>proh    no-more<br>free    never<br>once   never<br>proh    never | LIST68<br>free    free<br>free    no-more<br>proh    no-more<br>free    free<br>...    ...<br>...    ...<br>free    no-more<br>proh    no-more<br>...    ... | LIST71<br>free    free<br>free    no-more<br>once   no-more<br>...    ...<br>...    ...<br>...    ...<br>...    ...<br>...    ... |
| Analog (CGMS-A) | free<br>once<br>proh | LIST69<br>free    free<br>proh    no-more<br>...    ... | ...    ...<br>...    ...<br>...    ... |
| REFERENCE | | CCI   EMI<br>(CCI&EMI) | NON-COGNIZABLE   EMI |

FIG.65

TABLE 13-2

| Source | Input CCI | Input EMI | Cognizant recording CCID | Cognizant recording EMID | Non-cognizant recording CCID | Non-cognizant recording EMID |
|---|---|---|---|---|---|---|
| Cognizant device | | | LIST72 | | LIST75 | |
| | free | free | free | free | free | free |
| | free | once | free | no-more | free | no-more |
| | once | once | no-more | no-more | once | no-more |
| | free | no-more | free | free | ... | ... |
| | no-more | no-more | ... | ... | ... | ... |
| | free | never | free | no-more | ... | ... |
| | once | never | no-more | no-more | ... | ... |
| | no-more | never | ... | ... | ... | ... |
| | never | never | ... | ... | ... | ... |
| Non-cognizant device | | | LIST73 | | LIST76 | |
| | free | free | free | free | free | free |
| | free | once | free | no-more | free | no-more |
| | once | once | no-more | no-more | once | no-more |
| | free | no-more | free | free | ... | ... |
| | once | no-more | ... | ... | ... | ... |
| | no-more | no-more | ... | ... | ... | ... |
| | free | never | free | no-more | ... | ... |
| | once | never | no-more | no-more | ... | ... |
| | no-more | never | ... | ... | ... | ... |
| | never | never | ... | ... | ... | ... |
| Analog (CGMS-A) | | | LIST74 | | | |
| | free | | free | free | ... | ... |
| | once | | no-more | no-more | ... | ... |
| | no-more | | ... | ... | ... | ... |
| | never | | ... | ... | ... | ... |
| REFERENCE | | | CCI (CCI & EMI) | EMI | NON-COGNIZABLE | EMI |

FIG. 69

TABLE 14-1

| RMID | On disc CCID EMID | | Cognizant playback to 1394 CCI EMI | | Cognizant playback to Analog CGMS-A | Non-cognizant playback to 1394 CCI EMI | |
|---|---|---|---|---|---|---|---|
| Cognizant recording | | | LIST 77 | | LIST 79 | LIST 81 | |
| | free | free | free | free | free | free | free |
| | free | once | free | once | free | free | once |
| | once | once | free | once | once | free | once |
| | free | no-more | free | no-more | free | free | no-more |
| | proh | no-more | free | proh | proh | free | proh |
| | free | never | free | never | free | free | never |
| | once | never | once | never | once | once | never |
| | proh | never | proh | never | proh | proh | never |
| Non-cognizant recording | | | LIST 78 | | LIST 80 | LIST 82 | |
| | free | free | free | free | free | free | free |
| | free | no-more | free | no-more | free | free | no-more |
| | once | no-more | proh | no-more | proh | once | no-more |
| REFERENCE | ...... (CCID) | | ...... EMID (CCID) | | CCID | NON-COGNIZABLE EMID | |

FIG. 70

TABLE 14-2

| RMID | On disc | | Cognizant playback to 1394 | | Cognizant playback to Analog | Non-cognizant playback to 1394 | |
|---|---|---|---|---|---|---|---|
| | CCID | EMID | CCI | EMI | CGMS-A | CCI | EMI |
| Cognizant recording | free<br>free<br>once<br>no-more<br>free<br>once<br>no-more<br>never | free<br>once<br>once<br>no-more<br>never<br>never<br>never<br>never | LIST83<br>free<br>free<br>proh<br>once<br>no-more<br>free<br>once<br>no-more<br>never | free<br>once<br>once<br>no-more<br>never<br>never<br>never<br>never | LIST85<br>free<br>free<br>once<br>free<br>no-more<br>free<br>once<br>no-more<br>never | LIST87<br>free<br>free<br>free<br>free<br>no-more<br>free<br>once<br>no-more<br>never | free<br>once<br>once<br>no-more<br>no-more<br>never<br>never<br>never |
| Non-cognizant recording | free<br>free<br>once | free<br>no-more<br>no-more | LIST84<br>free<br>free<br>no-more | free<br>no-more<br>no-more | LIST86<br>free<br>free<br>no-more | LIST88<br>free<br>free<br>once | free<br>no-more<br>no-more |
| REFERENCE | ··· EMID<br>(CCID) | | | | CCID | NON-COGNIZABLE | EMID |

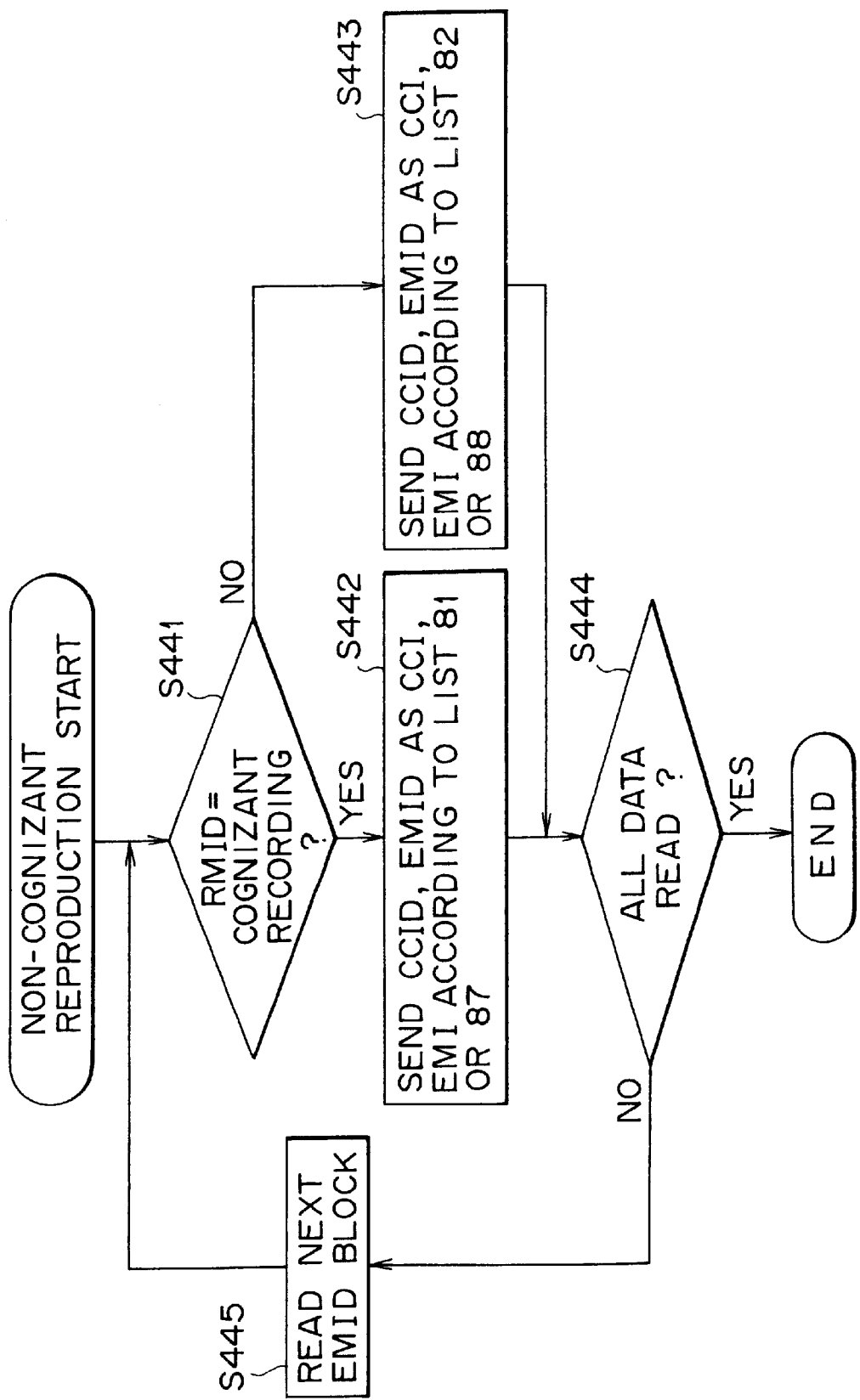

INFORMATION RECORDING SYSTEM

BACKGROUND OF THE INVENTION

The present invention relates to an information recording system and, more particularly, to a system adapted for preventing illegal copying with enhanced certainty.

Recently, there are known home apparatus which are equipped with functions of digitally recording and/or reproducing information in or from a recording medium. If video or music data for example are recorded digitally, resultant deterioration is minimized in recording or reproduction, and when the information recorded on such a recording medium is replicated so many times, it is possible to produce satisfactory recording media as replicas which are substantially equal in quality to the original recording medium. Consequently, unauthorized articles not licensed by a copyright holder may be copied and distributed illegally. With regard to this problem, it is socially demanded now that such illegal copying be prevented.

Normally, data of motion pictures and so forth are transmitted with copy control information termed CGMS (Copy Generation Management System). The CGMS is composed of two bits signifying "copy free", "copy once approved" or "copy prohibited". Attachment of such CGMS is prescribed in accordance with each data format specified in the MPEG (Moving Picture Experts Group) or DV (Digital Video) standards.

In recording data, a recorder checks the CGMS attached to the data and, if the CGMS signifies prohibition of copy, the data are not recorded. Meanwhile, if the CGMS signifies approval of copy once, it is changed to prohibition of copy and then the data are recorded in the recording medium. It is a matter of course that, if the CGMS signifies no restriction of copy, the data are copied freely in the recording medium. Thus, illegal copy is prevented by limiting the copy generation.

However, a device termed a bit stream recorder is incapable of cognizing the CGMS attached to the data. For the purpose of enabling such a device also to execute proper copy generation management, there is proposed an improvement where, in a digital IEEE1394 serial bus, CGMS is stored at specific positions in a header of an isochronous packet, so that even a bit stream recorder is rendered capable of executing copy generation management.

Supposing now that a recording medium containing a copy once approval CGMS has been copied to produce a replica recording medium by a bit stream recorder incapable of cognizing the CGMS, then such copy once approval CGMS is recorded as it is in the new recording medium also. Although it is difficult to prevent that the newly replicated recording medium is copied again to a further recording medium by a bit stream recorder incapable of cognizing the CGMS, further possible copying of the data needs to be avoided in case the recording medium replicated by copying is loaded in a CGMS cognizant device. In this case, the device copies the data to another new recording medium after changing the copy once approval CGMS to a copy prohibition CGMS. If such copying is permitted, it follows that the original recording medium is copied twice eventually. That is, even in the case of a CGMS cognizant device, proper copy generation management fails to be executed.

SUMMARY OF THE INVENTION

The present invention has been accomplished in view of the circumstances mentioned above And it is an object of the invention to realize exact copy generation management with enhanced certainty.

According to a first aspect of the present invention, there is provided an information recording apparatus which comprises a receiving means for receiving record information transmitted from a transmitter inclusively of copy control information; a decision means for making a decision as to whether the transmitter is a first device capable of cognizing the copy control information, or a second device incapable of cognizing the copy control information; a storage means for storing first update information to update the copy control information when the transmitter is the first device, or storing second update information to update the copy control information when the transmitter is the second device; and a recording means for updating, in response to the result of the decision obtained from the decision means, the copy control information included in the record information received by the receiving means, on the basis of the first or second update information stored in the storage means, and then recording, in the recording medium, the information inclusive of the updated copy control information.

According to a second aspect of the present invention, there is provided an information recording method which comprises the steps of receiving record information transmitted from a transmitter inclusively of copy control information; making a decision as to whether the transmitter is a first device capable of cognizing the copy control information, or a second device incapable of cognizing the copy control information; updating, in response to the result of the decision obtained at the decision step, the copy control information included in the record information received at the reception step, on the basis of the first update information for the first device or the second update information for the second device; and recording, in the recording medium, the record information inclusive of the updated copy control information.

According to a third aspect of the present invention, there is provided a medium for providing a program readable by a computer for enabling an information recording apparatus to execute processes which comprise the steps of receiving record information inclusive of copy control information transmitted from a transmitter; making a decision as to whether the transmitter is a first device capable of cognizing the copy control information, or a second device incapable of cognizing the copy control information; updating, in response to the result of the decision obtained at the decision step, the copy control information included in the record information received at the reception step, on the basis of the first update information for the first device or the second update information for the second device; and recording, in the recording medium, the record information inclusive of the updated copy control information.

According to a fourth aspect of the present invention, there is provided an information reproducing apparatus which comprises a reproducing means for reproducing information from a recording medium; a decision means for making a decision as to whether the information reproduced inclusively of copy control information by the reproducing means is the one recorded in a first recording mode by a first device capable of cognizing the copy control information, or the one recorded in a second recording mode by a second device incapable of cognizing the copy control information; a storage means for storing at least either first update information to update the copy control information in case the reproduced information is the one recorded in the first recording mode, or second update information to update the copy control information in case the reproduced information is the one recorded in the second recording mode; and an output means for updating, in response to the result of the decision obtained from the decision means, the copy control information included in the information reproduced by the reproducing means, on the basis of the first or second update information stored in the storage means, and then outputting the reproduced information inclusive of the updated copy control information.

According to a fifth aspect of the present invention, there is provided an information reproducing method which comprises the steps of reproducing information inclusive of copy control information from a recording medium; making a decision as to whether the information reproduced at the reproducing step is the one recorded in a first recording mode by a first device capable of cognizing the copy control information, or the one recorded in a second recording mode by a second device incapable of cognizing the copy control information; and updating, in response to the result of the decision obtained at the decision step, the copy control information included in the information reproduced at the reproducing step, on the basis of the first update information for the first device or the second update information for the second device, and then outputting the reproduced information inclusive of the updated copy control information.

And according to a sixth aspect of the present invention, there is provided a medium for providing a program readable by a computer for enabling an information reproducing apparatus to execute processes which comprise the steps of reproducing, by the information reproducing apparatus, information inclusive of copy control information from a recording medium; making a decision as to whether the information reproduced at reproducing step is the one recorded in a first recording mode by a first device capable of cognizing the copy control information, or the one recorded in a second recording mode by a second device incapable of cognizing the copy control information; and updating, in response to the result of the decision obtained at the decision step, the copy control information included in the information reproduced at the reproducing step, on the basis of the first update information for the first device or the second update information for the second device, and outputting the reproduced information inclusive of the updated copy control information.

The above and other features and advantages of the present invention will become apparent from the following description which will be given with reference to the illustrative accompanying drawings.

BRIEF DESCRIPTION OF THE DRAWINGS

FIG. 5 is a diagram for explaining prescription of the copy control information in a recording mode;

FIG. 11 is a diagram for explaining prescription of the copy control information in a reproduction mode;

FIG. 12 is a diagram for explaining the process at step S42 in FIG. 10;

FIG. 17 shows the flowchart continued from FIG. 16;

FIG. 18 is a diagram for explaining prescription of the copy control information in a recording mode in the second embodiment;

FIG. 22 is a diagram for explaining prescription of the copy control information in a reproduction mode in the second embodiment;

FIG. 23 is a diagram showing modified examples of copy control information in a reproduction mode in FIG. 22;

FIG. 27 is a diagram for explaining prescription of the copy control information in a recording mode in the third embodiment;

FIG. 28 is a flowchart showing a processing routine of non-cognizant recording executed in the third embodiment;

FIG. 31 is a diagram for explaining prescription of the copy control information in a reproduction mode in the third embodiment;

FIG. 32 is a flowchart showing a processing routine of non-cognizant reproduction executed in the third embodiment;

FIG. 36 is a diagram for explaining prescription of the copy control information in a recording mode in the fourth embodiment;

FIG. 37 is a flowchart showing a processing routine of non-cognizant recording executed in the fourth embodiment;

FIG. 38 shows the flowchart continued from FIG. 37;

FIG. 41 is a diagram for explaining prescription of the copy control information in a reproduction mode in the fourth embodiment;

FIG. 48 is a diagram for explaining prescription of the copy control information in a recording mode in the fifth embodiment;

FIG. 51 shows the flowchart continued from FIG. 50;

FIG. 52 is a diagram for explaining prescription of the copy control information in a reproduction mode in the fifth embodiment;

FIG. 56 is a diagram for explaining prescription of the copy control information in a recording mode in the sixth embodiment;

FIG. 59 shows the flowchart continued from FIG. 58;

FIG. 60 is a diagram for explaining prescription of the copy control information in a reproduction mode in the sixth embodiment;

FIG. 61 is a flowchart showing a processing routine of non-cognizant reproduction executed in the sixth embodiment;

FIG. 64 is a diagram for explaining prescription of the copy control information in a recording mode in the seventh embodiment;

FIG. 65 is a diagram for explaining prescription of the copy control information in a recording mode in the seventh embodiment;

FIG. 69 is a diagram for explaining prescription of the copy control information in a reproduction mode in the seventh embodiment;

FIG. 70 is a diagram for explaining prescription of the copy control information in a reproduction mode in the seventh embodiment; and FIG. 71 is a flowchart showing a processing routine of non-cognizant reproduction executed in the seventh embodiment.

DESCRIPTION OF THE PREFERRED EMBODIMENTS

Hereinafter some preferred embodiments of the present invention will be described in detail with reference to the accompanying drawings.

Figure 1:
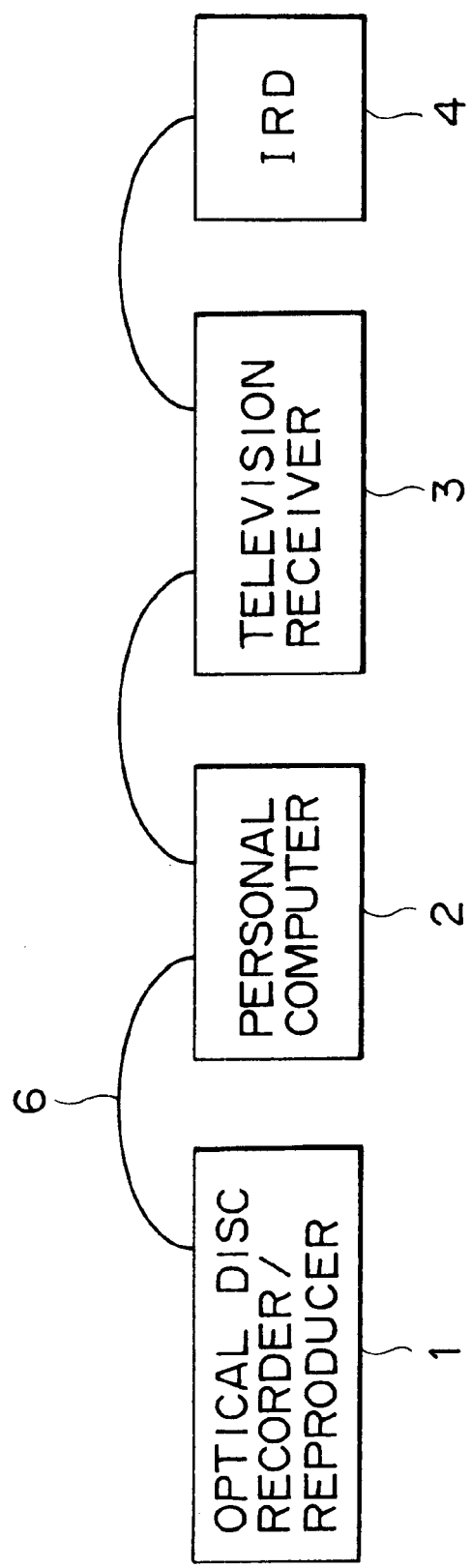
FIG. 1 is a block diagram showing an exemplary configuration of an information transfer system where the present invention is applied.

FIG. 1 shows an exemplary configuration of an information processing system where the present invention is applied. In this example, an optical disc recorder/reproducer 1, a personal computer 2, a television receiver 3 and an IRD (Integrated Receiver/Decoder) 4 are mutually connected via an IEEE1394 serial bus 6, so that data transmitted from a predetermined device via the 1394 serial bus 6 can be received by another device, and the received data can be recorded and displayed.

Figure 2:
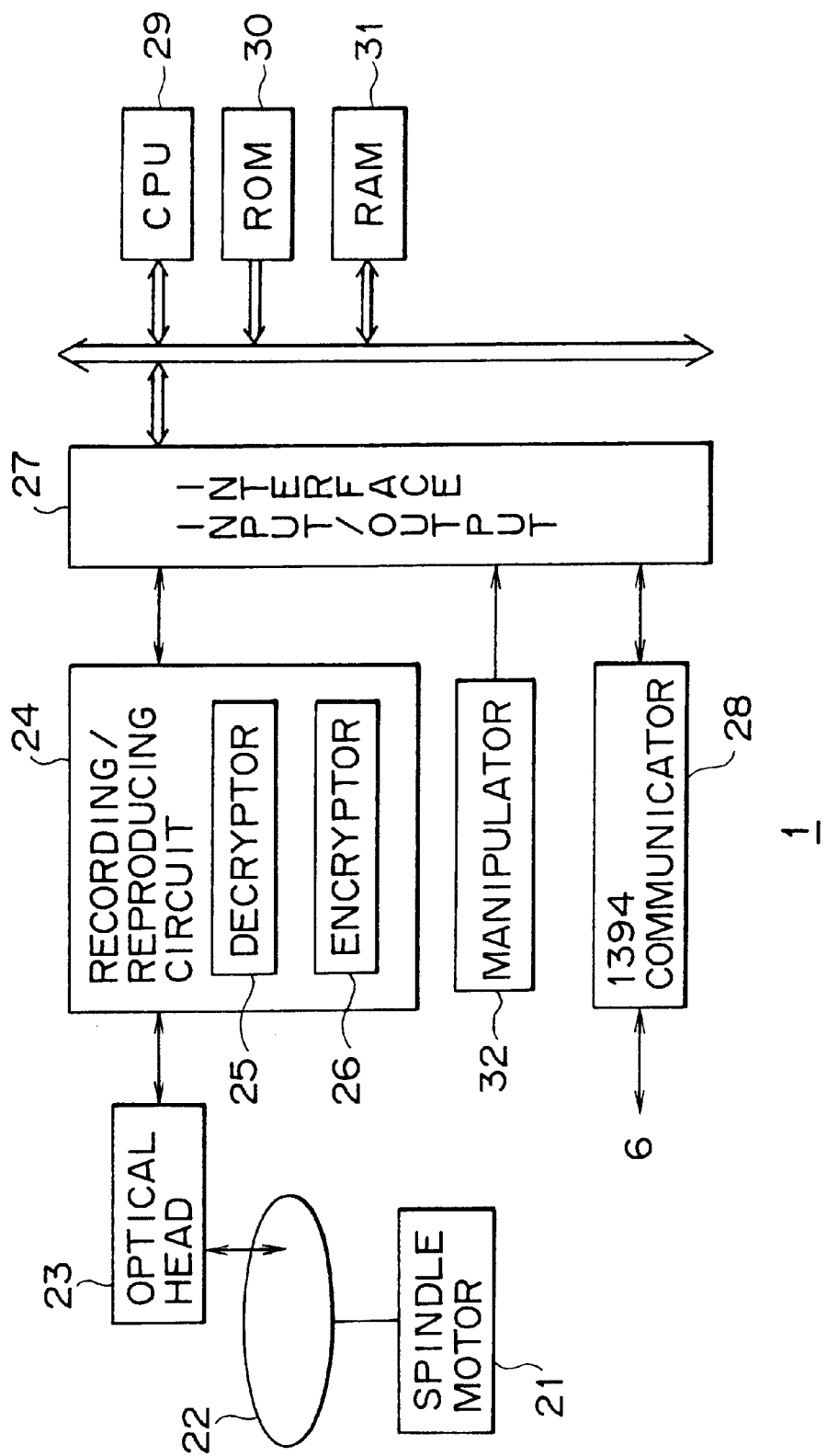
FIG. 2 is a block diagram showing an internal configuration of an optical disc recorder/reproducer included in FIG. 1.

FIG. 2 is a block diagram showing an internal configuration of the optical disc recorder/reproducer 1. An optical disc 22 is rotated at a predetermined speed by a spindle motor 21. An optical head 23 irradiates a laser beam to the optical disc 22 for recording or reproducing data. In a recording/reproducing circuit 24, a signal to be recorded is encrypted, if necessary, by an encryptor 26 and then is supplied to the optical head 23 so as to be recorded in the optical disc 22. The signal reproduced from the optical disc 22 by the optical head 23 is decrypted, in the case of an encrypted one, by a decryptor 25 and then is outputted. A 1394 communicator 28 is connected to the 1394 serial bus 6 so as to transfer a signal to or from another device via the 1394 serial bus 6. An input/output interface 27 is used for executing an interface process between a CPU 29 and the recording/reproducing circuit 24, the 1394 communicator 28 and a manipulator 32.

The CPU 29 executes various processes in accordance with a program stored in a ROM 30. A RAM 31 stores data and programs required for the CPU 29 to execute the various processes. The manipulator 32 is manipulated by a user to input a desired command to the CPU 29.

Although omitted in the drawing, each of the personal computer 2, the television receiver 3 and the IRD 4 also has a 1394 communicator therein so as to be capable of transferring a signal to or from another device via the 1394 serial bus 6.

Next, an explanation will be given on an exemplary process of supplying data, which have been reproduced from an internal hard disc or an attached disc drive, from the personal computer 2 to the optical disc recorder/reproducer 1 via the 1394 serial bus 6 and then recording such data, and also on an inverse process of transmitting the reproduced data from the optical disc 22 of the optical disc recorder/reproducer 1 to the personal computer 2 via the 1394 serial bus and then recording such data in a hard disc or the like.

In the following description, a device capable of cognizing a CGMS will be referred to as a cognizant device, and a device incapable of cognizing a CGMS will be referred to as a non-cognizant device.

It is supposed here that the optical disc recorder/reproducer 1 is a cognizant device. Such a cognizant device is capable of performing two kinds of recording operations, i.e., cognizant recording as a cognizant device, and non-cognizant recording as a non-cognizant device (but not as a non-cognizant device which is not applied to this system). Either recording can be selected by the user through manipulation of the manipulator 32.

Figure 3:
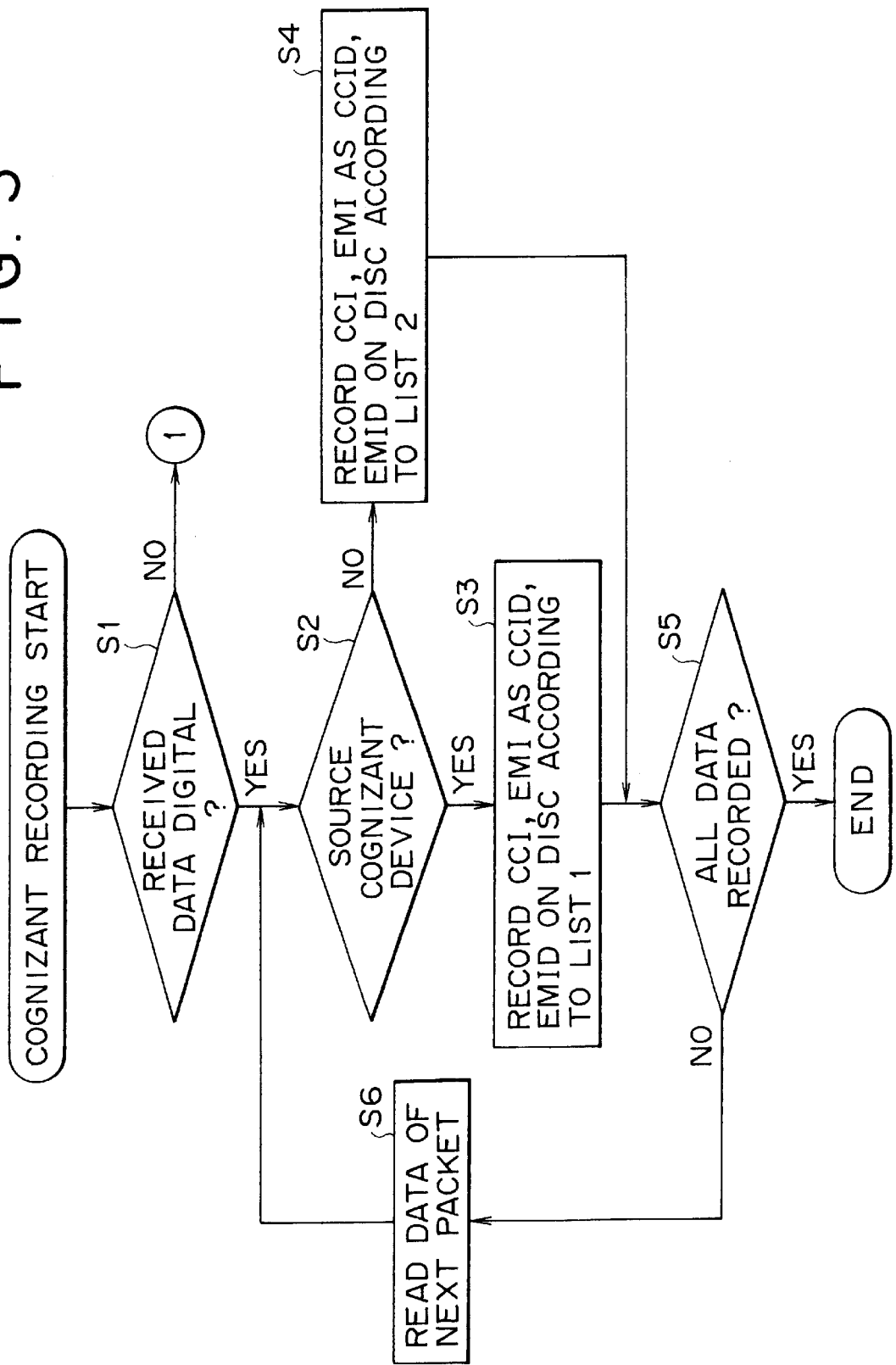
FIG. 3 is a flowchart showing a processing routine of cognizant recording executed in the optical disc recorder/reproducer in FIG. 1.
Figure 4:
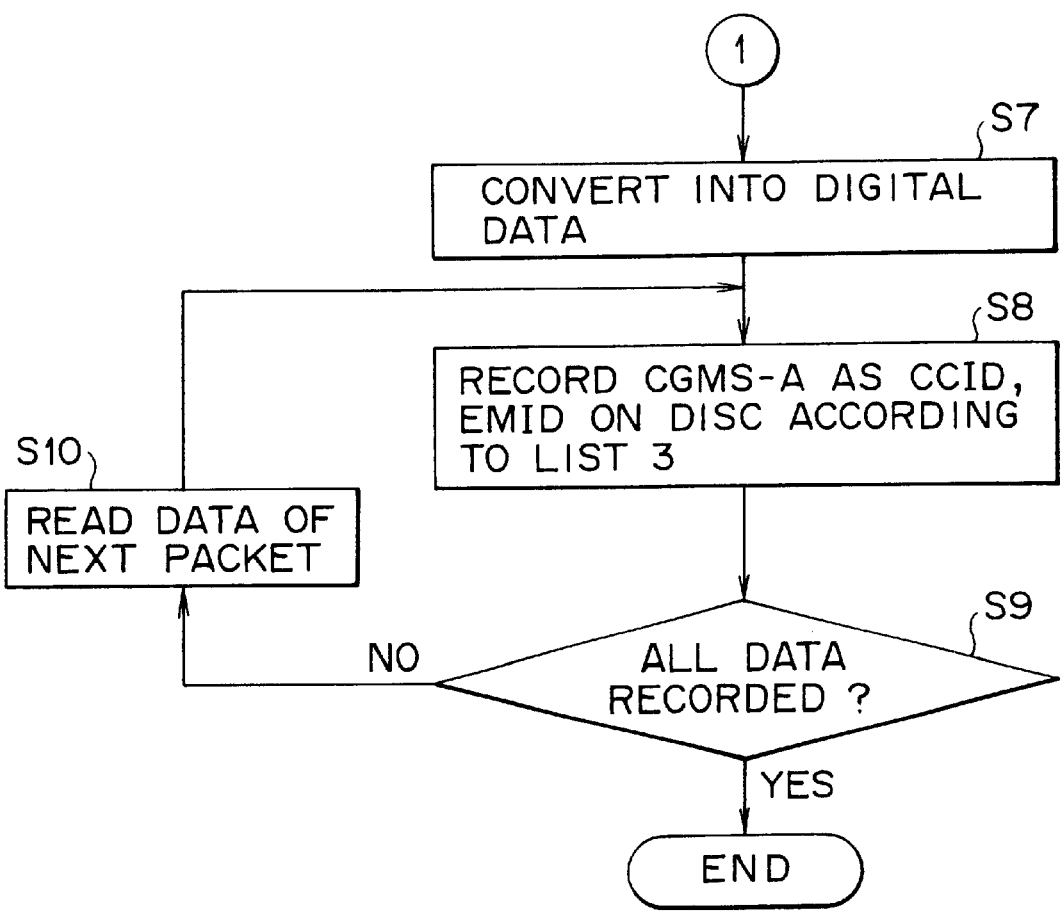
FIG. 4 shows the flowchart continued from FIG. 3.

FIGS. 3 and 4 are flowcharts of processes executed in response to a selection of cognizant recording. First at step S1, the CPU 29 receives, via the 1394 communicator 28, the data transmitted from the personal computer 2 via the 1394 serial bus 6. Subsequently the CPU 29 makes a decision at step S1 as to whether the received data are digital data or not. And if the result of this decision signifies the digital data, the operation proceeds to step S2, where the CPU 29 makes a decision as to whether the data transmitter (in this case, personal computer 2) is a cognizant device or not. This decision can be executed in accordance with a header of the packet transmitted via the 1394 serial bus 6, since a flag is included in the header to represent that the data transmitter is a cognizant device or not. When the data transmitter (source) is a cognizant device, the operation proceeds to step S3, where the CPU 29 executes a process of recording, in the optical disc 22, CCI (Copy Control Information) and EMI (Encryption Mode Indicator) as CCID (CCI on Disc) and EMID (EMI on Disc) respectively according to Table 1 in FIG. 5.

The CCI is copy control information stored in a location defined according to each format of MPEG, DV or the like, and it indicates "free", "once" or "prohibited" in conformity with the copy restriction state of the corresponding data. The CCI is disposed in the data of an isochronous packet transmitted via the 1394 serial bus 6.

The EMI is disposed in the header of an isochronous packet, and indicates the encryption mode of a payload (data part) of the packet. More specifically, the EMI indicates mode A (proh) for copy prohibited data, mode B (once) for copy once data, or free for noncrypted copy-free contents data.

In case a plurality of programs having different copy restriction information are included in a single isochronous stream, the encryption mode is determined in accordance with the severest copy restriction of the data.

The CCID signifies CCI recorded as a portion of data on the disc. The EMID indicates "free", "once" or "prohibited" represented by the copy restriction information for the data in a predetermined range (EMID block) on the disc. This EMID is recorded in an area (e.g., header) different from the data storage area on the disc.

Figure 6:
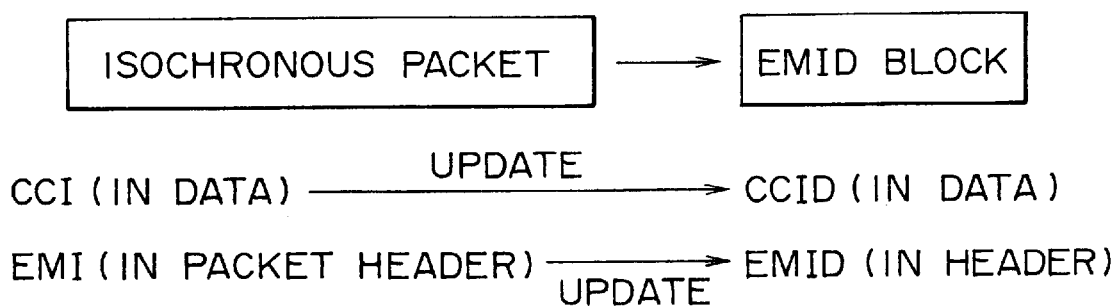
FIG. 6 is a diagram for explaining the process at step S3 in FIG. 3.

At step S3 in FIG. 3, the CPU 29 having received one isochronous packet via the 1394 communicator 28 forms one EMID block out of the received packet as shown in FIG. 6, then updates the CCI, which is included in the data of the received packet, to CCID according to Table 1, and disposes the CCID in the data of the EMID block. Similarly, the EMI disposed in the header of the isochronous packet is updated to EMID according to Table 1, and then this EMID is disposed in the header of the EMID block.

The EMID block is inputted to the recording/reproducing circuit 24 via the input/output interface 27 and, after being encrypted by the encryptor 26 when necessary, the EMID block is recorded on the optical disc 22 by the optical head 23.

As shown on List 1 of Table 1 in FIG. 5, when both of CCI and EMI indicate free, CCID and EMID are both updated to free. And when CCI and EMI are free and once respectively, CCID and EMID are updated to free and proh respectively.

When both of CCI and EMI indicate once, CCID and EMID are both updated to proh. That is, upon reception of data of CCI=once from the cognizant device, CCID is updated to proh. Since the data of "copy once approved" are copied once here, CCID is changed from once to proh so as to prohibit subsequent copying.

When CCI indicates free while EMI indicates proh, CCID is set to free while EMID is set to proh. That is, in this case, the copy control information is substantially not updated.

When CCI indicates once while EMI indicates proh, CCID and EMID are both set to proh. The information on a prerecorded disc is thus updated to approve recording (copying) once. When both of CCI and EMI indicate proh, copying is prohibited. On the prerecorded disc, the data of CCID/EMID=once/proh obtained after cognizant reproduction are updated to proh/proh, as will be described later with reference to FIG. 11. Copying a y data obtained by reproduction of a user-recorded disc is also prohibited. Therefore, CCI=proh and EMI=proh in each of these cases to prohibit copying (recording).

When each of the updated EMID in the encryption block is free, no encryption is executed. In case there is any information of EMID=proh in the encryption block, the relevant data are encrypted.

Meanwhile, if the result of the decision obtain at step S2 signifies that the source is not a cognizant device (i.e., the source is a non-cognizant device), he operation proceeds to step S4, where the CPU 29 updates CCI and EMI to CCID and EMID respectively in accordance with List 2 in FIG. 5 and executes a process of recording the data on the optical disc 22. This process is fundamentally the same as the process at step S3, and the difference resides merely in the list.

When CCI and EMI are both free on List 2 or when CCI is free while EMI is proh, each of CCID and EMID is set to free. Upon reception of the data of EMI=proh from a non-cognizant device, only the data of CCI=free is recorded.

When CCI is once while EMI is proh, copying is prohibited. For example, when the user performs non-cognizant recording of a disc where CCI/EMI=once/once, CCID/EMID are updated to once/proh in accordance with List 4 as will be described later. And in subsequent non-cognizant reproduction of the disc, as shown on List 8 in FIG. 11, CCI/EMI are left unchanged as once/proh. How ever, when the reproduced data are to be recorded again, such recording is prohibited according to List 2 and List 5 which will be described later. Consequently, in case the data are reproduced by a non-cognizant device, the data obtained from a prerecorded disc may be copied once, but re-copying the same is prohibited.

Upon reception of the data of CCI=once from the non-cognizant device, the data is not recorded when EMI=proh. However, when EMI=once, the data is recorded after updating the information as CCI=proh and EMID=proh. When CCI/EMI=once/proh, both the reproduced data from a prerecorded disc and the reproduced data from a non-cognizant recorded disc are prohibited from being recorded in case the source is a non-cognizant device.

Recording is prohibited when each of CCI and EMI is proh.

When CCI is free while EMI is once, CCID is set to free while EMID is set to proh. This combination of CCI and EMI is existent only in the data reproduced from a prerecorded disc.

When each of CCI and EMI is once, both of CCID and EMID are set to proh. This combination of CCI and EMI also is existent only in the data reproduced from a prerecorded disc. Upon reception of the data of CCI=once from the non-cognizant device, the data is not recorded if EMI=proh, but when EMI=once, the data is recorded after updating the information as CCI=proh and EMID=proh.

Next to the processes executed at steps S3 and S4, the operation proceeds to step S5, where the CPU 29 makes a decision as to whether the entire data have been completely recorded or not. And if the result of this decision signifies that some other data are still left nonrecorded, the operation proceeds to step S6, where the CPU 29 executes a process of reading the data of a next packet. Then the operation returns to step S2, and the subsequent processes thereafter are executed repeatedly. If the result of the decision at step S5 signifies that the entire data have been completely recorded, the cognizant recording is terminated.

Meanwhile, if the result of the decision at step S1 signifies that the received data is not digital one (i.e., the received data is analog one), the operation proceeds to step S7, where the CPU 29 converts the received analog data into digital data. And at step S8, a process of recording the data on the disc is executed with CGMS-A as CCID and EMID according to List 3 in FIG. 5.

As shown in FIG. 5, when CCI is free, both of CCID and EMID are set to free according to List 3. In the case of an analog input, one EMID block is used per each CGMS-A. Therefore, when CGMS-A=free, the information is set as CCID=free and EMID=free, or when CGMS-A=once, the information is updated as CCID=proh and EMID=proh, and then recording is performed.

When CCI is once, both of CCID and EMID are set to proh. Meanwhile, when CCI is proh, recording is prohibited.

As shown in FIG. 5, CCID on each of Lists 1 to 3 is determined fundamentally with reference to CCI, and EMID is determined with reference to EMI. However, upon reception of the data of CCI=once from the non-cognizant device on List 2, CCID and EMID are determined with reference to both of CCI and EMI.

Figure 7:
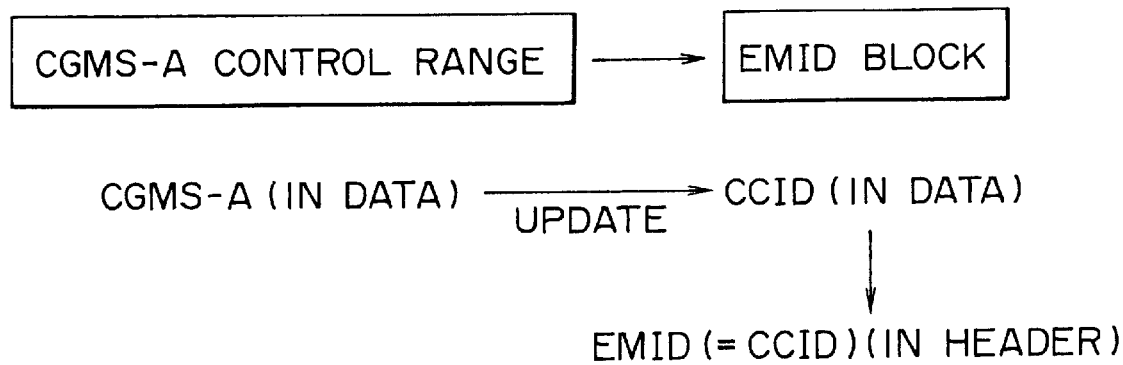
FIG. 7 is a diagram for explaining the process at step S8 in FIG. 4.

FIG. 7 shows such a process executed at step S8. As shown in this diagram, the control range of CGMS-A is set to an EMID block, and the CGMS-A in the data is updated to CCID according to List 3 and then is recorded in the data of the EMID block. In the case of analog data where none of EMI is existent, CCID is recorded directly as EMID in a header of the EMID block.

After termination of the recording process at step S8, the operation proceeds to step S9, where the CPU 29 makes a decision as to whether the entire data have been completely recorded or not. And if the result of this decision signifies that some data are still left nonrecorded, the operation proceeds to step S10 to execute a process of reading the data of a next packet. Then the operation returns to step S8, and the subsequent processes are executed repeatedly.

Meanwhile, if the result of the decision at step S9 signifies that the entire data have been completely recorded, this recording routine is terminated.

Figure 8:
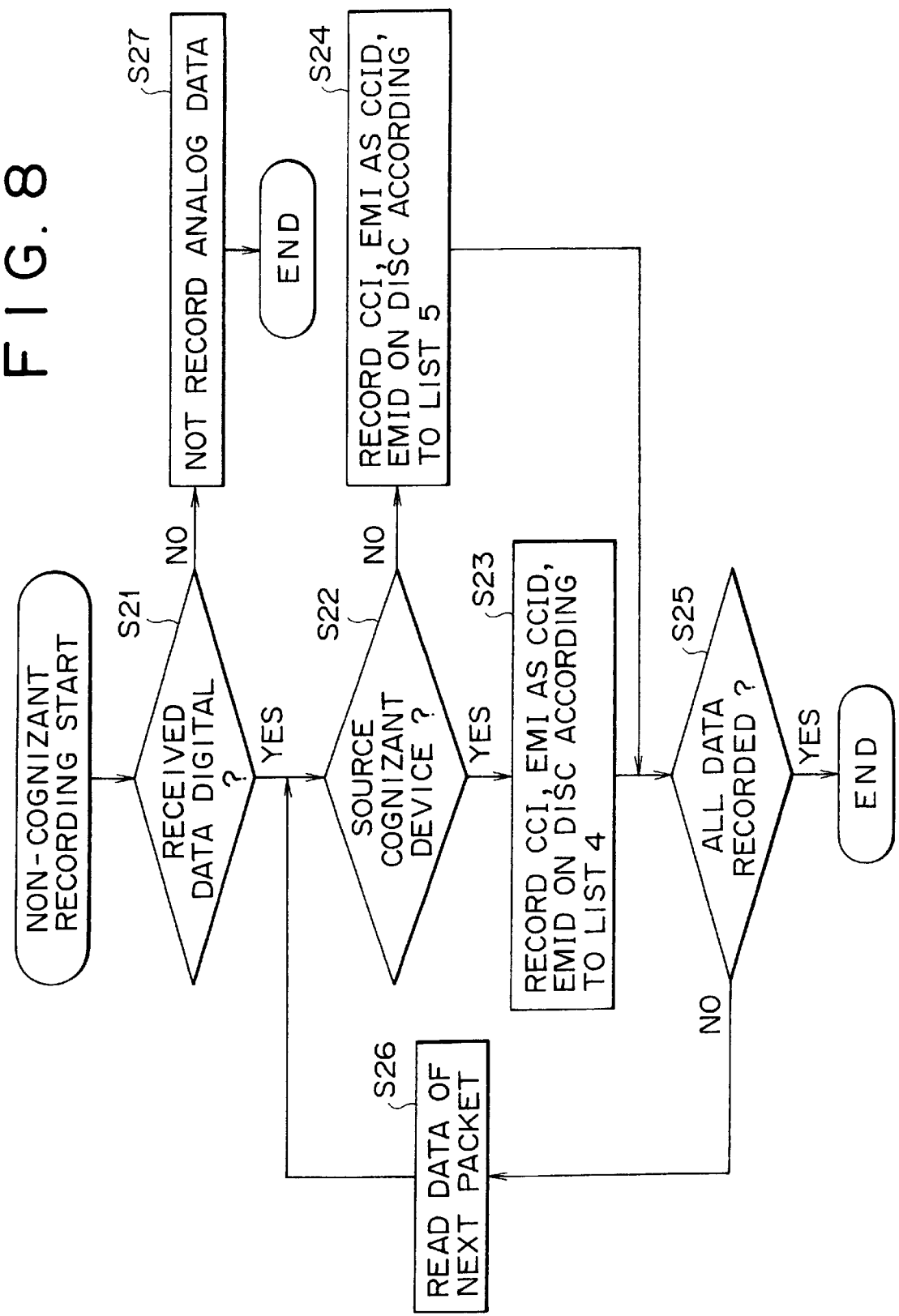
FIG. 8 is a flowchart showing a processing routine of non-cognizant recording executed in the optical disc recorder/reproducer in FIG. 2.

Hereinafter an explanation will be given on non-cognizant recording with reference to a flowchart of FIG. 8. Processes at steps S21 to S26 in FIG. 8 are substantially the same as the aforementioned processes executed at steps S1 to S6 relative to the cognizant recording shown in FIG. 3. However, some differences are existent therebetween in the points that Lists 1 and 2 used at steps S3 and S4 respectively are replaced with Lists 4 and 5 at steps S23 and S24 respectively, and also that a different process is executed in case the received data is analog one.

Figure 9:
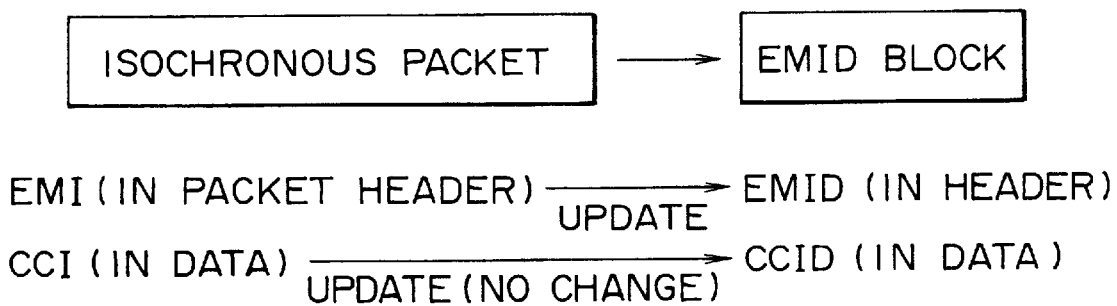
FIG. 9 is a diagram for explaining the process at step S23 in FIG. 8.

At step S23, as shown in FIG. 9, one EMID block is formed per isochronous packet, and EMI in the packet header is updated to EMID according to List 4 and then is recorded in the header of the EMID block. Meanwhile, CCI in the data of the isochronous packet is updated to CCID according to List 4, but CCID in this case is substantially equal in content to CCI as shown in List 4, so that CCI may be set to CCID as it is without being updated.

When both of CCI and EMI are free as shown on List 4, CCID and EMID are both set to free. However, when CCI is free while EMI is once, CCID is set to free while EMID is updated to proh. And when both of CCI and EMI are once, CCID is updated to once while EMID is updated to proh.

When CCI/EMI are free/proh, once/proh or proh/proh respectively, recording is prohibited. In other words, any non-cognizant device is rendered incapable of receiving (copying) the data with EMI=proh.

At step S24, the same process as that at step S23 is executed according to List 5. In this case also, the non-cognizant device is rendered incapable of receiving (recording) the data of EMI=proh. When both of CCI and EMI are free, CCID and EMID are both set to free. However, when CCI is free while EMI is once, CCID is set to free while EMID is updated to proh. When both of CCI and EMI are once, CCID is updated to once while EMID is updated to proh.

If the result of the decision obtained at step S21 in FIG. 8 signifies that the received data is not digital one (i.e., analog data), the operation proceeds to step S27 where, as shown in FIG. 5, recording of the received data is prohibited.

As shown in FIG. 5, it is impossible in the non-cognizant recording to detect CCI as given on Lists 4 and 5 mentioned, so that CCI is used directly as CCID, while EMID is determined with reference to EMI.

Figure 10:
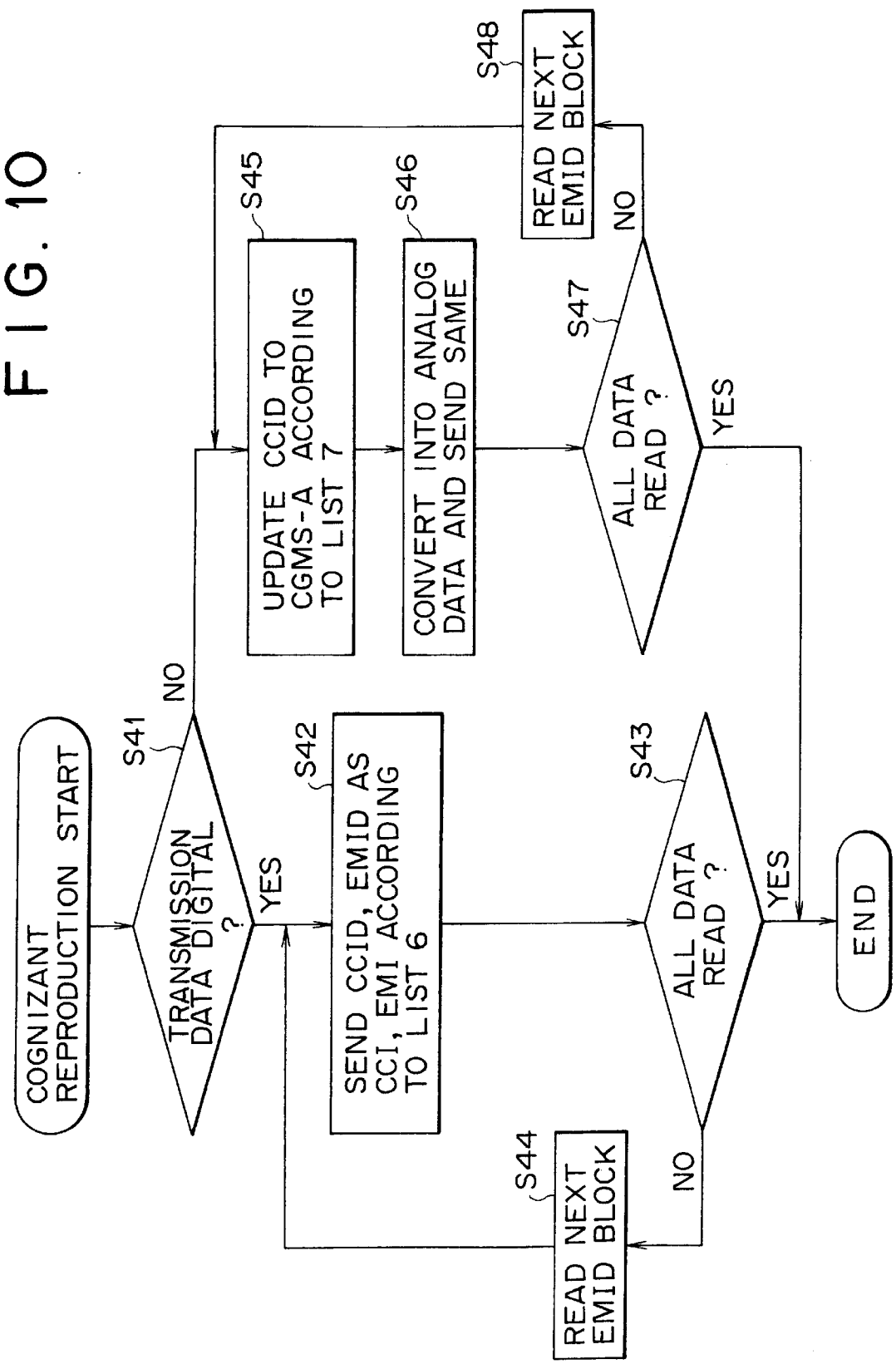
FIG. 10 is a flowchart showing a processing routine of cognizant reproduction executed in the optical disc recorder/reproducer in FIG. 2.

Next, an explanation will be given on a process of reproducing the data from the optical disc 22. In this case also, there are cognizant reproduction and non-cognizant reproduction. Desired reproduction to be executed is selectively specified by the user through manipulation of the manipulator 32. First, cognizant reproduction will be described below with reference to a flowchart of FIG. 10.

A fundamental operation for cognizant reproduction is performed as follows. The CPU 29 controls the optical head 23 to thereby reproduce the recorded data from the optical disc 22. In case the reproduced data is encrypted one, the data is decrypted by the decryptor 25 in the recording/reproducing circuit 24. If the received data is noncrypted one, the data is transmitted as it is from the 1394 communicator 28 via the 1394 serial bus 6 to the personal computer 2 for example.

In performing such reproduction, the CPU 29 makes a decision at step S41 as to whether the transmitted data is digital one or not. And if the result of this decision signifies digital data, the operation proceeds to step S42, where CCID and EMID are updated respectively to CCI and EMI according to List 6 in FIG. 11, and then are outputted.

More specifically, as shown in FIG. 12, the CPU 29 forms one EMID block per transmission packet, then updates CCID, which is included in the data of the EMID block, to CCI according to List 6, and disposes the updated information in the data of the transmission packet. Further, EMID disposed in the header of the EMID block is updated to EMI according to List 6 and then is disposed in the header of the transmission packet. Subsequently, this packet is sent as an isochronous packet from the 1394 communicator 28 via the 1394 serial bus 6 to the personal computer 2.

With regard to combinations of CCID and EMID on a disc in this example, a combination of CCID/EMID=free/once and another combination of CCID/EMID=once/once are existent only on a prerecorded disc. Meanwhile, a combination of CCID/EMID=once/proh is existent on a prerecorded disc or a non-cognizant recorded disc.

On List 6, when a plurality of different EMID are included in a single output packet, the EMI value is set to the severest EMID value. However, in the case of CCID/EMID=once/proh, the information is updated as CCI =proh and EMI= proh in reproducing a prerecorded disc (where copy of the data is approved merely once) and also in reproducing a non-cognizant recorded disc (where copy of the data is prohibited).

When CCID=once on List 6, CCI is determined with reference to both CCID and EMID. However, since CCI is not updated in any other case, neither CCID nor EMID needs to be referred to. EMI is determined with reference to EMID.

After the process at step S42, the operation proceeds to step S43, where a decision is made as to whether the entire data have been completely read or not. And if the result of this decision signifies that some data are still left unread, the operation proceeds to step S44 to read the next EMID block. Thereafter the operation returns to step S42, and the subsequent process is executed repeatedly. If the result of the decision obtained at step S43 signifies that the entire data have been completely read, the cognizant reproduction is terminated.

Meanwhile, if the result of the decision at step S41 signifies that the transmission data is analog one, the operation proceeds to step S45 to execute a process of updating CCID to CGMS-A according to List 7 in FIG. 11.

Figure 13:
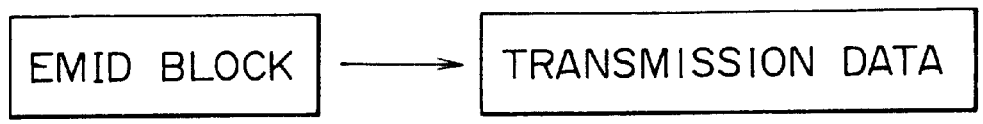
FIG. 13 is a diagram for explaining the process at step S45 in FIG. 10.

More specifically, as shown in FIG. 13, one EMID block is used as transmission data, and CCID in the EMID block is updated to CGMS-A according to List 7 and then is disposed in the transmission data.

In the case of CCID/EMID=once/proh, as shown on List 7 in FIG. 11, the information is updated as CGMS-A=proh in reproducing a prerecorded disc (where copy of the data is approved merely once) and also in reproducing a non-cognizant recorded disc (where copy of the data is prohibited).

Also as shown on List 7, CGMS-A is determined with reference to CCID.

Upon completion of the updating process at step S45, the operation proceeds to step S46, where the CPU 29 converts the data into analog one and then transmits the same to the personal computer 2 via an unshown analog bus. Then the operation further proceeds to step S47, where a decision is made as to whether the entire data have been completely read or not. And if the result of this decision signifies that some data are still left unread, the operation proceeds to step S48 to execute a process of reading the next EMID block. Thereafter the operation returns to step S45, and the subsequent process is executed repeatedly. If the result of the decision at step S47 signifies that the entire data have been completely read, the cognizant reproduction is terminated.

Figure 14:
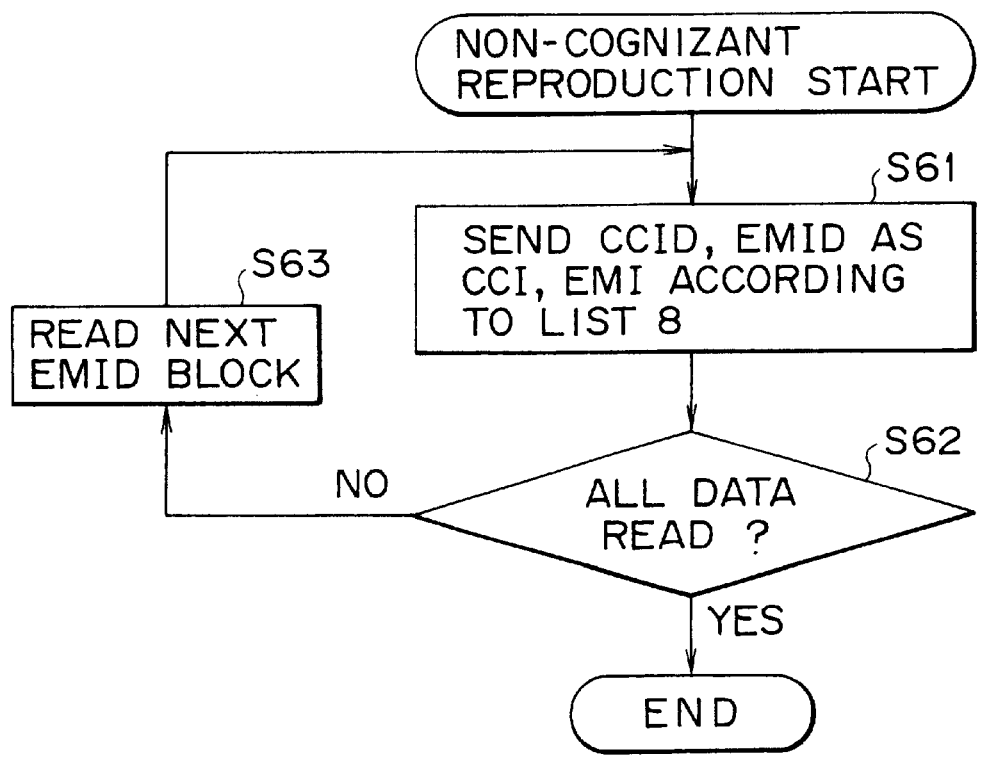
FIG. 14 is a flowchart showing a processing routine of non-cognizant reproduction executed in the optical disc recorder/reproducer in FIG. 2.

FIG. 14 shows a processing routine of non-cognizant reproduction. First at step S61, the CPU 29 updates CCID and EMID to CCI and EMI respectively according to List 8 in FIG. 11, and then executes a process of sending the same.

Figure 15:
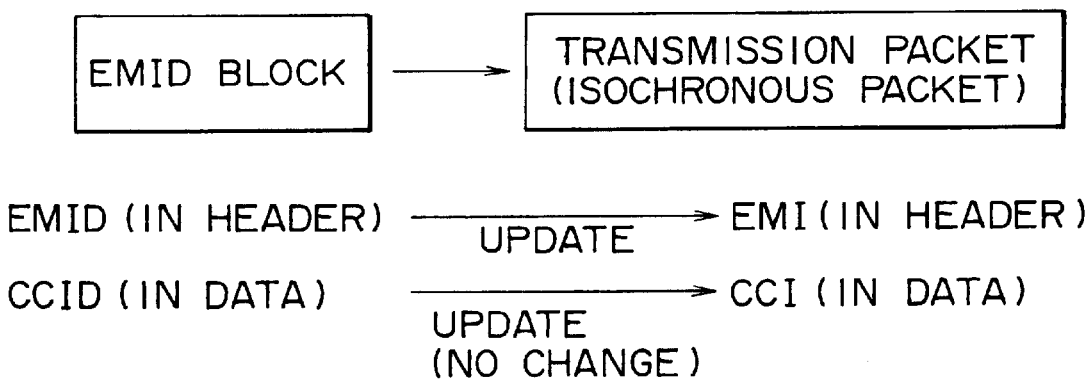
FIG. 15 is a diagram for explaining the process at step S61 in FIG. 14.

More specifically, as shown in FIG. 15, one EMID block is formed per transmission packet, and EMID positioned in the header of the EMID block is updated to EMI according to List 8 and then is disposed in the header of the transmission packet. In the non-cognizant reproduction where CCID in the data cannot be detected, the information is set directly to CCI and then is disposed in the data of the transmission packet. And this packet is sent as an isochronous packet.

In the case of CCID/EMID=once/proh, as shown on List 8 in FIG. 11, the information is updated as CCI=once and EMI=proh in reproducing a prerecorded disc (where copy of the data is approved merely once) and also in reproducing a non-cognizant recorded disc (where copy of the data is prohibited).

After the process at step S61 in FIG. 14, the operation proceeds to step S62, where the CPU 29 makes a decision as to whether the entire data have been completely read or not. And if the result of this decision signifies that some data are still left unread, the operation proceeds to step S63 to read the next EMID block. Thereafter the operation returns to step S61, and the subsequent process is executed repeatedly. If the result of the decision obtained at step S62 signifies that the entire data have been completely read, the non-cognizant reproduction is terminated.

In the process executed according to List 6 in FIG. 11, whether the data is to be encrypted or not is determined in conformity with EMI. And when the data is to be encrypted, either once or prohibit mode is selected.

In the embodiment using Table 1 of FIG. 5 and Table 2 of FIG. 11, when CCI and EMI of the data transmitted from the non-cognizant device are once and proh respectively, it is impossible to make a decision as to whether the data is the one reproduced from a prerecorded disc or the one reproduced from a user-recorded disc (replicated by the user in the once copy mode). Therefore, recording of such data is prohibited as shown on Lists 2 and 5 in FIG. 5. Thus, it becomes possible to prevent illegal copying of the data reproduced from the user-recorded disc. However, a problem (first problem) arises therefrom that, even the data reproduced legally from a prerecorded disc is also prevented from being copied, although proper copying thereof once is to be essentially approved. More specifically, when a prerecorded disc containing data of once/proh is dubbed in a non-cognizant reproduction mode (i.e., when the source is a non-cognizant device), the information is set as once/proh according to List 8, but recording of the data is prohibited according to Lists 2 and 5.

Further in this embodiment, a similar problem arises in a cognizant device as well where management of copy control information can be performed more exactly than in a non-cognizant device. That is, as shown on Lists 6 and 7 in FIG. 11, CCI/EMI are updated to proh/proh in cognizant reproduction (by a cognizant device) of a disc containing CCID/EMID=once/proh. And also in cognizant reproduction of the data in the form of analog signal, CGMS-A is updated to proh. A disc containing CCID/EMID=once/proh is either a prerecorded disc or a user-recorded disc. In the case of a user-recorded disc, CCI or CGMS-A is updated to proh as mentioned, so that when the source is a cognizant device and the data include CCI/EMI=proh/proh or CGMS=proh as shown on Lists 1 and 4 in FIG. 5, each of cognizant recording and non-cognizant recording is prohibited, as shown on Lists 1, 4, List 3 and the right side thereof. Thus, it becomes possible to prevent illegal copying of a user-recorded disc a plurality of times. On the other hand, however, there arises another problem (second problem) that legal copying is also rendered impossible even in the case of a prerecorded disc where its copy is essentially approved once.

Next, an explanation will be given on a second embodiment which is capable of solving the second problem out of the two problems described above.

In the second embodiment, more exact copy control is rendered possible by recording, on a disc, information to indicate a cognizant recording mode or a non-cognizant recording mode. More specifically, RMID (Recording Mode Indicator on Disc) is recorded on the disc. This RMID is a flag indicating that the data in a predetermined region of the disc has been recorded in a cognizant recording mode or a non-cognizant recording mode. The EMID is recorded in another area (e.g., header) different from that of the data or EMID on the disc.

Figure 16:
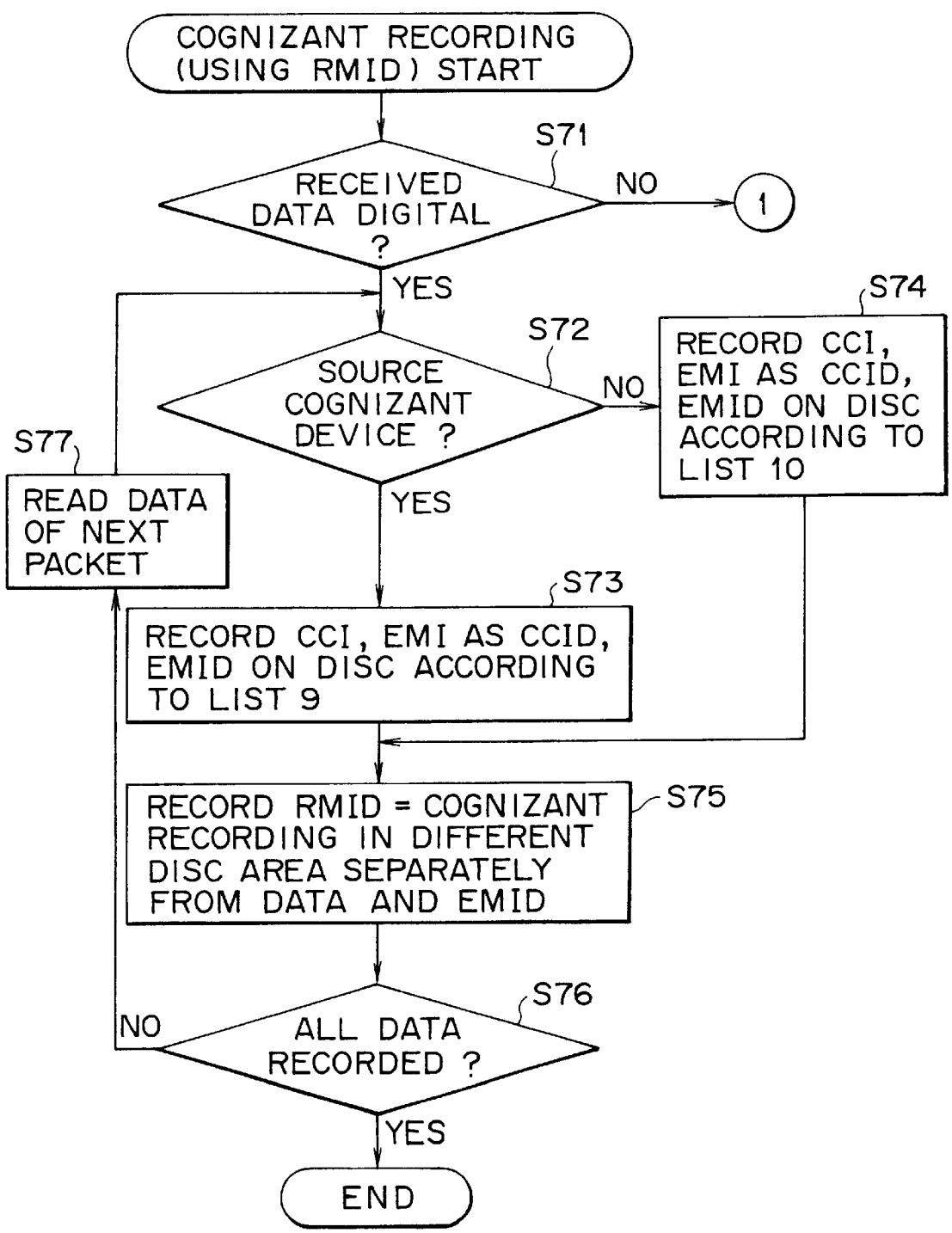
FIG. 16 is a flowchart showing a processing routine of cognizant recording executed in a second embodiment of the optical disc recorder/reproducer in FIG. 2.

Hereinafter an exemplary case of recording RMID on a disc will be described with reference to FIGS. 16 to 24. Flowcharts of FIGS. 16 and 17 show a processing routine executed in cognizant recording. The processes at steps S71–S82 in these flowcharts are fundamentally the same as those executed at steps S1–S10 in the aforementioned cognizant recording shown in FIGS. 3 and 4. However, some differences are existent therebetween in the points that the processes at steps S73, S74 and S79 in FIGS. 16 and 17, which correspond respectively to those at steps S3, S4 and S8 in FIGS. 3 and 4, are executed according to Lists 9–11 instead of Lists 1–3, and also that RMID is recorded on the disc at step S75 or S80 next to steps S73, S74 and S79. Now, merely such differences will be described below.

List 9 at step S73, List 10 at step S74 in FIG. 16 or List 11 at step S79 in FIG. 17 is shown in Table 3 of FIG. 18. These Lists 9–11 are substantially the same as Lists 1–3 shown in FIG. 5. Accordingly, in the cognizant recording of FIGS. 16 and 17, the processes substantially different from those in the cognizant recording of FIGS. 3 and 4 reside in that RMID=Cognizant Recording is recorded in the header area on the optical disc 22 at step S75 after the process at step S73 or S74, and that RMID=Cognizant Recording is recorded similarly at step S80 next to the process at step S79.

Figure 19:
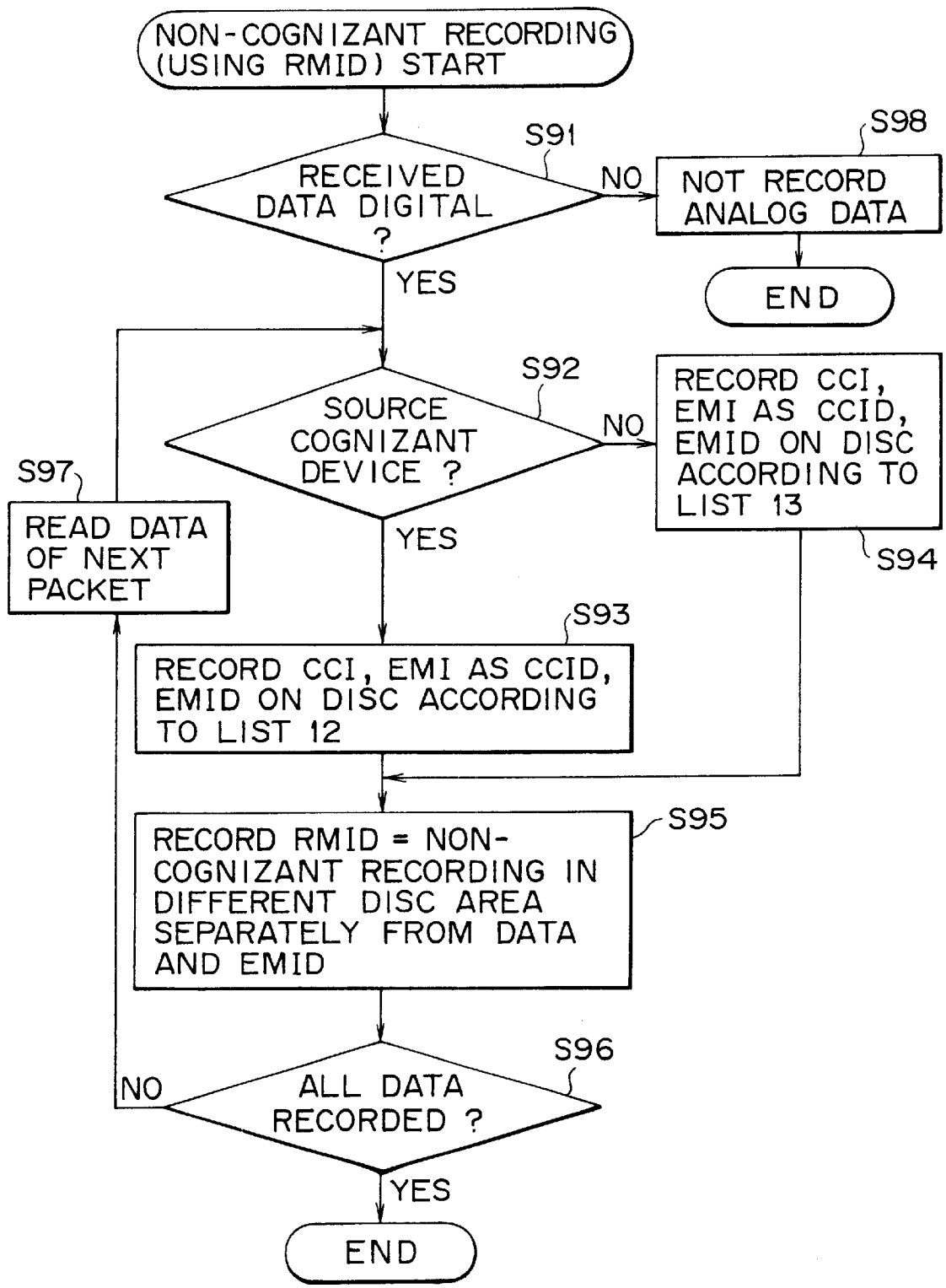
FIG. 19 is a flowchart showing a processing routine of non-cognizant recording executed in the second embodiment.

The flowchart of FIG. 19 shows a processing routine executed to perform non-cognizant recording in the second embodiment using RMID. In this flowchart, processes at steps S91–S98 are fundamentally the same as those at steps S21–S27 in the aforementioned non-cognizant recording of FIG. 8. However, CCI and EMI are updated to CCID and EMID respectively by the use of List 12 at step S93 and List 13 at step S94. Lists 12 and 13 are substantially the same as Lists 4 and 5 used at steps S23 and 24 respectively in FIG. 8.

Accordingly, the processing routine of FIG. 19 is different from that of FIG. 8 substantially in the point that RMID= Non-Cognizant Recording is recorded in the header on the optical disc 22 at step S95 after the processes at steps S93 and S94.

Figure 20:
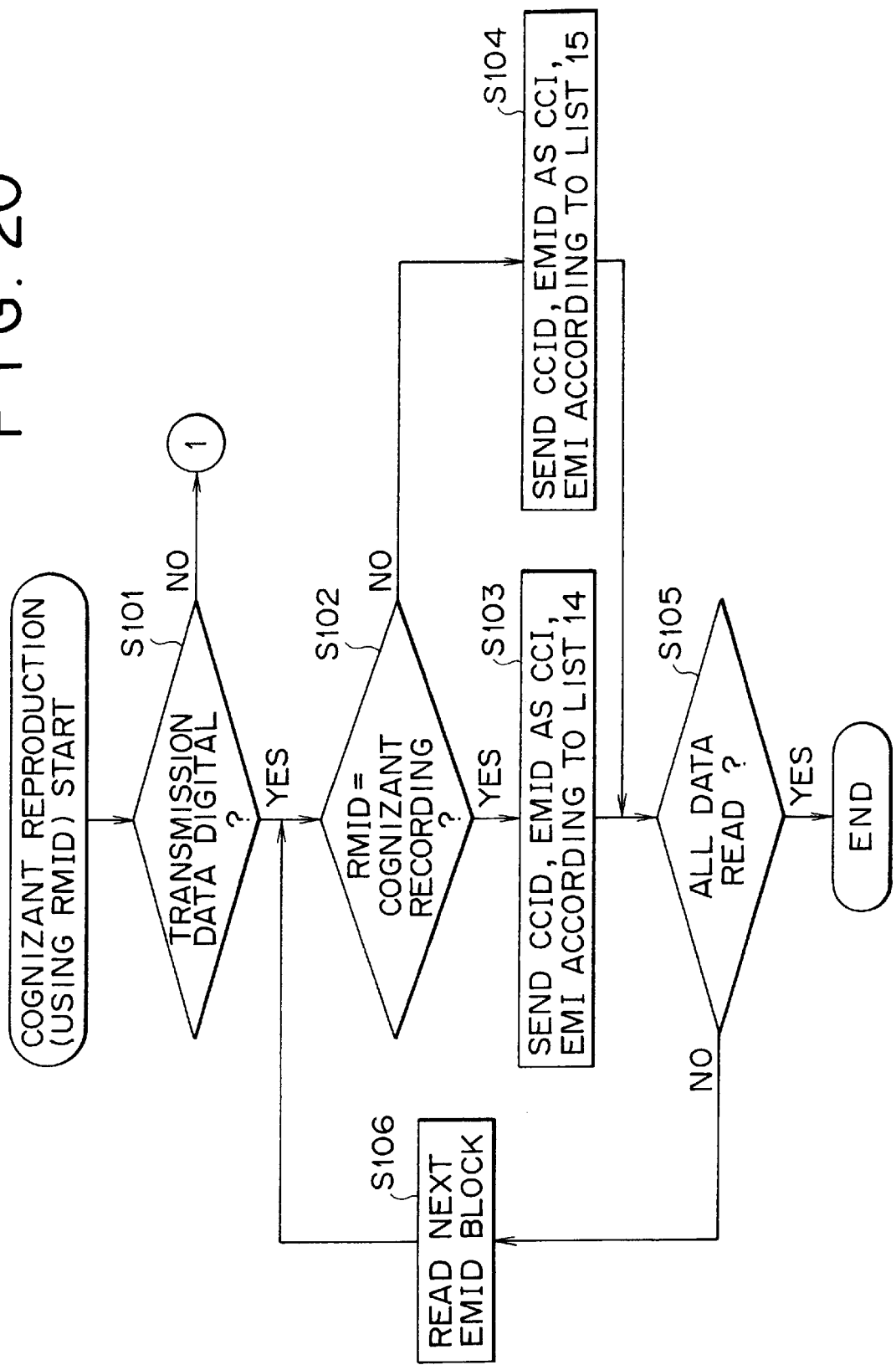
FIG. 20 is a flowchart showing a processing routine of cognizant reproduction executed in the second embodiment.
Figure 21:
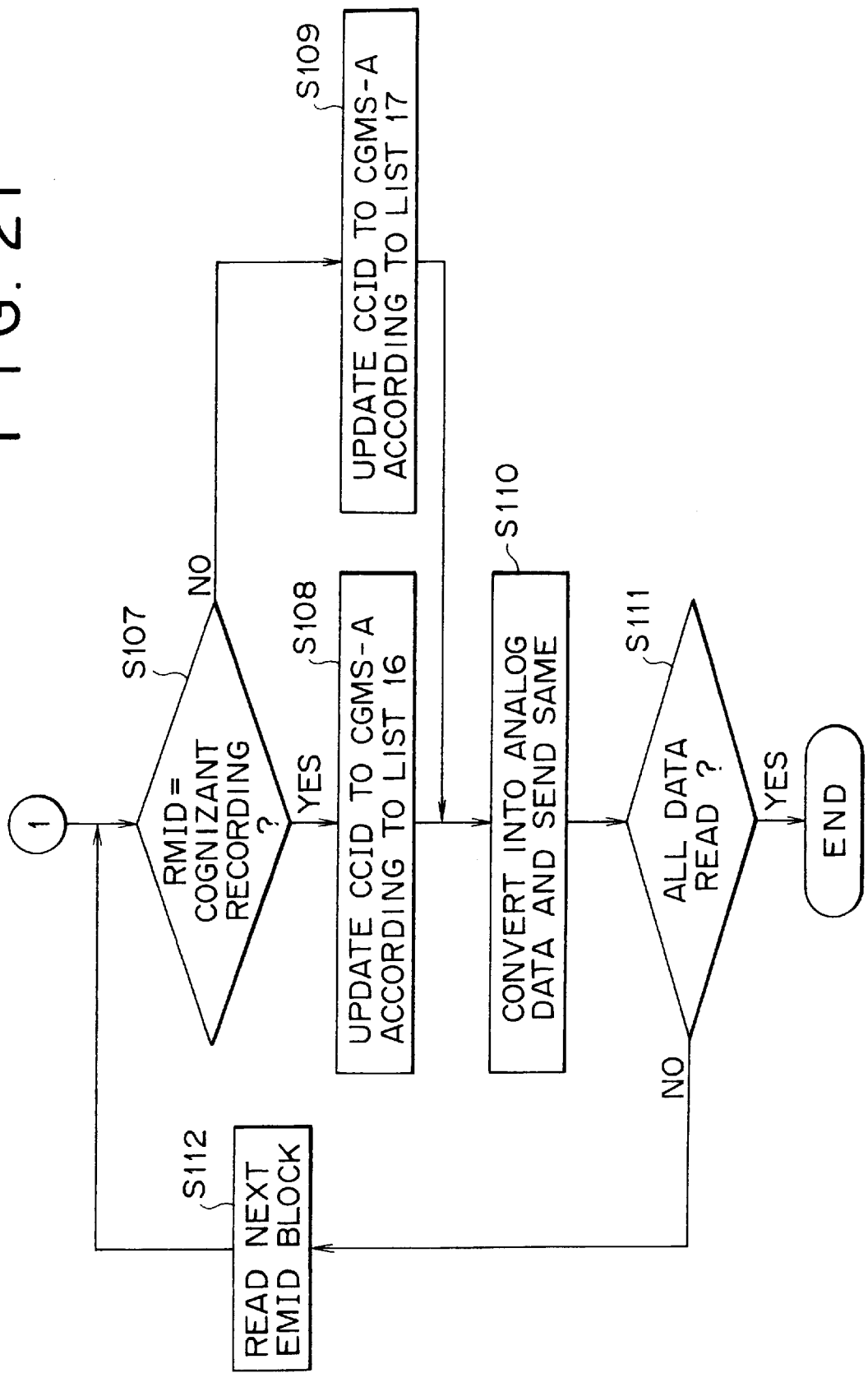
FIG. 21 shows the flowchart continued from FIG. 20.

Flowcharts of FIGS. 20 and 21 show a processing routine executed to perform cognizant reproduction in the second embodiment using RMID. First, a decision is made at step S101 as to whether the data to be reproduced and transmitted from the optical disc 22 is digital data or not. And if the result of this decision signifies that the transmission data is digital one, the operation proceeds to step S102, where RMID recorded in the header of the transmission data is read out therefrom. (This RMID is the one written at step S75 in FIG. 16, step S80 in FIG. 17, or step S95 in FIG. 19.)

A decision is made at step S102 as to whether RMID indicates cognizant recording or not. And if the result of this decision signifies the cognizant recording, the operation proceeds to step S103, where CCID and EMID are updated respectively to CCI and EMI according to List 14 in FIG. 22 and then are sent. The process at this step is fundamentally the same as the process at step S42 in FIG. 10 except that, when CCID/EMID=once/proh on List 14, CCI/EMI are updated to once/proh. More specifically, a prerecorded disc is regarded as a cognizant recorded disc in this embodiment, while a user-recorded disc is regarded as a non-cognizant recorded disc. Therefore, in case the disc contains CCID/EMID=once/proh on List 14, it is regarded as a prerecorded disc, so that CCID and EMID are substantially not updated and are left unchanged as CCI and EMI respectively.

Consequently, the reproduced data obtained from a prerecorded disc is so processed as to have information of CCI/EMI=once/proh as the data reproduced by a cognizant device according to List 9 in FIG. 18, whereby the data is rendered recordable on the disc.

Any other update information on List 14 is the same as that on List 6 in FIG. 11.

Meanwhile, if the result of the decision obtained at step S102 signifies that RMID does not indicate cognizant recording (i.e., if RMID indicates non-cognizant recording), the operation proceeds to step S104, where CCID and EMID are updated to CCI and EMI respectively according to List 15 in FIG. 22 and then are sent.

On List 15, when both of CCID and EMID are free as shown in FIG. 22, CCI and EMI are both set to free. However, when a plurality of different EMID are included in a single output packet, the EMI value is set to the severest EMID value. In the case of CCID/EMID=free/proh, the information is updated as CCI/EMI=free/proh. Further in the case of CCID/EMID=once/proh, the information is updated as CCI/EMI=proh/proh.

In reproducing a cognizant recorded disc, there is no necessity of updating CCI as shown on List 14, so that CCID need not be referred to. Meanwhile, in reproducing a non-cognizant recorded disc, there may be a case where CCI is updated. In such a case, the information is updated with reference to CCID.

After the process at step S103 or S104, the operation proceeds to step S105, where a decision is made as to whether the entire data have been completely read or not. And if the result of this decision signifies that some data are still left unread, the operation proceeds to step S106 to read the next EMID block. Thereafter the operation returns to step S102, and the subsequent process is executed repeatedly. If the result of the decision obtained at step S105 signifies that the entire data have been completely read, the routine for cognizant reproduction is terminated.

Meanwhile, if the result of the decision at step S101 signifies that the transmission data is not digital one (i.e., the data is analog one), the operation proceeds to step S107, where another decision is made as to whether RMID indicates cognizant recording or not. And if the result of this decision signifies that the RMID indicates cognizant recording, the operation proceeds to step S108, where CCID is updated to CGMS-A according to List 16 of FIG. 22 and then the relevant signal is transmitted.

As shown on List 16 of FIG. 22, the update information is fundamentally the same as that on List 7 of FIG. 11. The only difference from List 7 resides in the point that the update information in the case of CCID/EMID=once/proh is set to once. More specifically, in this example where a prerecorded disc is regarded as a cognizant recorded disc as mentioned, the relevant disc is identified as a prerecorded disc in the case of CCID/EMID=once/proh. Therefore, since CGMS-A is updated to once, the reproduced data from the prerecorded disc is regarded as the one with CGMS-A=once on List 11 of FIG. 18, whereby the data is rendered recordable once according to List 11. Thus, the aforementioned second problem can be solved.

If the result of the decision at step S107 signifies that the RMID does not indicate cognizant recording (i.e., if this information indicates non-cognizant recording), the operation proceeds to step S109, where CCID is updated to CGMS-A according to List 17 of FIG. 22 and then is sent.

When the CCID is free as shown on List 17 of FIG. 22, CGMS-A is also set to free. However, when the CCID is once, the CGMS-A is updated to proh.

In the case of CCID/EMID=once/proh on Lists 15 and 17, the relevant disc is regarded not as a prerecorded disc but as a user-recorded disc, so that CCID is updated from once to proh and then is sent. Thus, it becomes possible to prevent illegal copying of the user-recorded disc.

After the processes at steps S108 and S109, the operation proceeds to step S110, where the CPU 29 converts the transmission data into analog data and then sends the same. Since the 1394 serial bus 6 is a digital bus in this case, another bus is connected to the optical disc recorder/reproducer 1.

Next the operation proceeds to step S111, where a decision is made as to whether the entire data have been completely read or not. And if the result of this decision signifies that some data are still left unread, the operation returns to step S112 to read the next EMID block. Thereafter the operation returns to step S107, and the subsequent process is executed repeatedly. In case the result of the decision at step S111 signifies that the entire data have been completely read, the routine for cognizant reproduction is terminated.

At steps S103 and S104 in FIG. 20, CCID and EMID are updated respectively to CCI and EMI according to Lists 14 and 15. In this case of cognizant reproduction, the EMI value is determined with reference to EMID, as shown in FIG. 22. Consequently, when CCID/EMID=free/proh for example, the data to be reproduced essentially without encryption are encrypted actually and outputted due to EMI=proh. And the data thus encrypted cannot be reproduced by a non-cognizant device. In view of this problem, the EMI value may be determined with reference to CCID as well. In this case, some update information on Lists 14 and 15 are partially modified as shown in FIG. 23.

In the example of FIG. 23, EMI is determined correspondingly to CCID.

However, since CCID is disposed in the data, a time is required for detecting the same. Meanwhile, when referring to EMID which is disposed in the header as shown in FIG. 22, it can be detected with facility and therefore a fast process can be ensured.

Figure 24:
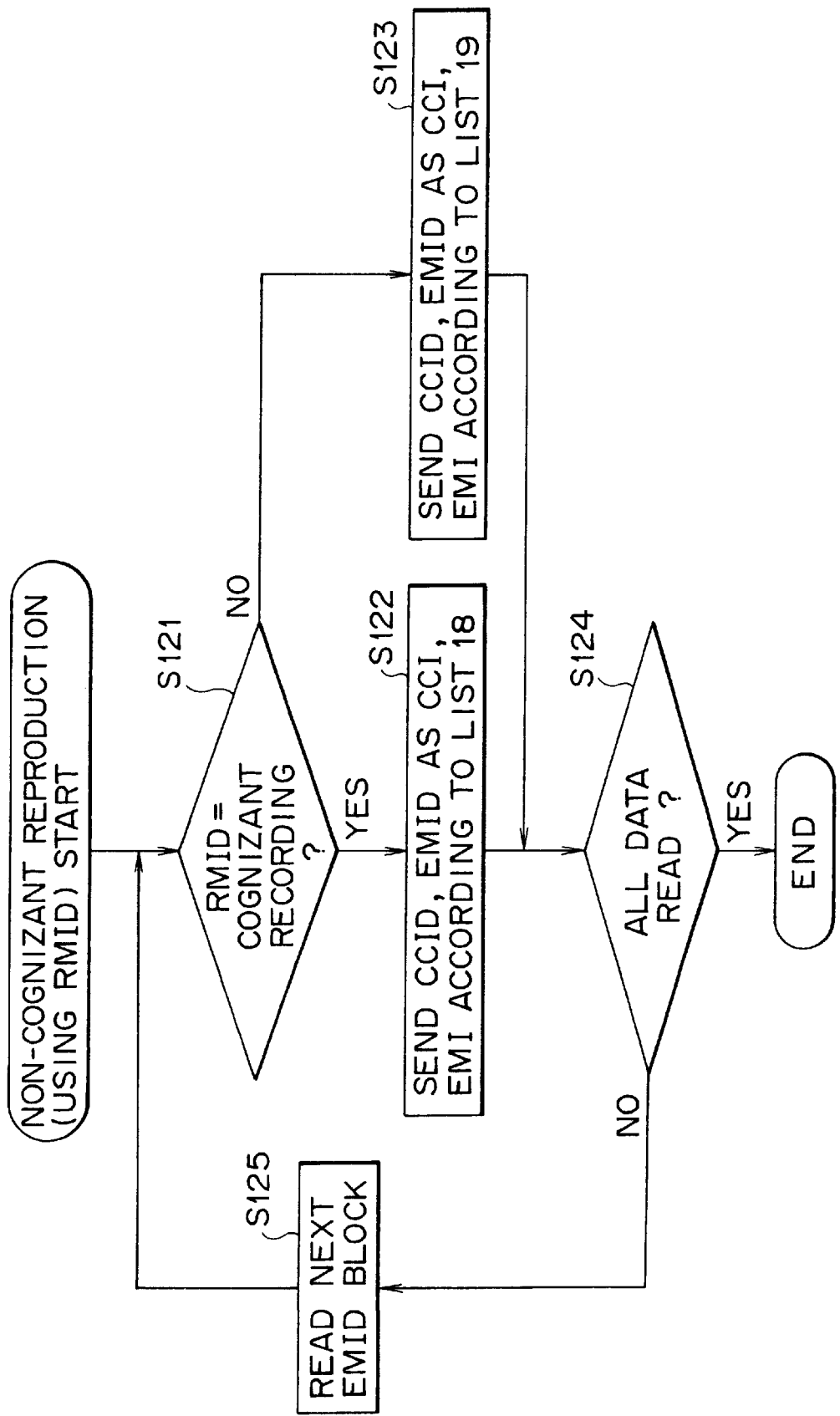
FIG. 24 is a flowchart showing a processing routine of non-cognizant reproduction executed in the second embodiment.

FIG. 24 shows a processing routine executed to perform non-cognizant reproduction in the second embodiment using RMID. First, a decision is made at step S121 as to whether RMID indicates cognizant recording or not. And if the result of this decision signifies that RMID indicates cognizant recording, CCID and EMID are updated respectively to CCI and EMI according to List 18 in FIG. 22 and then are sent. The update information on List 18 is substantially the same as the update information on List 8 in FIG. 11.

If the result of the decision at step S121 signifies that the RMID relative to the data to be reproduced and sent does not indicate cognizant recording (i.e., if the information indicates non-cognizant recording), the operation proceeds to step S123, where CCID and EMID are updated respectively to CCI and EMI according to List 19 in FIG. 22 and then are sent.

When a combination of CCID/EMID is any of free/free, free/proh or once/proh as shown on List 19 in FIG. 22, the combination is set substantially as it is to CCI/EMI.

After the processes at steps S122 and S123, the operation proceeds to step S124, where a decision is made as to whether the entire data have been completely read or not. And if the result of this decision signifies that some data are still left unread, the operation proceeds to step S125 to read the next EMID block. Further the operation returns to step S121, and the subsequent process is executed repeatedly. In case the result of the decision at step S124 signifies that the entire data have been completely read, the routine for non-cognizant reproduction is terminated.

Referring now to FIGS. 25–32, an explanation will be given on a third embodiment where, in recording and reproduction modes, cognizant and non-cognizant recording/reproduction using RMID are performed in a mutually corresponding state, i.e., any disc recorded in a cognizant (or non-cognizant) recording mode is reproduced in a cognizant (or non-cognizant) reproduction mode. Due to such improvement, both of the first and second problems in the aforementioned first embodiment can be solved. And even though the disc is the one managed by another system different from the present system, there never occurs an undesired situation where its flag indicating prohibition of copy is changed to a copy approval flag.

Figure 25:
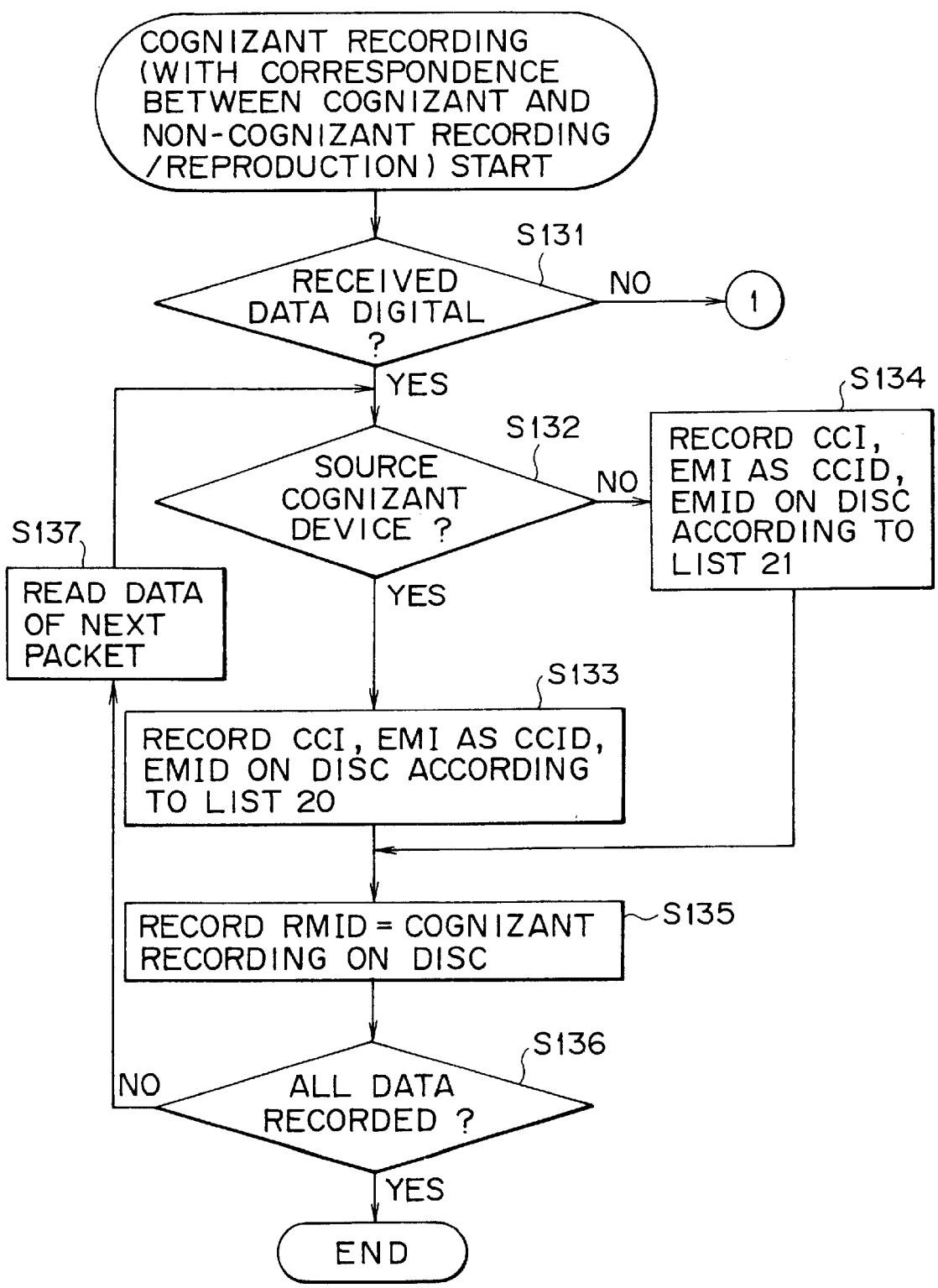
FIG. 25 is a flowchart showing a processing routine of cognizant recording executed in a third embodiment.
Figure 26:
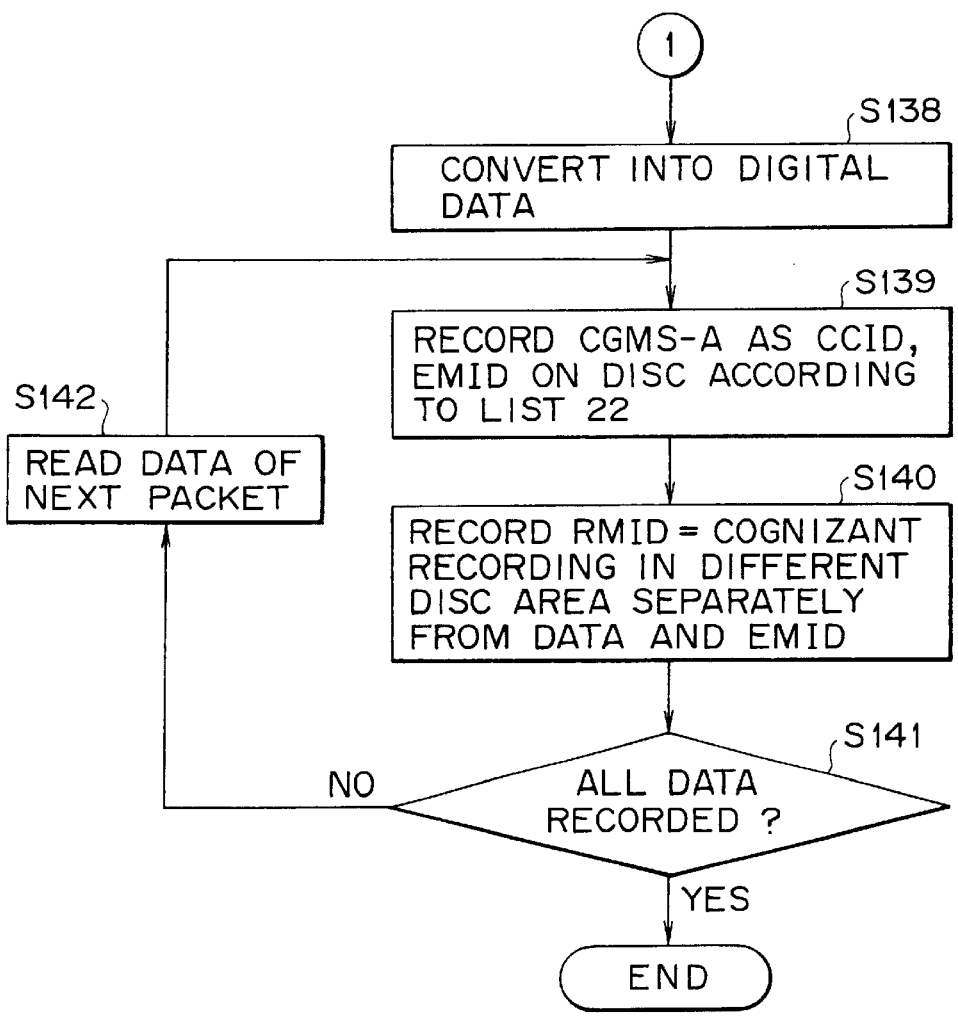
FIG. 26 shows the flowchart continued from FIG. 25.

FIGS. 25 and 26 show a processing routine for cognizant recording. The processes at steps S131–S142 in FIGS. 25 and 26 are fundamentally the same as those executed at steps S71–S82 in FIGS. 16 and 17 to perform cognizant recording by the use of RMID. However, differences reside in the points that List 9 at step S73, List 10 at step S74 and List 11 at step S79 are replaced with List 20 at step S133, List 21 at step S134 and List 22 at step S139, respectively. Lists 20–22 are shown in Table 5 of FIG. 27.

Lists 20–22 are substantially the same as Lists 1–3 (Lists 9–11).

However, although RMID is used in a system according to Table 3 of FIG. 18 for example, none of mutual correspondence is taken between cognizant and non-cognizant in recording and reproduction modes. Consequently, with regard to data including CCI/EMI=once/proh shown on List 10, it is impossible to detect the difference between data reproduced from a prerecorded disc and data reproduced from a user-recorded disc. In both cases, therefore, cognizant recording is prohibited according to List 10 in the example of Table 3.

Contrary to the above, in the system according to Table 5 of FIG. 27, a relationship of mutual correspondence is held between cognizant and non-cognizant in recording and reproduction modes. Consequently, a flag indicative of cognizant recording is raised in the case of a prerecorded disc due to its RMID, whereby cognizant reproduction is performed with certainty. Therefore, as will be described later with reference to Table 6 of FIG. 31, when cognizant reproduction is performed relative to a prerecorded disc manufactured in a cognizant recording mode with CCID/EMID=once/proh, then CCI/EMI are set directly to once/proh as they are. As the result, the relevant data are processed as in a case of CCI/EMI=once/proh on List 20 of FIG. 27, whereby the data recording is rendered possible.

Consequently, a combination of CCI/EMI=once/proh on List 21 is limited merely to a disc which does not belong to this system. Presuming that such a disc has not been copied even once, when CCI/EMI are once/proh, recording of the reproduced data obtained from this disc is prohibited according to List 21.

A disc for VDR is never reproduced in a non-cognizant mode, so that upon reception of any data including CCI/EMI=once/proh from a non-cognizant device, the received data is supposed to be the one reproduced from some other recording medium than VDR. Thus, the reproduced data is regarded as that from a recording medium irrelevant to this system, and even if the data is such that its copy is essentially to be approved once, copy thereof is prohibited according to List 21.

When a combination of CCI/EMI is free/once or once/once, it signifies that the reproduced data is the one obtained from a prerecorded disc. This reproduced data can be recorded with the information thereof updated according to List 21.

FIG. 28 is a flowchart showing a processing routine of non-cognizant recording executed in the third embodiment to attain, with the use of RMID, mutual correspondence between cognizant and non-cognizant in recording and reproduction modes. Processes at steps S151–S158 are fundamentally the same as those executed for non-cognizant recording in the second embodiment where, although the RMID shown in FIG. 19 is used, a relationship of mutual correspondence is not held between cognizant and non-cognizant in the recording and reproduction modes.

However, List 12 at step S93 and List 13 at step S94 in FIG. 19 are replaced with List 23 at step S153 and List 24 at step S154 in FIG. 28, respectively. The other processes are the same as those in FIG. 19.

Lists 23 and 24 are shown in Table 5 of FIG. 27. These Lists 23 and 24 are substantially the same as List 4 in FIG. 5 (List 12 in FIG. 18), and List 24 is substantially the same as List 5 in FIG. 5 (List 13 in FIG. 18).

Figure 29:
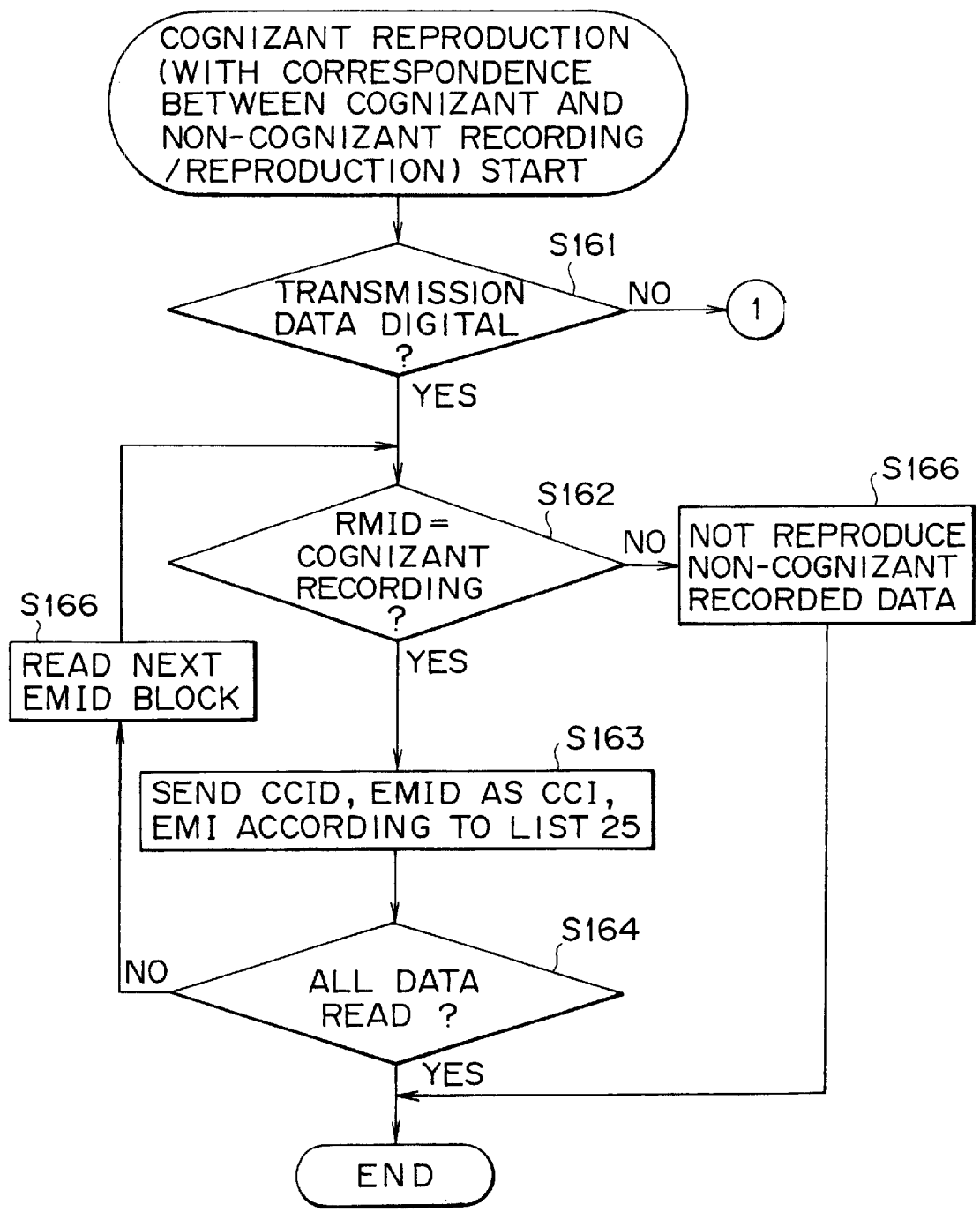
FIG. 29 is a flowchart showing a processing routine of cognizant reproduction executed in the third embodiment.
Figure 30:
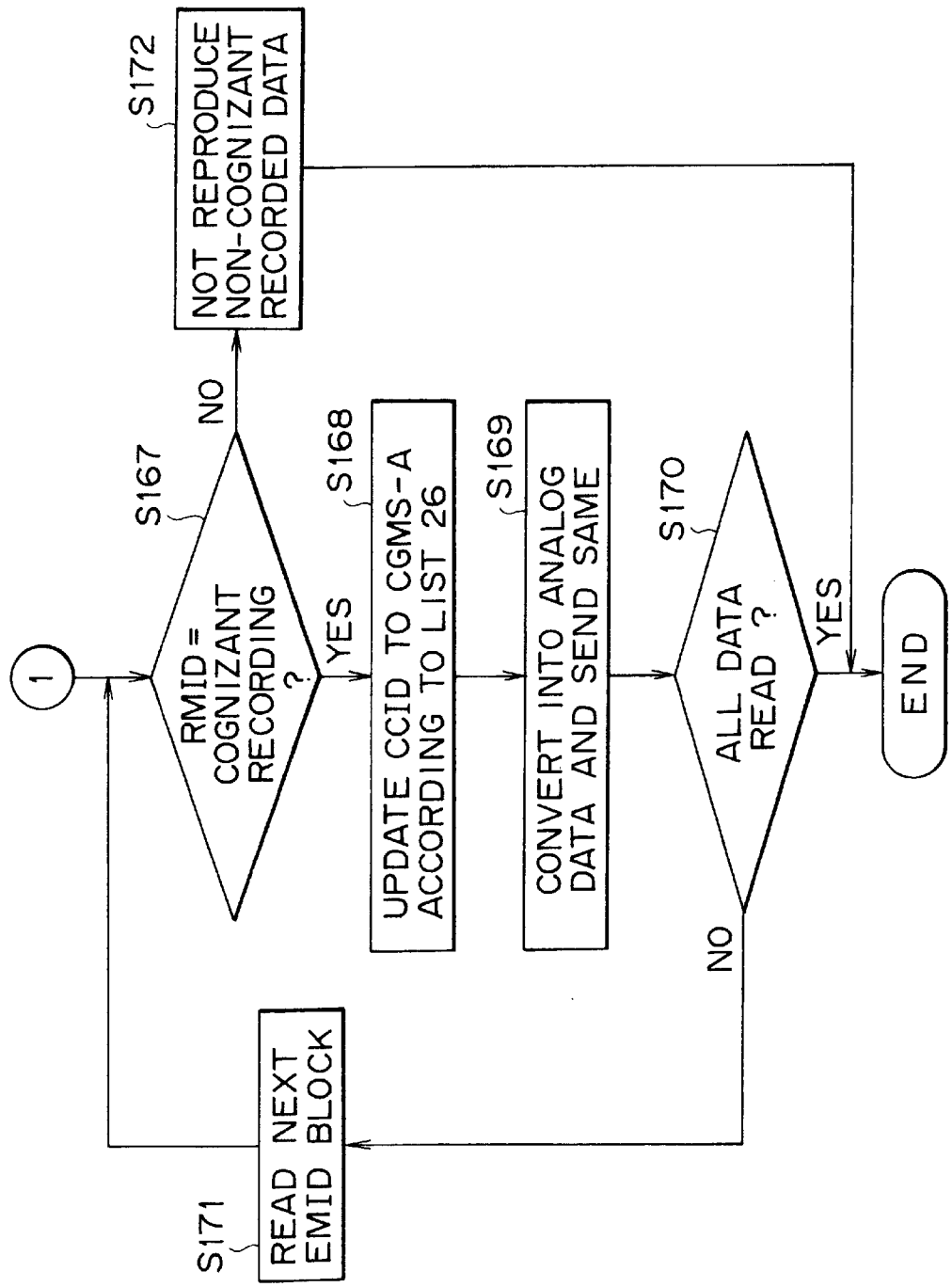
FIG. 30 shows the flowchart continued from FIG. 29.

FIGS. 29 and 30 are flowcharts showing a processing routine of cognizant reproduction executed in the third embodiment where, with the use of RMID, a relationship of mutual correspondence is held between cognizant and non-cognizant in the recording and reproduction modes. Processes at steps S161–S172 are fundamentally the same as those at steps S101–S112 in the second embodiment where, with the use of RMID shown in FIGS. 20 and 21, a relationship of mutual correspondence is not held between cognizant and non-cognizant in the recording and reproduction modes. In the example of FIGS. 20 and 21, if the result of the decision obtained at step S102 or S107 signifies that RMID does not indicate cognizant recording, then CCID and EMID are updated to CCI and EMI respectively according to List 15 or 17 at step S104 or S109. However, in the example of FIGS. 29 and 30, if the result of the decision obtained at step S162 or S167 signifies that RMID does not indicate cognizant recording, a process of not reproducing the non-cognizant recorded data is executed at step S166 or S172.

Further at steps S163 and S168, an updating process is executed according to List 25 or 26. The other processes are the same as those in FIGS. 20 and 21.

Lists 25 and 26 are shown in Table 6 of FIG. 31. List 25 is substantially the same as List 14 in FIG. 22, and List 26 is substantially the same as List 16 in FIG. 22. As shown in Table 6, the data identified as cognizant-recorded data according to RMID is prohibited from being reproduced in a non-cognizant mode. That is, any list corresponding to List 18 in FIG. 22 is not provided in Table 6, hence solving the first and second problems in the first embodiment.

FIG. 32 is a flowchart showing a processing routine of non-cognizant reproduction executed in the third embodiment where, with the use of RMID, a relationship of mutual correspondence is held between cognizant and non-cognizant in recording and reproduction modes. Processes at steps S181–S185 are fundamentally the same as those at steps S121–S125 executed for non-cognizant reproduction in the second embodiment where, although the RMID shown in FIG. 24 is used, a relationship of mutual correspondence is not held between cognizant and non-cognizant in the recording and reproduction modes. In FIG. 24, if the result of the decision obtained at step S121 signifies that RMID does not indicate cognizant recording, an updating process is executed at step S123 according to List 19. However, in the example of FIG. 32, if the result of the decision obtained at step S181 signifies that RMID indicates cognizant recording, the operation proceeds to step S185 to prohibit reproduction of the cognizant-recorded data.

In case RMID does not indicate cognizant recording (i.e., non-cognizant recording), CCID and EMID are updated to CCI and EMI respectively at step S182 according to List 27 and then are sent.

The other processes are the same as those in FIG. 24.

List 27 is shown in FIG. 31. This List 27 is fundamentally the same as List 19 in FIG. 22.

As shown in Table 6 of FIG. 31, cognizant reproduction of non-cognizant recorded data is prohibited.

Thus, it is prohibited to perform cognizant reproduction of any non-cognizant recorded data including a combination of CCID/EMID=once/proh, so that the aforementioned first and second problems in the first embodiment can be solved.

Next, referring to FIGS. 33–45, an explanation will be given on a fourth embodiment where, with the use of RMID, there is also used a prerec flag which represents a prerecorded disc.

Figure 33:
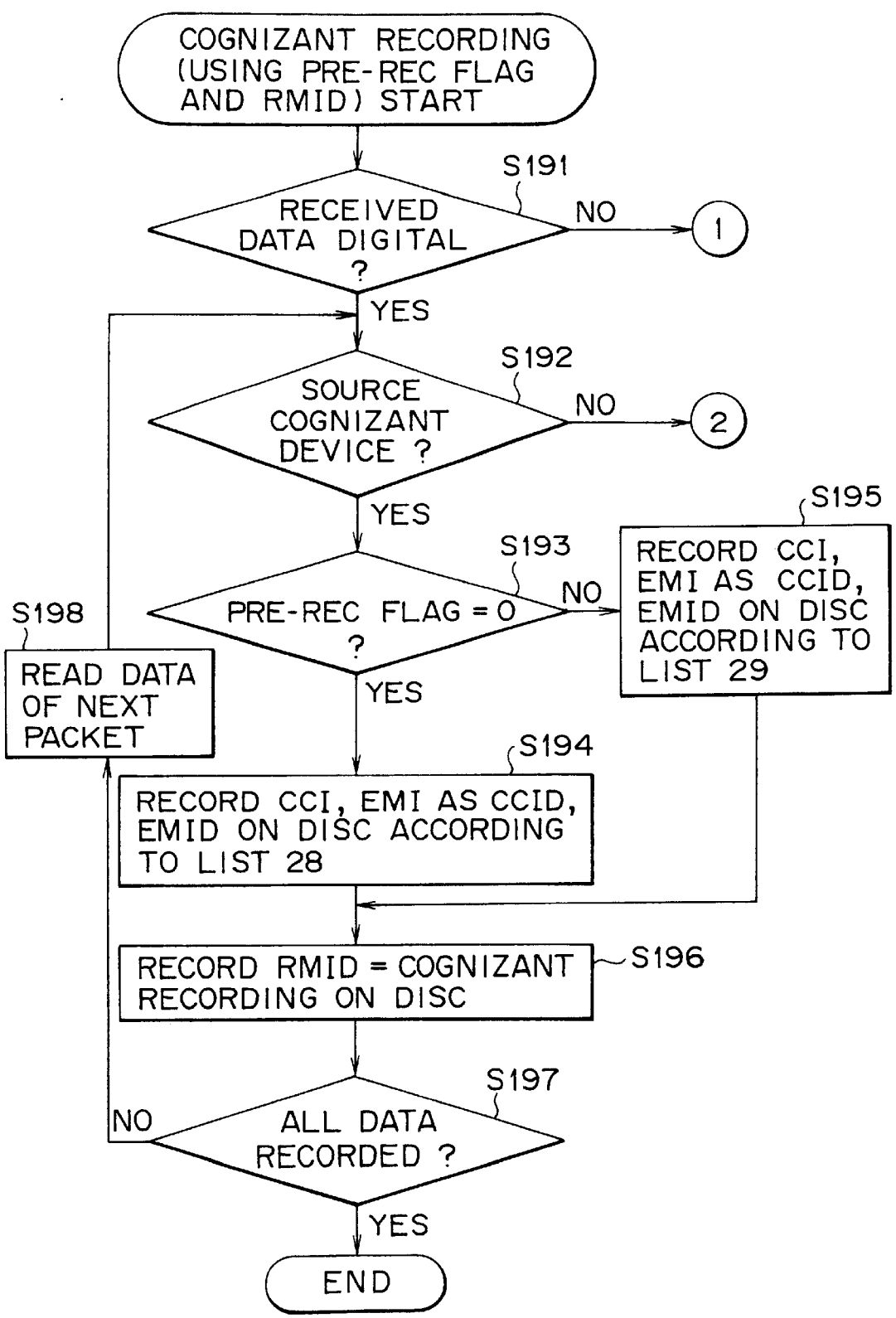
FIG. 33 is a flowchart showing a processing routine of cognizant recording executed in a fourth embodiment.
Figure 34:
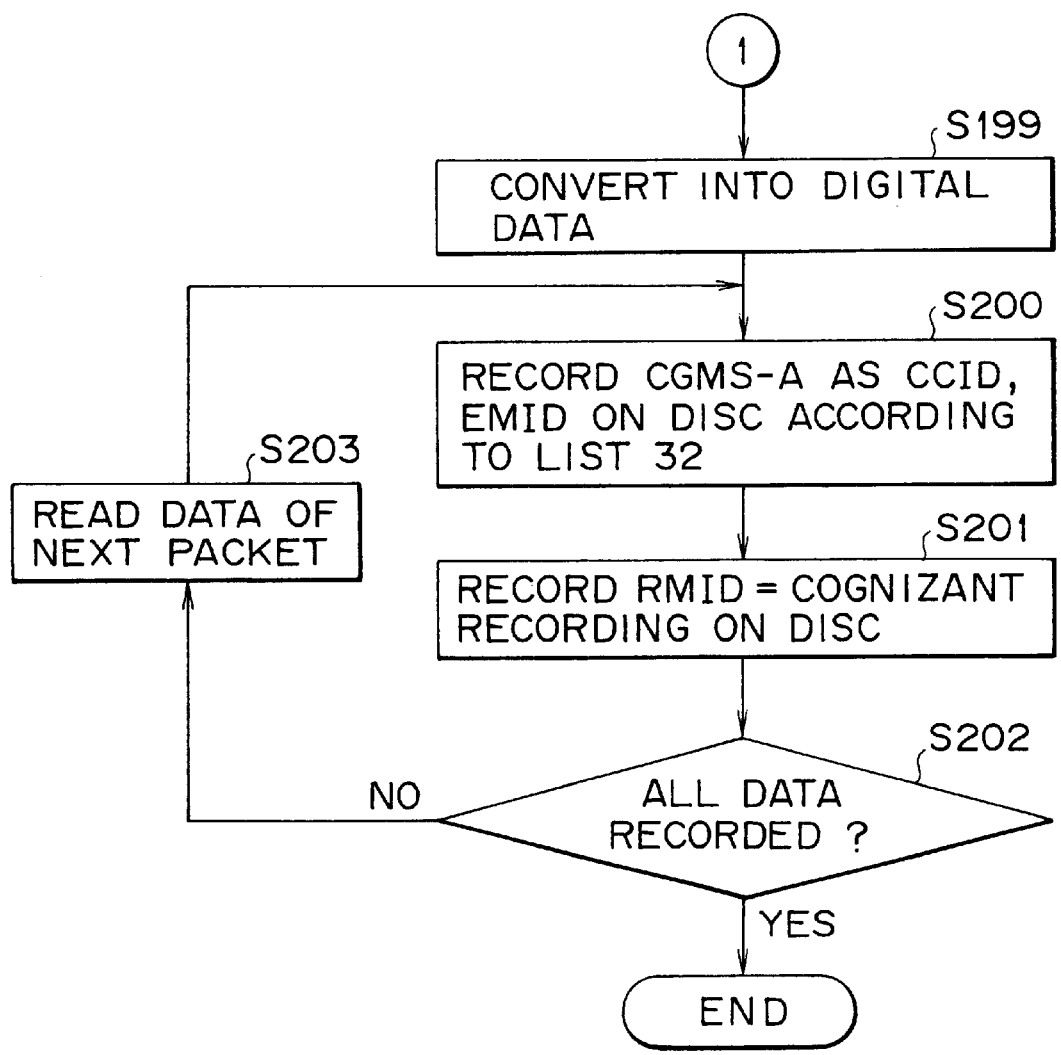
FIG. 34 shows the flowchart continued from FIG. 33.
Figure 35:
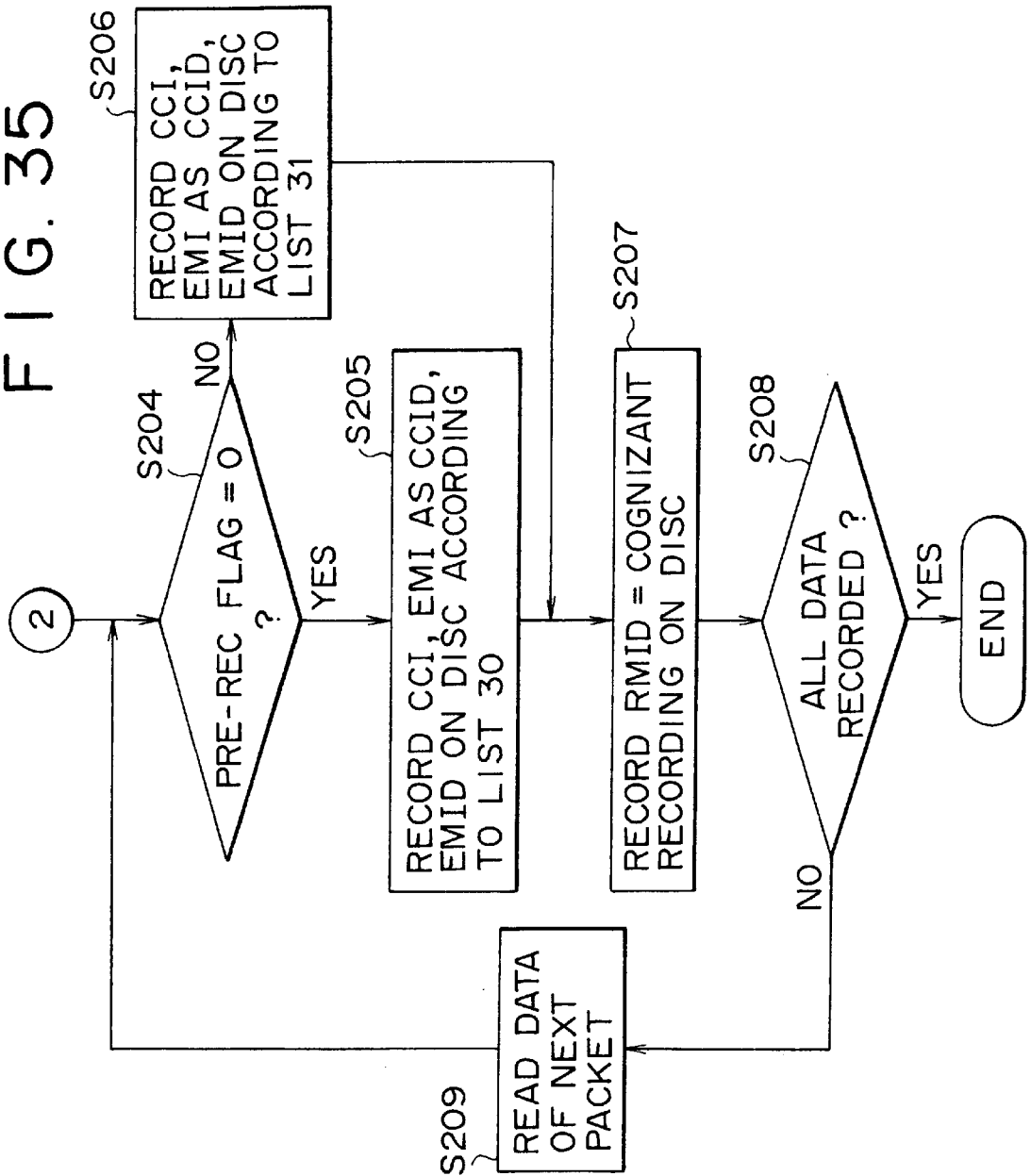
FIG. 35 shows the flowchart continued from FIG. 33.

FIGS. 33–35 show a processing routine of cognizant recording executed in the fourth embodiment. First at step S191, a decision is made as to whether the received data to be recorded is digital data or not. And in the case of digital data, another decision is made at step S192 as to whether the data transmission source is a cognizant device or not. If the result of this decision signifies that the source is a cognizant device, a decision is made at step S193 as to whether a prerec flag included in the received data is 0 or not. In this example, when the relevant disc is identified as a prerecorded disc at steps S243, S245, S246 in FIG. 39 or at steps S262, S264, S265 in FIG. 40 as will be described later, a prerec flag=1 is recorded in the header of an isochronous packet. Meanwhile, in any disc other than a prerecorded disc, a prerec flag=0 is recorded. Therefore, the decision at step S193 can be achieved by detecting this flag from the received data.

If the result of the decision at step S193 signifies that the prerec flag is 0 (i.e., when the reproduced data is the one obtained from any disc other than a prerecorded disc), then the operation proceeds to step S194, where CCI and EMI are updated to CCID and EMID respectively according to List 28 and then are recorded on the disc.

Meanwhile, if the result of the decision at step S193 signifies that the prerec flag is not 0 (i.e., the prerec flag is 1 to indicate the data reproduced from a prerecorded disc), the operation proceeds to step S195, where CCI and EMI are updated to CCID and EMID respectively according to List 29 and then are recorded on the disc. Lists 28 and 29 are shown in Table 7 of FIG. 36.

After the processes at steps S194 and S195, the operation proceeds to step S196, where RMID=cognizant recording is recorded on the disc. Then at step S197, a decision is made as to whether the entire data have been completely recorded or not. And if the result of this decision signifies that some data are still left unrecorded, the operation proceeds to step S198 to read the data of the next packet. Thereafter the operation returns to step S192, and the subsequent process is executed repeatedly.

If the result of the decision obtained at step S197 signifies that the entire data have been completely recorded, the routine of cognizant recording is terminated.

In case the result of the decision at step S192 signifies that the source is not a cognizant device, the operation proceeds to step S204, where another decision is made as to whether the prerec flag is 0 or not. And if the result of this decision signifies that this flag is 0 (which indicates that the reproduced data is the one obtained from some other disc than a prerecorded disc), the operation proceeds to step S205, where CCI and EMI are updated to CCID and EMID respectively according to List 30 and then are recorded on the disc. Meanwhile, if the result of the decision at step S204 signifies that the prerec flag is not 0 (i.e., when this flag is 1 to indicate that the reproduced data is the one obtained from a prerecorded disc), the operation proceeds to step S206, where CCI and EMI are updated to CCID and EMID respectively according to List 31 and then are recorded on the disc.

After the process at step S205 or S206, the operation proceeds to step S207, where RMID=cognizant recording is recorded on the disc.

Further at step S208, a decision is made as to whether the entire data have been completely recorded or not. And if the result of this decision signifies that some other data are still left unrecorded, the operation proceeds to step S209 to read the data of the next packet. Thereafter the operation returns to step S204, and the subsequent process is executed repeatedly.

If the result of the decision at step S208 signifies that the entire data have been completely recorded, the routine of cognizant recording is terminated.

Meanwhile, in case the result of the decision at step S191 signifies that the received data is not digital data (i.e., analog data), the operation proceeds to step S199 to execute a process of converting the received data into digital data. Subsequently at step S200, CGMS-A is updated to CCID or EMID according to List 32 and then is recorded on the disc. List 32 is shown in FIG. 36.

Thereafter the operation proceeds to step S201, where RMID=cognizant recording is recorded on the disc. Then a decision is made at step S202 as to whether the entire data have been completely recorded or not. And if the result of this decision signifies that some data are still left unrecorded, the operation proceeds to step S203 to read the data of the next packet. Then the operation returns to step S202, and the subsequent process is executed repeatedly. Meanwhile, in case the result of the decision at st S202 signifies that the entire data have been completely recorded, the routine of cognizant recording is terminated.

List 28 and List 29 are mutually the same as shown in FIG. 36, and each of them is the same as List 1 in FIG. 5 (List 9 in FIG. 18). Each of Lists 33 and 34 is the same as List 4 in FIG. 5 (List 12 in FIG. 18).

List 30 and List 35 are the same as List 2 and List 5 respectively with the exception that there is no combination of CCID/EMID=free/once or=once/once.

List 31 is the same as List 2 with the exception that, when CCI/EMI=once/proh, CCID/EMID are updated to proh/proh. On List 2, recording in this combination is prohibited.

List 36 is the same as List 5. And List 32 is the same as List 3.

Thus, due to the use of a prerec flag as shown in Table 7, the first and second problems observed in the first embodiment can be solved without the necessity of holding a relationship of mutual correspondence between cognizant and non-cognizant in recording and reproduction modes, differently from the third embodiment.

FIGS. 37 and 38 are flowcharts showing a processing routine of non-cognizant recording in the fourth embodiment. First at step S221, a decision is made as to whether the received data is digital data or not. And in the case of digital data, the operation proceeds to step S222, where another decision is made as to whether the source is a cognizant device or not. If the result of this decision signifies that the source is a cognizant device, the operation proceeds to step S223, where a decision is made as to whether a prerec flag is 0 or not. And if the result of this decision signifies that the prerec flag is 0 (i.e., when the received data is not the one reproduced from a prerecorded disc), then the operation proceeds to step S224, where CCI and EMI are updated to CCID and EMID respectively according to List 33 and then are recorded on the disc. List 33 is shown in FIG. 36.

Meanwhile, if the result of the decision at step S223 signifies that the prerec flag is not 0 (i.e., when the received data is the one reproduced from a prerecorded disc), the operation proceeds to step S225, where CCI and EMI are updated to CCID and EMID respectively according to List 34 and then are recorded on the disc. List 34 is shown in FIG. 36.

After the process at step S224 or S225, the operation proceeds to step S226. where RMID=non-cognizant recording is recorded on the disc.

Next the operation proceeds to step S227, where a decision is made as to whether the entire data have been completely recorded or not. And if the result of this decision signifies that some data are still left unrecorded, the operation proceeds to step S228 to read the data of the next packet. Thereafter the operation returns to step S222, and the subsequent process is executed repeatedly. Meanwhile, if the result of the decision obtained at step S227 signifies that the entire data have been completely recorded, the routine of non-cognizant recording is terminated.

In case the result of the decision at step S222 signifies that the source is not a cognizant device, the operation proceeds to step S230, where another decision is made as to whether the prerec flag is 0 or not. And if the result of this decision signifies that the flag is 0 (which indicates that the reproduced data is not the one obtained from a prerecorded disc), the operation proceeds to step S231, where CCI and EMI are updated to CCID and EMID respectively according to List 35 and then are recorded on the disc. List 35 is shown in FIG. 36.

Meanwhile, if the result of the decision at step S230 signifies that the prerec flag is not 0 (which indicates that the reproduced data is the one obtained from a prerecorded disc), the operation proceeds to step S232, where CCI and EMI are updated to CCID and EMID respectively according to List 36 and then are recorded on the disc.

After the process at step S231 or S232, the operation proceeds to step S233, where RMID=non-cognizant recording is recorded on the disc. At step S234, a decision is made as to whether the entire data have been completely recorded or not. And if the result of this decision signifies that some other data are still left unrecorded, the operation proceeds to step S235 to read the data of the next packet. Thereafter the operation returns to step S230, and the subsequent process is executed repeatedly. In case the result of the decision at step S234 signifies that the entire data have been completely recorded, the routine of non-cognizant recording is terminated.

Meanwhile, if the result of the decision at step S221 signifies that the received data is not digital data (i.e., analog data), the operation proceeds to step S229 to execute a process of prohibiting recording of the analog data.

Figure 39:
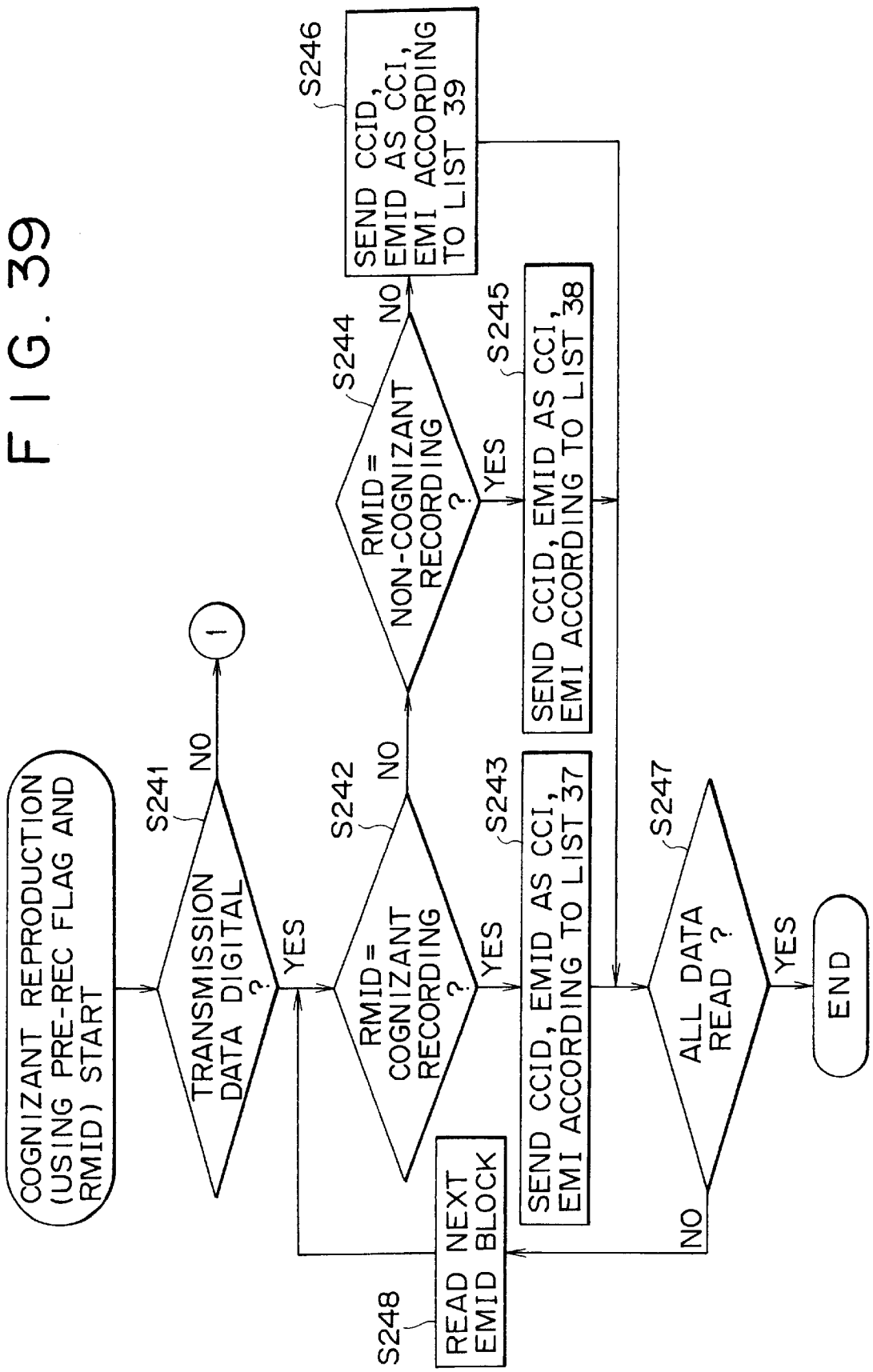
FIG. 39 is a flowchart showing a processing routine of cognizant reproduction executed in the fourth embodiment.
Figure 40:
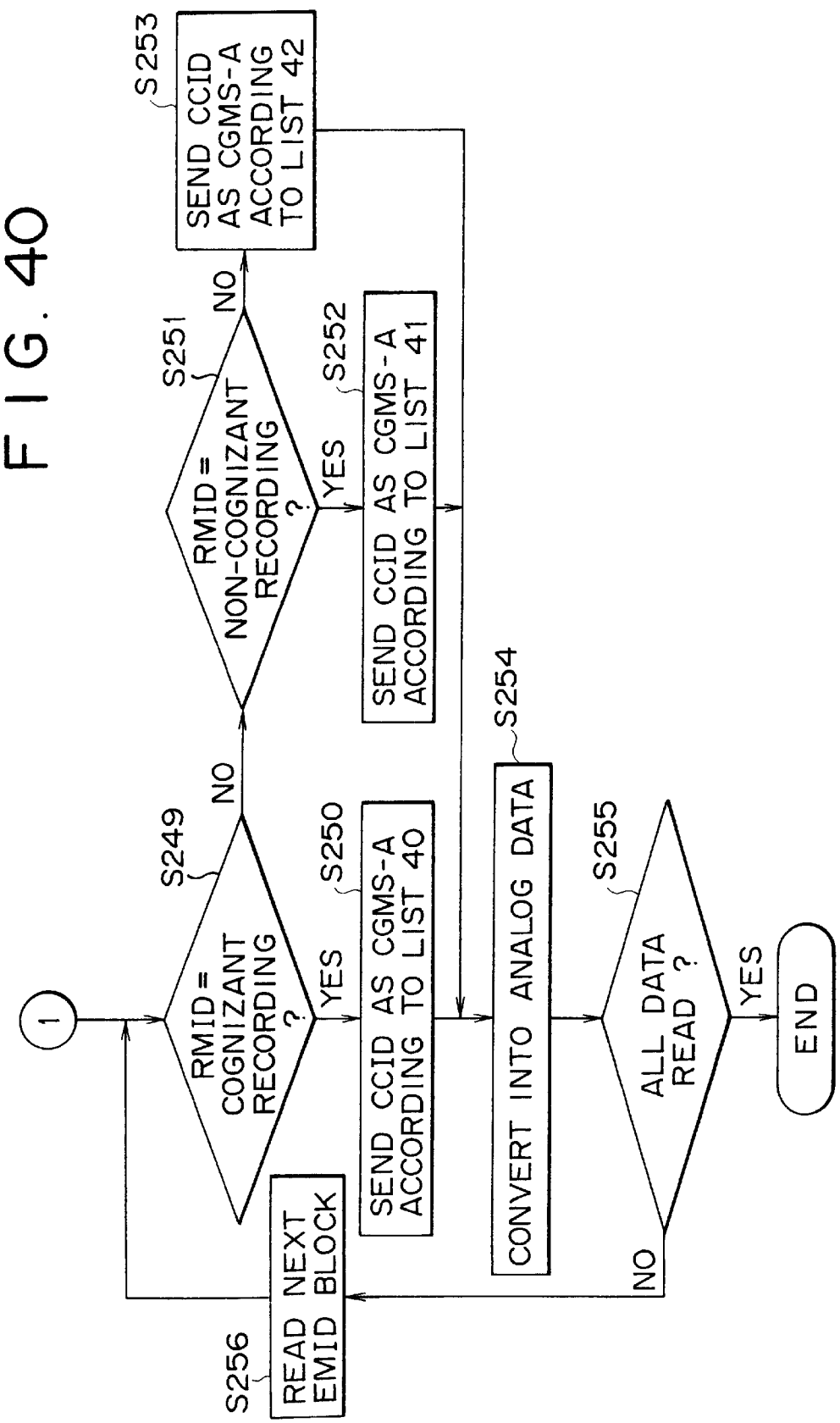
FIG. 40 shows the flowchart continued from FIG. 39.

Referring now to flowcharts of FIGS. 39 and 40, an explanation will be given on a processing routine of cognizant reproduction executed in the fourth embodiment. First at step S241, a decision is made as to whether the transmission data is digital data or not. And in the case of digital data, the operation proceeds to step S242, where another decision is made as to whether RMID indicates cognizant recording or not. And if the result of this decision signifies that RMID indicates cognizant recording (i.e., in the case of cognizant-recorded data), the operation proceeds to step S243, where CCID and EMID are updated to CCI and EMI respectively according to List 37 and then are sent. List 37 is shown in FIG. 41.

Meanwhile, if the result of the decision at step S242 signifies that RMID does not indicate cognizant recording, the operation proceeds to step S244, where a decision is made as to whether RMID=non-cognizant recording or not. And if the result of this decision signifies that RMID indicates non-cognizant recording (i.e., when the reproduced data is non-cognizant recorded data), the operation proceeds to step S245, where CCID and EMID are updated to CCI and EMI respectively according to List 38 and then are sent. List 38 is shown in FIG. 41.

In case the result of the decision at step S244 signifies that RMID does not indicate non-cognizant recording either (i.e., in this embodiment, RMID=prerecorded disc is recorded on a prerecorded disc, so that if the result of the decision obtained at steps S242 and S244 signifies that RMID indicates neither cognizant recording nor non-cognizant recording, it follows therefrom that RMID=prerecorded disc), then the operation proceeds to step S246, where CCID and EMID are updated to CCI and EMI respectively according to List 39 and then are sent.

Figure 42:
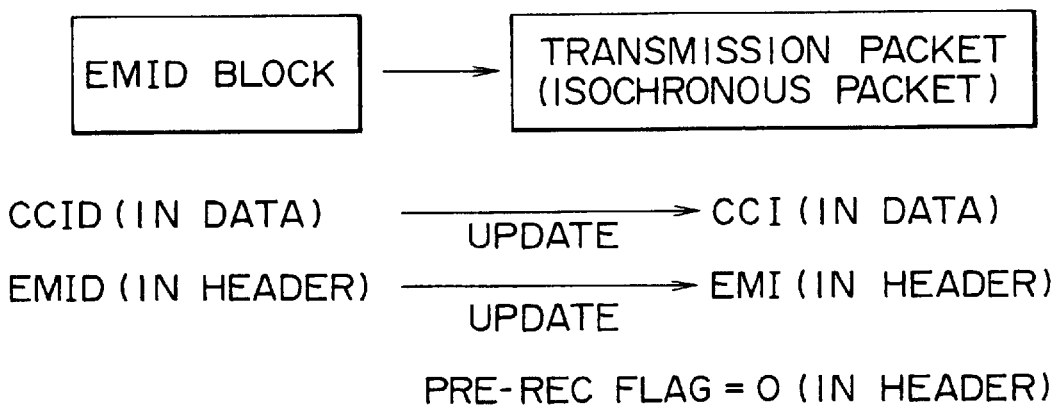
FIG. 42 is a diagram for explaining the process at step S243 in FIG. 39.

FIG. 42 shows how the process at step S243 is executed. As shown in FIG. 42, one EMID block is formed per transmission packet, and CCID included in the data of the EMID block is updated to CCI according to List 37 and then is disposed in the data of the transmission packet. Meanwhile, EMID positioned in the header of the EMID block is updated to EMI according to List 37 and then is disposed in the header of the transmission packet. This transmission packet is formed into a single isochronous packet and then is transmitted. At this time, a prerec flag=0 is disposed in the header of the isochronous packet and then is transmitted.

A similar process is executed also at step S245 or S246 with the exception that the prerec flag is set to 1 at step S246.

After the process at step S243, S245 or S246, the operation proceeds to step S247, where a decision is made as to whether the entire data have been completely read or not. And if the result of this decision signifies that some unread data are still existent, the operation proceeds to step S248 to read the data of the next EMID block. Then the operation returns to step S242, and the subsequent process is executed repeatedly. In case the result of the decision at step S247 signifies that the entire data have been completely read, the routine of cognizant recording is terminated.

If the result of the decision at step S241 signifies that the transmission data is not digital one (i.e., analog data), the operation proceeds to step S249, where a decision is made as to whether RMID indicates cognizant recording or not. And if the result of this decision signifies that RMID indicates cognizant recording, the operation proceeds to step S250, where CCID is updated to CGMS-A according to List 40 and then is sent. List 40 is shown in FIG. 41.

In case the result of the decision at step S249 signifies that RMID does not indicate cognizant recording, the operation proceeds to step S251, where another decision is made as to whether RMID indicates non-cognizant recording or not. And if the result of this decision signifies that RMID indicates non-cognizant recording, the operation proceeds to step S252, where CCID is updated to CGMS-A according to List 41 and then is sent.

In case the result of the decision at step S251 signifies that RMID does not indicate non-cognizant recording either, the operation proceeds to step S253, where CCID is updated to CGMS-A according to List 42 and then is sent.

After the process at step S250, S252 or S253, the operation proceeds to step S254 to convert the data into analog one. At step S255, a decision is made as to whether the entire data have been completely read or not, and if the result of this decision signifies that some data are still left unread, the operation proceeds to step S256 to read the data of the next EMID block. Then the operation returns to step S249, and the subsequent process is executed repeatedly. In case the result of the decision at step S255 signifies that the entire data have been completely read, the routine of cognizant reproduction is terminated.

As shown in FIG. 41, List 37 is the same as List 6 in FIG. 11 (List 14 in FIG. 22), List 40 is the same as List 7 in FIG. 11 (List 16 in FIG. 22), and List 43 is the same as List 8 in FIG. 11 (List 18 in FIG. 22), respectively, with the exception that there is no combination of CCID/EMID=free/once, once/once or once/proh.

Lists 38, 41 and 44 are the same as Lists 15, 17 and 19 in FIG. 22, respectively.

List 39 is the same as List 6 except that, when CCID/EMID=once/proh, CCI/EMI are updated to once/proh. List 42 is the same as List 7 except that, when CCID/EMID=once/proh, CGMS-A is updated to once. Further, List 45 is the same as List 8.

Figure 43:
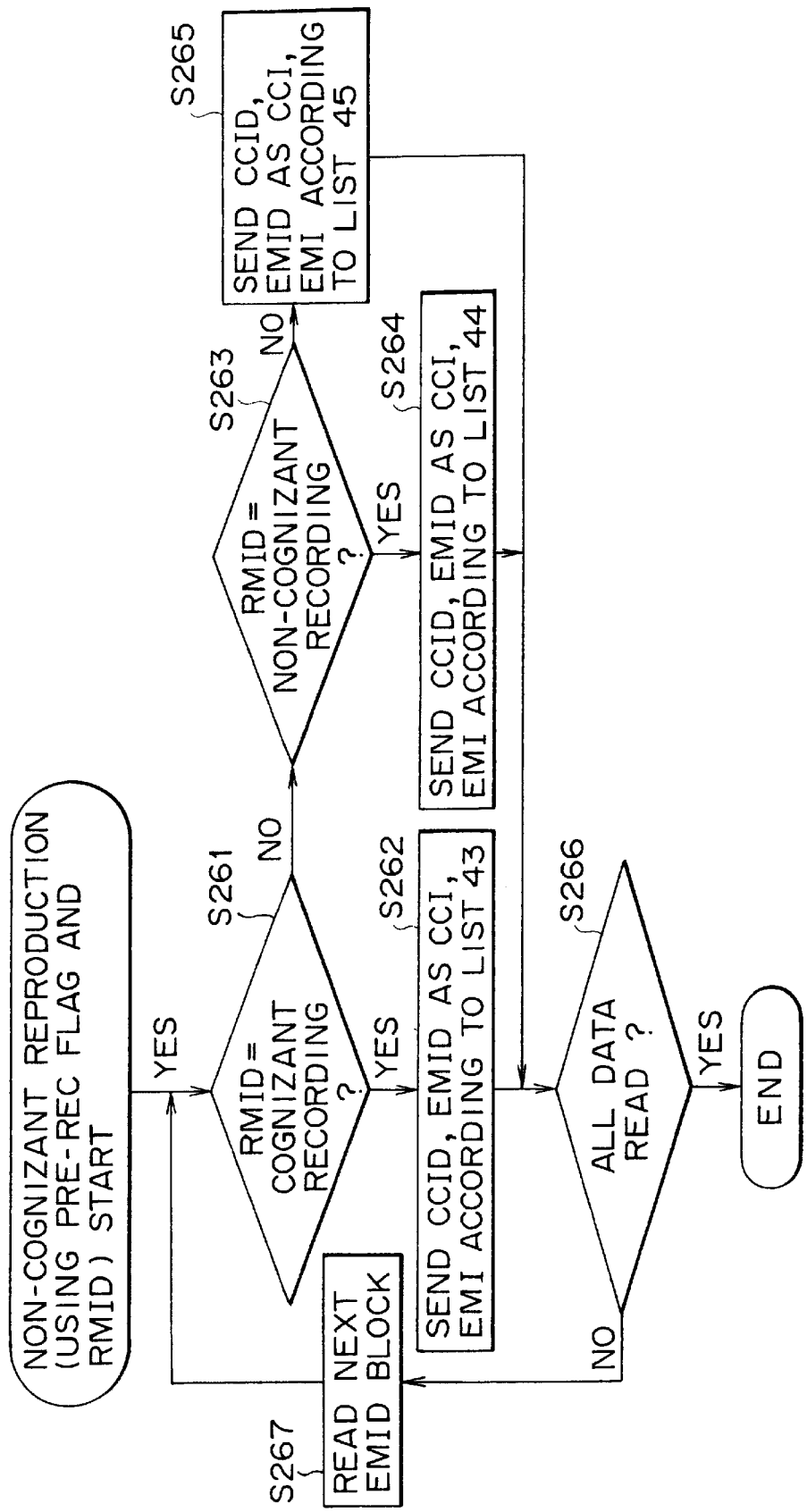
FIG. 43 is a flowchart showing a processing routine of non-cognizant reproduction executed in the fourth embodiment.

FIG. 43 is a flowchart showing a processing routine of non-cognizant reproduction executed in the fourth embodiment. First at step S261, a decision is made as to whether RMID indicates cognizant recording or not. And if the result of this decision signifies that RMID indicates cognizant recording, the operation proceeds to step S262, where CCID and EMID are updated to CCI and EMI respectively according to List 43 and then are sent. List 43 is shown in FIG. 41.

In case the result of the decision at step S261 signifies that RMID does not indicate cognizant recording, the operation proceeds to step S263, where another decision is made as to whether RMID indicates non-cognizant recording or not. And if the result of this decision signifies that RMID indicates non-cognizant recording, the operation proceeds to step S264, where CCID and EMID are updated to CCI and EMI respectively according to List 44 and then are sent.

In case the result of the decision at step S263 signifies that RMID does not indicate non-cognizant recording, the operation proceeds to step S265, where CCID and EMID are updated to CCI and EMI respectively according to List 45 and then are sent.

After the process at step S262, S264 or S265, a decision is made at step S266 as to whether the entire data have been completely read or not. And if the result of this decision signifies that some unread data are still existent, the operation proceeds to step S267 to read the data of the next EMID block. Then the operation returns to step S261, and the subsequent process is executed repeatedly. If the result of the decision at step S266 signifies that the entire data have been completely read, the routine of non-cognizant reproduction is terminated.

Figures 44, 45:
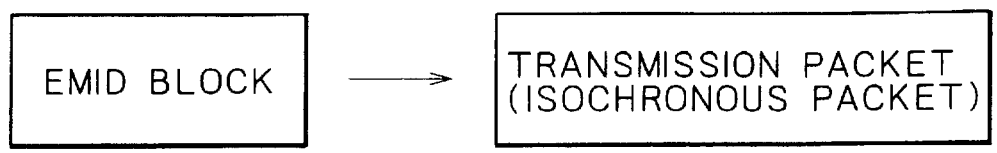
FIG. 44 is a diagram for explaining the process at step 262 in FIG. 43.
FIG. 45 shows a table of copy control information used in a cognizant recording mode.

At step S262, EMID in the header of the EMID block is updated to EMI according to List 43 as shown in FIG. 44, and then is disposed in the header of the transmission packet. Meanwhile, CCID included in the data of the EMID block is set substantially as it is to CCI and then is disposed in the data of the transmission packet. Thereafter a prerec flag=0 is disposed in the header of the transmission packet and then is transmitted as an isochronous packet.

A similar process is executed also at step S264 or S265 with the exception that the prerec flag is set to 1 at step S265.

The cognizant recording conditions mentioned above are summarized as follows. The device identifies CCI and EMI (CGMS-A in the case of analog input) and, if necessary, updates the information to CCID and EMID respectively according to Table of FIG. 45 and then records the same. Further, RMID is so recorded as to indicate cognizant recording.

In the case of analog input, when CGMS-A indicates once, it is updated to proh and then is recorded as CCID and EMID.

Meanwhile the non-cognizant recording conditions are summarized as follows. The device identifies EMI and, if necessary, updates the information to EMID according to Table of FIG. 45 and then records the same. RMID is so recorded as to indicate non-cognizant recording. Any analog input data cannot be recorded. When EMI is once in the data transmitted from the cognizant device, it is updated to proh and then is recorded as EMID.

The cognizant reproduction conditions are summarized as follows. The device identifies CCID, EMID and RMID and, if necessary, updates CCID and EMID respectively to CCI and EMI (or CGMS-A in the case of analog output), and then outputs the same. In the updating process with RMID indicative of non-cognizant recording, CCID=proh and EMID=proh are outputted when CCID=once and EMID=proh.

The non-cognizant reproduction conditions are summarized as follows. The device identifies EMID and outputs the same as EMI. The reproduced data cannot be outputted in the form of analog data.

The prerecorded disc conditions are summarized as follows. CCID on the disc exactly represents the copy control information relative to the data, whereby the prerecorded disc can be handled similarly to a cognizant recorded disc. The EMID value is determined and recorded in accordance with the severest one of the entire CCID values included in the relevant EMID block. RMID is recorded in a cognizant recording mode.

Hereinafter a fifth embodiment will be described with reference to FIGS. 46–53 wherein RMID is used and, in the case of a prerecorded disc, RMID=prerecorded disc is recorded, and only an operation of cognizant reproduction is performed in a reproduction mode. Due to such operation, the aforementioned first and second problems can be solved without the necessity of additionally attaching a prerec flag to the transmission data as in the foregoing fourth embodiment.

First, an explanation will be given with regard to the recording on a prerecorded disc. This recording on the disc is performed not by a general user but by a person licensed by a copyrighter. Therefore, CCID and EMID values are determined by the person licensed by the copyrighter. However, with regard to the RMID value, it is recorded as RMID=prerecorded disc in an area different from the disc locations where the data and the EMID are stored.

Figure 46:
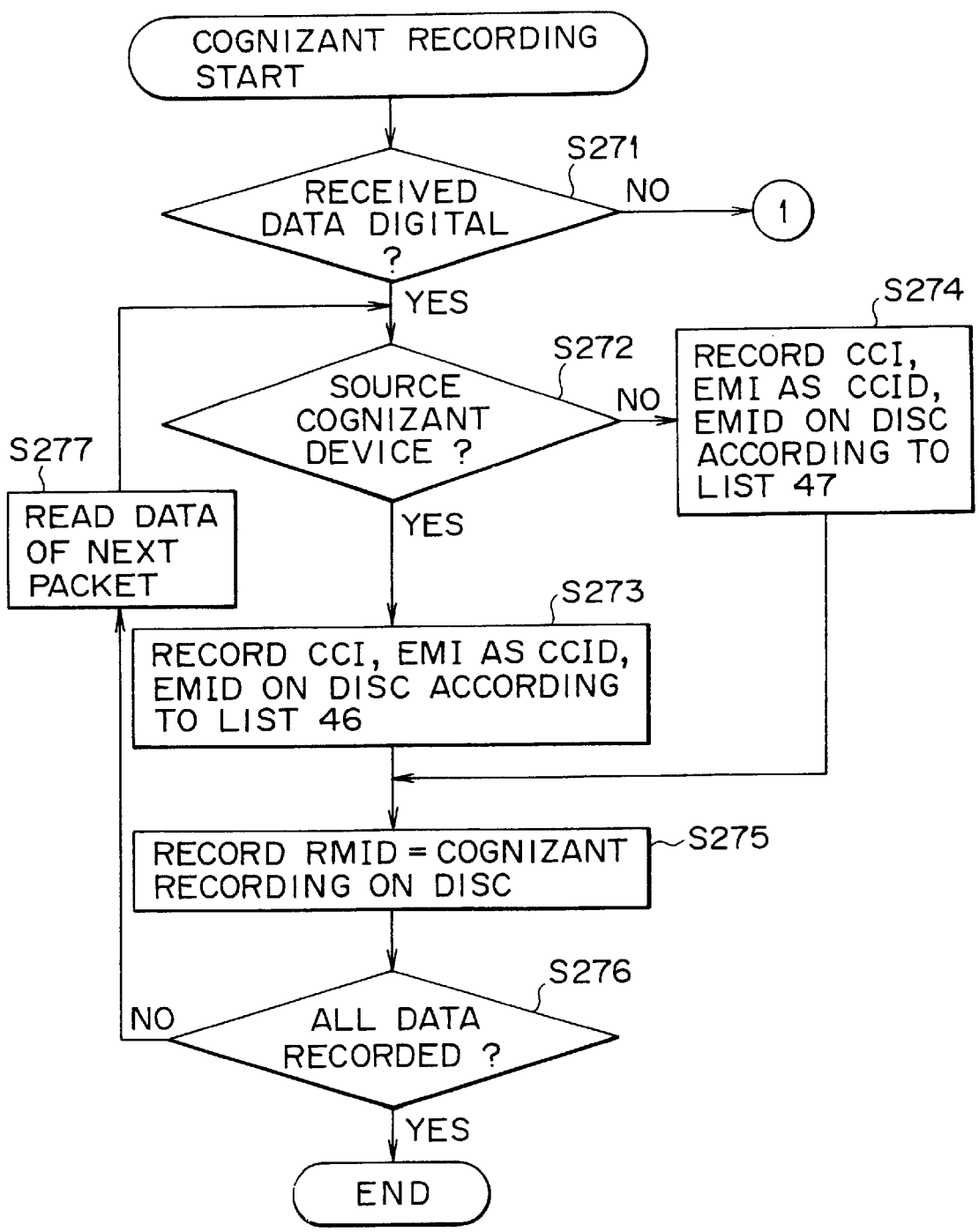
FIG. 46 is a flowchart showing a processing routine of cognizant recording executed in a fifth embodiment of the optical disc recorder/reproducer in FIG. 2.
Figure 47:
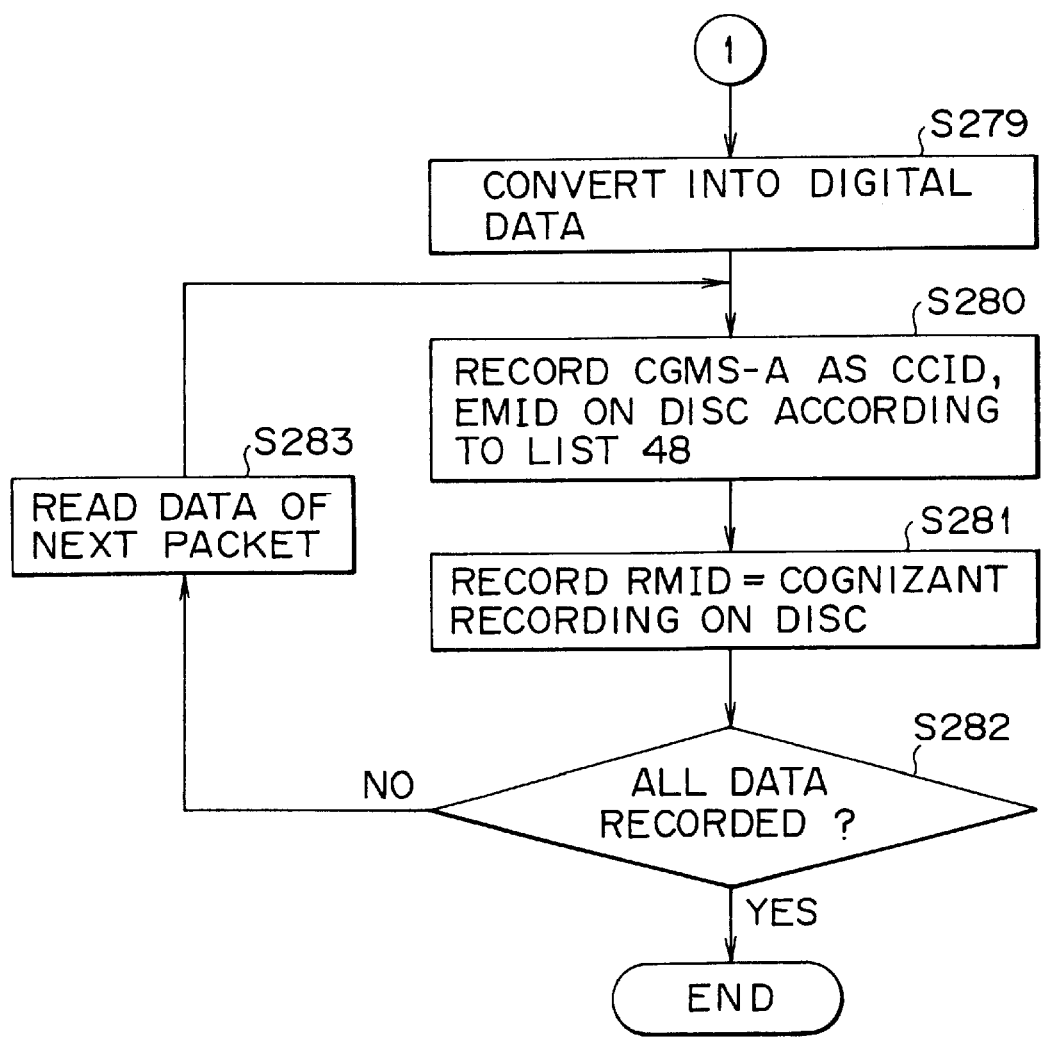
FIG. 47 shows the flowchart continued from FIG. 46.

FIGS. 46 and 47 are flowcharts showing a processing routine of cognizant recording in the fifth embodiment. First at step S271, a decision is made as to whether the received data to be recorded is digital one or not. And in the case of digital data, another decision is made at step S272 as to whether the source of the transmitted data is a cognizant device or not.

If the result of the decision at step S272 signifies that the source is a cognizant device, the operation proceeds to step S273, where one EMID block is formed per isochronous packet, and CCI included in the data of the relevant packet is updated to CCID according to List 46 and then is recorded in the data of the EMID block. Similarly, EMI stored in the header of the isochronous packet is updated to EMID according to List 46 and then is recorded in the header of the EMID block.

Meanwhile, in case the result of the decision at step S272 signifies that the source is not a cognizant device (i.e., a non-cognizant device), the operation proceeds to step S274, where one EMID block is formed per isochronous packet, and CCI included in the data of the relevant packet is updated to CCID according to List 47 and then is recorded in the data of the EMID block. Similarly, EMI stored in the header of the isochronous packet is updated to EMID according to List 47 and then is recorded in the header of the EMID block. Lists 46 and 47 are shown in Table 9 of FIG. 48.

After the processes at steps S273 and S274, the operation proceeds to step S275, where RMID=cognizant recording is recorded on the disc. And a decision is made at step S276 as to whether the entire data have been completely recorded or not. If the result of this decision signifies that some data are still left unrecorded, the operation proceeds to step S278 to read the data of the next packet. Thereafter the operation returns to step S272, and then the subsequent process is executed repeatedly.

In case the result of the decision at step S276 signifies that the entire data have been completely recorded, the routine of cognizant recording is terminated.

Meanwhile, if the result of the decision at step S271 signifies that the received data is not digital one (i.e., analog data), the operation proceeds to step S279 to execute a process of converting the received data into digital one.

At step S280, the CGMS-A control range is set to an EMID block, and CGMS-A included in the data is updated to CCID according to List 48 and then is recorded in the data of the EMID block. Since none of EMI is existent in the case of analog data, CCID is recorded directly as EMID in the header of the EMID block. List 48 is shown in Table 9 of FIG. 48.

After the process at step S280, the operation proceeds to step S281, where RMID=cognizant recording is recorded on the disc. And a decision is made at step S282 as to whether the entire data have been completely recorded or not. If the result of this decision signifies that some data are still left unrecorded, the operation proceeds to step S283 to read the data of the next packet. Thereafter the operation returns to step S280, and the subsequent process is executed repeatedly.

In case the result of the decision at step S282 signifies that the entire data have been completely recorded, the routine of cognizant recording is terminated.

Figure 49:
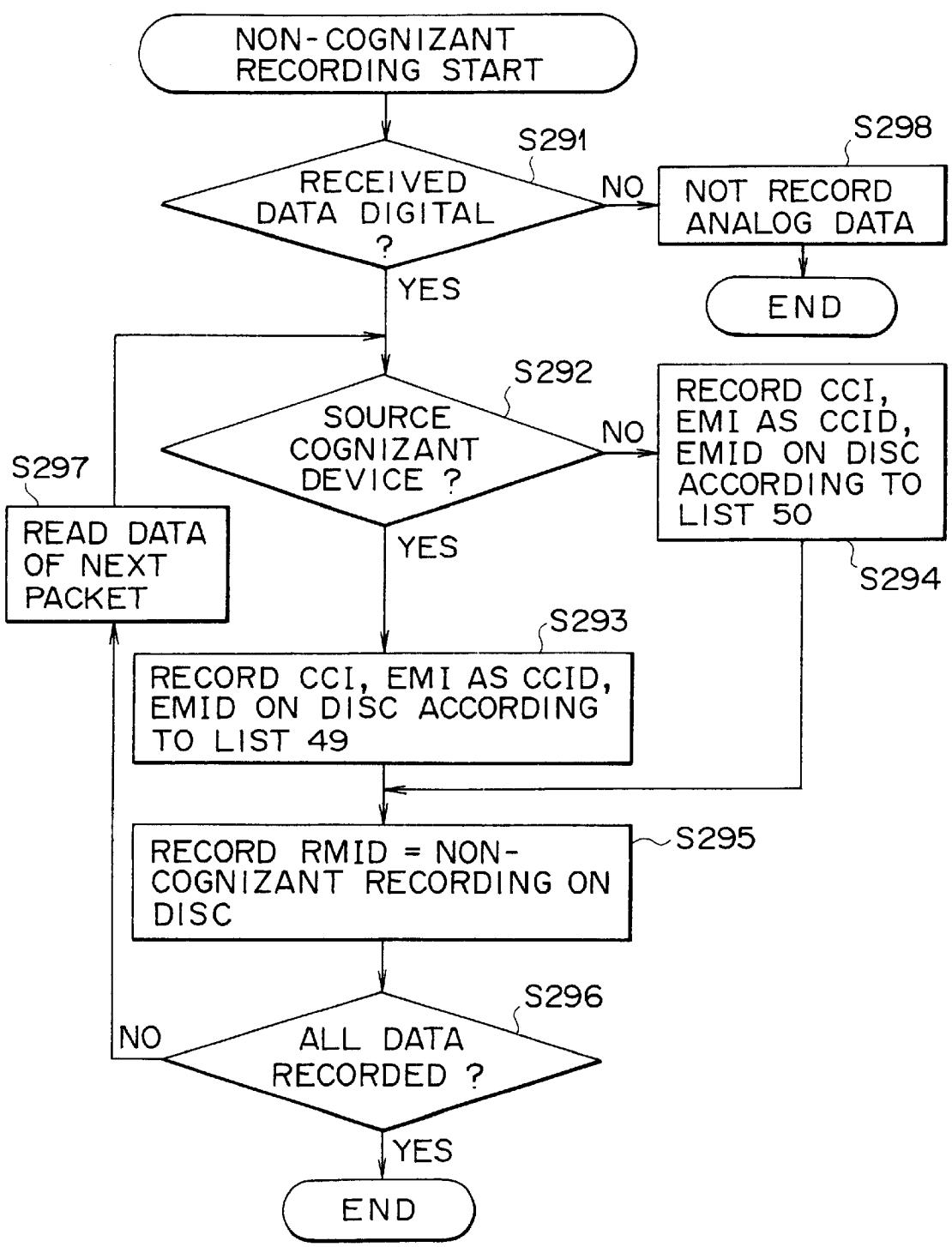
FIG. 49 is a flowchart showing a processing routine of non-cognizant recording executed in the fifth embodiment.

FIG. 49 is a flowchart showing a processing routine of non-cognizant recording executed in the fifth embodiment. First at step S291, a decision is made as to whether the received data to be recorded is digital one or not. In the case of digital data, another decision is made at step S292 as to whether the source of the transmitted data is a cognizant device or not.

In case the result of the decision at step S292 signifies that the source is a cognizant device, the operation proceeds to step S293, where one EMID block is formed per isochronous packet, and EMI in the packet header is updated to EMID according to List 49 and then is recorded in the header of the EMID block. CCI in the data of the isochronous packet is updated to CCID according to List 49. In this case, however, CCID is substantially the same in content as CCI, as shown on List 49. Therefore, CCI may be used directly as CCID without being updated.

In case the result of the decision at step S292 signifies that the source is not a cognizant device (i.e., a non-cognizant device), the operation proceeds to step S294. At this step, one EMID block is formed per isochronous packet, and EMI in the packet header is updated to EMID according to List 50 and then is recorded in the header of the EMID block. CCI in the data of the isochronous packet is updated to CCID according to List 50. In this case, however, CCID is substantially the same in content as CCI, as shown on List 50. Therefore, CCI may be used directly as CCID without being updated.

After the processes at steps S293 and S294, the operation proceeds to step S295, where RMID=non-cognizant recording is recorded on the disc. And a decision is made at step S296 as to whether the entire data have been completely recorded or not. If the result of this decision signifies that some data are still left unrecorded, the operation proceeds to step S297 to read the data of the next packet. Thereafter the operation returns to step S292, and the subsequent process is executed repeatedly.

In case the result of the decision at step S296 signifies that the entire data have been completely recorded, the routine of non-cognizant recording is terminated.

Meanwhile, if the result of the decision at step S291 signifies that the received data is not digital one (i.e., analog data), the operation proceeds to step S298. The analog data is not recorded at step S298, and the routine of non-cognizant recording is terminated.

Figure 50:
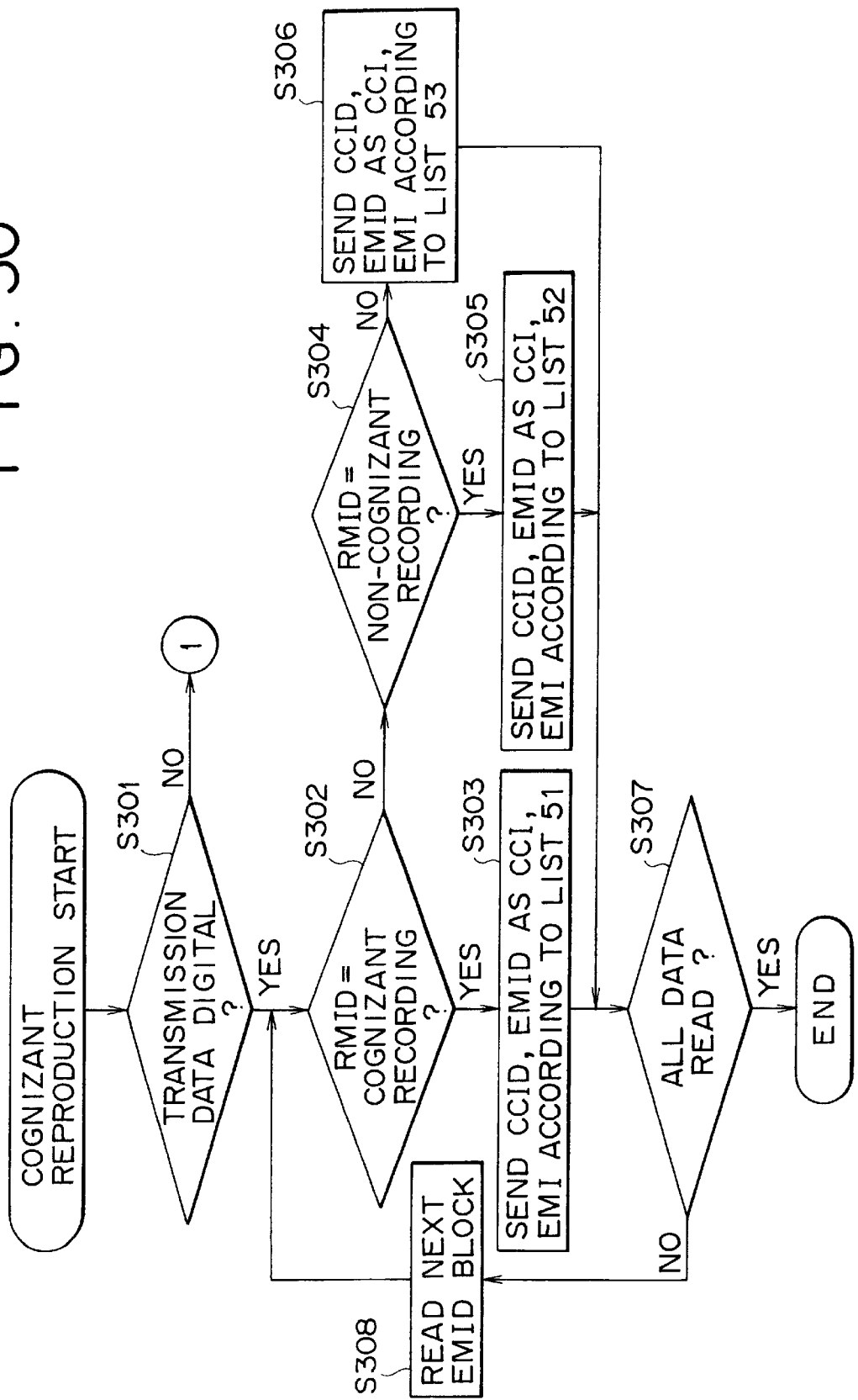
FIG. 50 is a flowchart showing a processing routine of cognizant reproduction executed in the fifth embodiment.

FIGS. 50 and 51 are flowcharts showing a processing routine of cognizant reproduction executed in the fifth embodiment. First at step S301, a decision is made as to whether the transmission data is digital one or not. And in the case of digital data, another decision is made at step S302 as to whether RMID in the EMID block indicates cognizant recording or not.

In case the result of the decision at step S302 signifies that RMID indicates cognizant recording, the operation proceeds to step S303. At this step, one EMID block is formed into a transmission packet, and CCID included in the data of the EMID block is updated to CCI according to List 51 and then is disposed in the data of the transmission packet. Further, EMID disposed in the header of the EMID block is updated to EMI according to List 51 and then is disposed in the header of the transmission packet. And this packet is transmitted as an isochronous packet.

Meanwhile, if the result of the decision at step S302 signifies that RMID does not indicate cognizant recording, the operation proceeds to step S304. And another decision is made at step S304 as to whether RMID in the EMID block indicates non-cognizant recording or not. And in case the result of the decision at step S304 signifies that RMID indicates non-cognizant recording, the operation proceeds to step S305. At this step, one EMID block is formed into a transmission packet, and CCID included in the data of the EMID block is updated to CCI according to List 52 and then is disposed in the data of the transmission packet. Further, EMID disposed in the header of the EMID block is updated to EMI according to List 52 and then is disposed in the header of the transmission packet. And this packet is transmitted as an isochronous packet.

Meanwhile, if the result of the decision at step S304 signifies that RMID does not indicate non-cognizant recording, the operation proceeds to step S306. At this step, one EMID block is formed into a transmission packet, and CCID included in the data of the EMID block is updated to CCI according to List 53 and then is disposed in the data of the transmission packet. Further, EMID disposed in the header of the EMID block is updated to EMI according to List 53 and then is disposed in the header of the transmission packet. And this packet is transmitted as an isochronous packet.

After the process at step S303, S305 or S306, the operation proceeds to step 307, where a decision is made as to whether the entire data have been completely reproduced or not. And if the result of this decision signifies that some data are still left unreproduced, the operation proceeds to step S308 to read the data of the next EMID block. Thereafter the operation returns to step S302, and the subsequent process is executed repeatedly.

In case the result of the decision at step S307 signifies that the entire data have been completely reproduced, the routine of cognizant reproduction is terminated.

Meanwhile, if the result of the decision at step S301 signifies that the transmission data is not digital one (i.e., analog data), the operation proceeds to step S309, where another decision is made as to whether RMID in the EMID block indicates cognizant recording or not.

In case the result of the decision at step S309 signifies that RMID indicates cognizant recording, the operation proceeds to step S310. At this step, CCID included in the data of the EMID block is updated to CCI according to List 54 and is set as CGMS-A in the transmission data.

Meanwhile, if the result of the decision at step S309 signifies that RMID indicates cognizant recording, the operation proceeds to step S311. At this step, another decision is made as to whether RMID in the EMID block indicates non-cognizant recording or not. And in case the result of this decision at step S311 signifies that RMID indicates non-cognizant recording, the operation proceeds to step S312, where CCID included in the data of the EMID block is updated to CCI according to List 55 and is set as CGMS-A in the transmission data.

If the result of the decision at step S311 signifies that RMID does not indicate non-cognizant recording, the operation proceeds to step S313, where CCID included in the data of the EMID block is updated to CCI according to List 56 and is set as CGMS-A in the transmission data.

After the process at step S310, S312 or S313, the operation proceeds to step S314, where the transmission data is converted into analog data. Then the operation proceeds to step S315, where a decision is made as to whether the entire data have been completely reproduced or not. And if the result of this decision signifies that some data are still left unreproduced, the operation proceeds to step S316 to read the data of the next EMID block. Thereafter the operation returns to step S309, and the subsequent process is executed repeatedly.

In case the result of the decision at step S315 signifies that the entire data have been completely reproduced, the routine of cognizant reproduction is terminated.

Figure 53:
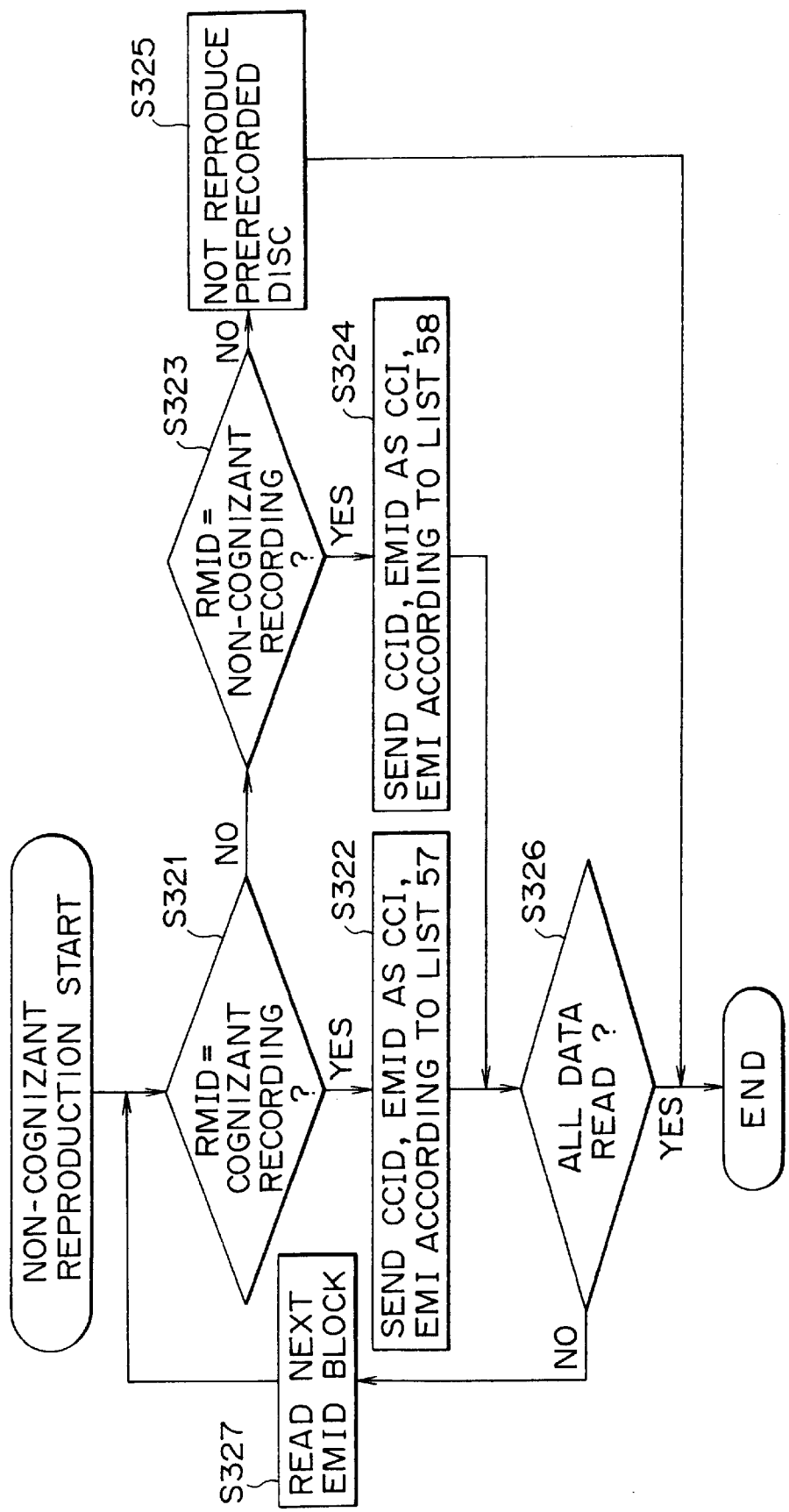
FIG. 53 is a flowchart showing a processing routine of non-cognizant reproduction executed in the fifth embodiment.

FIG. 53 is a flowchart showing a processing routine of non-cognizant reproduction executed in the fifth embodiment. First at step S321, a decision is made as to whether RMID in the EMID block indicates cognizant recording or not.

In case the result of the decision at step S321 signifies that RMID indicates cognizant recording, the operation proceeds to step S322. At this step, one EMID block is formed into a transmission packet, and EMID disposed in the header of the EMID block is updated to EMI according to List 57 and then is disposed in the header of the transmission packet. Further, CCID included in the data of the EMID block is updated to CCI according to List 57. In this case, however, CCI is substantially the same in content as CCID, as shown in List 57. Therefore, CCID may be used directly as CCI without being updated.

Meanwhile, if the result of the decision at step S321 signifies that RMID does not indicate cognizant recording, the operation proceeds to step S323. At this step, another decision is made as to whether RMID in the EMID block indicates non-cognizant recording or not. And in case the result of the decision at step S323 signifies that RMID indicates non-cognizant recording, the operation proceeds to step S324. At this step, one EMID block is formed into a transmission packet, and EMID disposed in the header of the EMID block is updated to EMI according to List 58 and then is disposed in the header of the transmission packet. Further, CCID included in the data of the EMID block is updated to CCI according to List 58. In this case, however, CCI is substantially the same in content as CCID, as shown in List 58. Therefore, CCID may be used directly as CCI without being updated.

In case the result of the decision at step S323 signifies that RMID does not indicate non-cognizant recording, the operation proceeds to step S325 to prohibit reproduction of the prerecorded disc, and the routine of non-cognizant reproduction is terminated.

After the process at step S322 or S324, the operation proceeds to step S326, where a decision is made as to whether the entire data have been completely reproduced or not. And if the result of this decision signifies that some data are still left unreproduced, the operation proceeds to step S327 to read the data of the next EMID block. Thereafter the operation returns to step S321, and the subsequent process is executed repeatedly.

In case the result of the decision at step S326 signifies that the entire data have been completely reproduced, the routine of non-cognizant reproduction is terminated.

Referring now to FIGS. 54–61, an explanation will be given on a sixth embodiment where a restriction of CCID=EMID is placed merely with respect to a prerecorded disc. Due to such a restriction, it becomes possible to eliminate the necessity of recording RMID on the disc, hence achieving proper copy control regardless of whether the disc is recorded and reproduced by either a cognizant device or a non-cognizant one.

Figure 54:
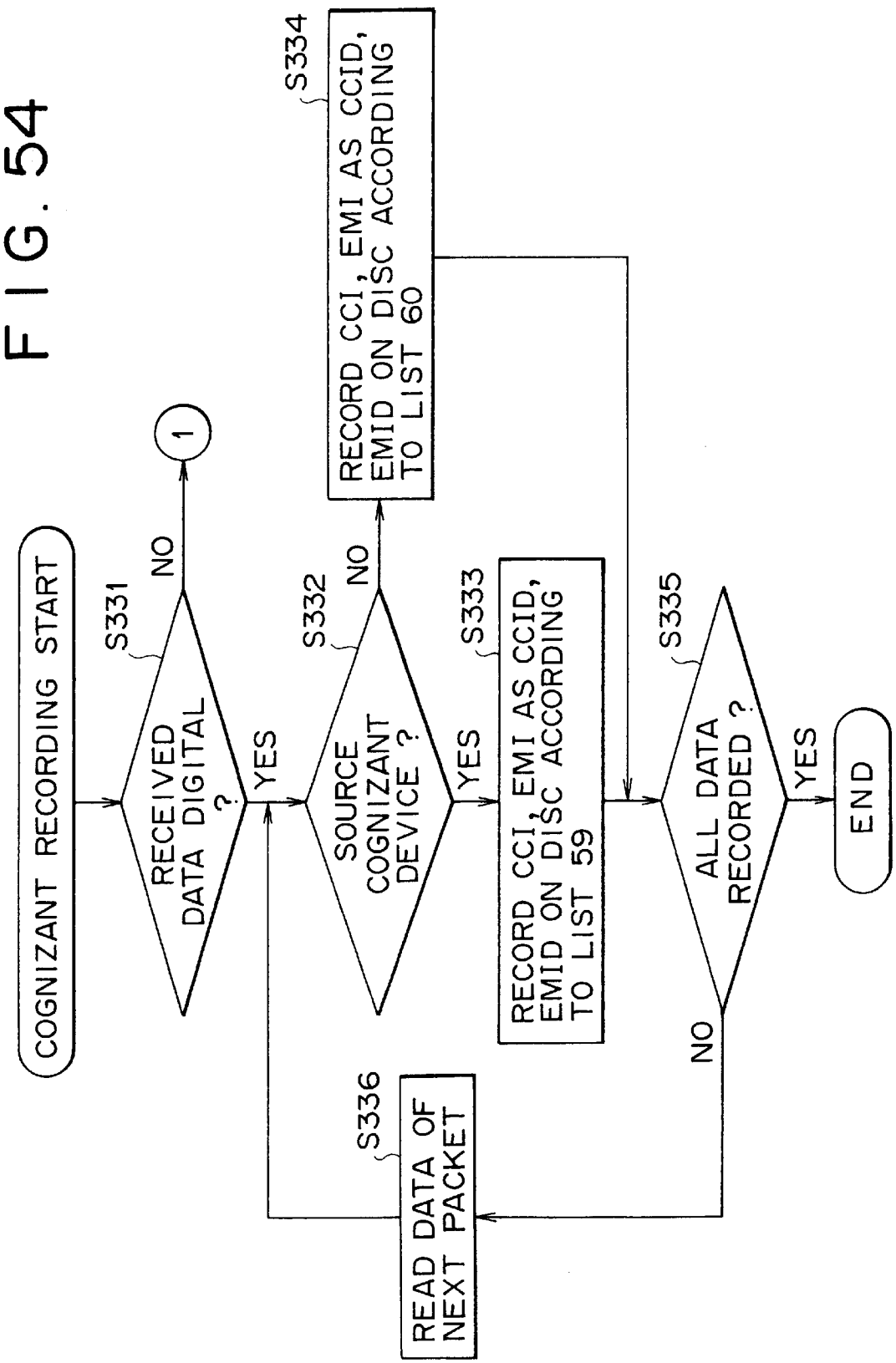
FIG. 54 is a flowchart showing a processing routine of cognizant recording executed in a sixth embodiment of the optical disc recorder/reproducer in FIG. 2.
Figure 55:
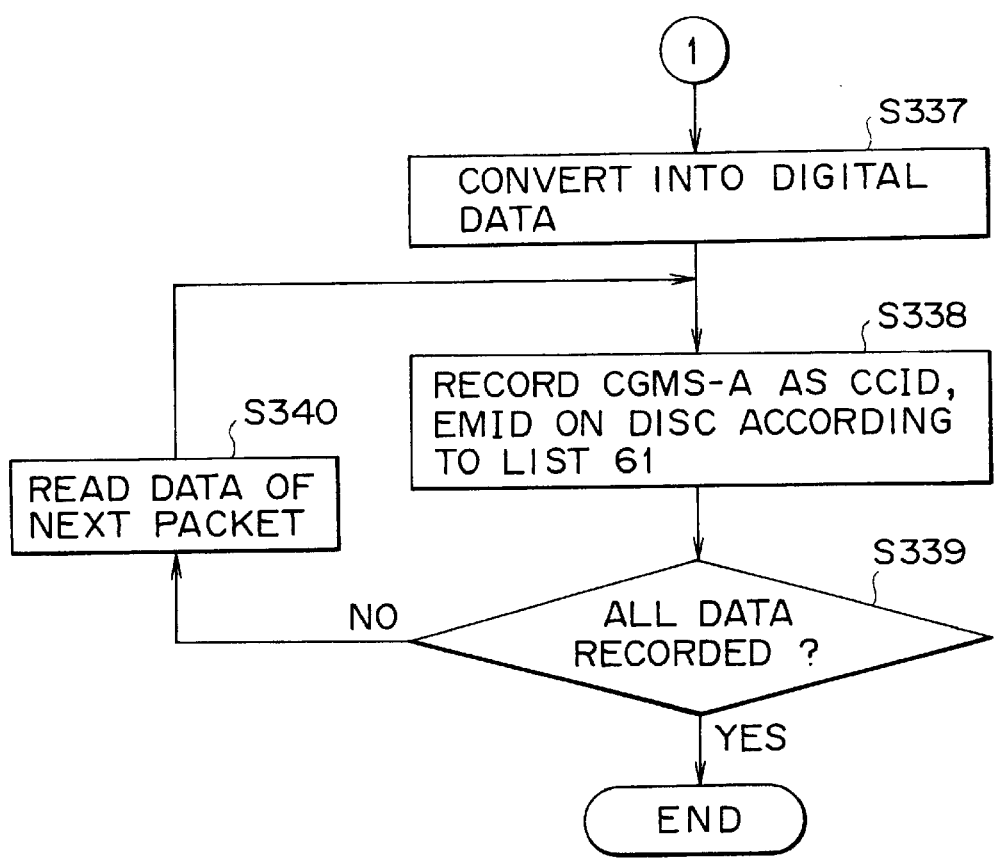
FIG. 55 shows the flowchart continued from FIG. 54.

FIGS. 54 and 55 are flowcharts showing a processing routine of cognizant recording executed in the sixth embodiment. First at step S331, a decision is made as to whether the received data to be recorded is digital one or not. And in the case of digital data, another decision is made at step S332 as to whether the source of the transmitted data is a cognizant device or not.

In case the result of the decision at step S332 signifies that the source is a cognizant device, the operation proceeds to step S333. At this step, one EMID block is formed per isochronous packet, and CCI included in the data of the relevant packet is updated to CCID according to List 59 and then is recorded in the data of the EMID block. Similarly, EMI stored in the header of the isochronous packet is updated to EMID according to List 59 and then is recorded in the header of the EMID block.

Meanwhile, if the result of the decision at step S332 signifies that the source is not a cognizant device (i.e., a non-cognizant device), the operation proceeds to step S334. At this step, one EMID block is formed per isochronous packet, and CCI included in the data of the relevant packet is updated to CCID according to List 60 and then is recorded in the data of the EMID block. Similarly, EMI stored in the header of the isochronous packet is updated to EMID according to List 60 and then is recorded in the header of the EMID block. Lists 59 and 60 are shown in Table 11 of FIG. 56.

After the process at step S333 or S334, the operation proceeds to step S335, where a decision is made as to whether the entire data have been completely recorded or not. And if the result of this decision signifies that some data are still left unrecorded, the operation proceeds to step S336 to read the data of the next packet. Thereafter the operation returns to step S332, and the subsequent process is executed repeatedly.

In case the result of the decision at step S335 signifies that the entire data have been completely recorded, the routine of cognizant recording is terminated.

Meanwhile, if the result of the decision at step S331 signifies that the received data is not digital one (i.e., analog data), the operation proceeds to step S337 to execute a process of converting the received data into digital one.

At step S338, the CGMS-A control range is set to an EMID block, and CGMS-A included in the data is updated to CCID according to List 61 and then is recorded in the data of the EMID block. Since none of EMI is existent in the case of analog data, CCID is recorded directly as EMID in the header of the EMID block. List 61 is shown in Table 11 of FIG. 56.

After the process at step S338, the operation proceeds to step S339, where a decision is made as to whether the entire data have been completely recorded or not. If the result of this decision signifies that some data are still left unrecorded, the operation proceeds to step S340 to read the data of the next packet. Thereafter the operation returns to step S338, and the subsequent process is executed repeatedly.

In case the result of the decision at step S339 signifies that the entire data have been completely recorded, the routine of cognizant recording is terminated.

Figure 57:
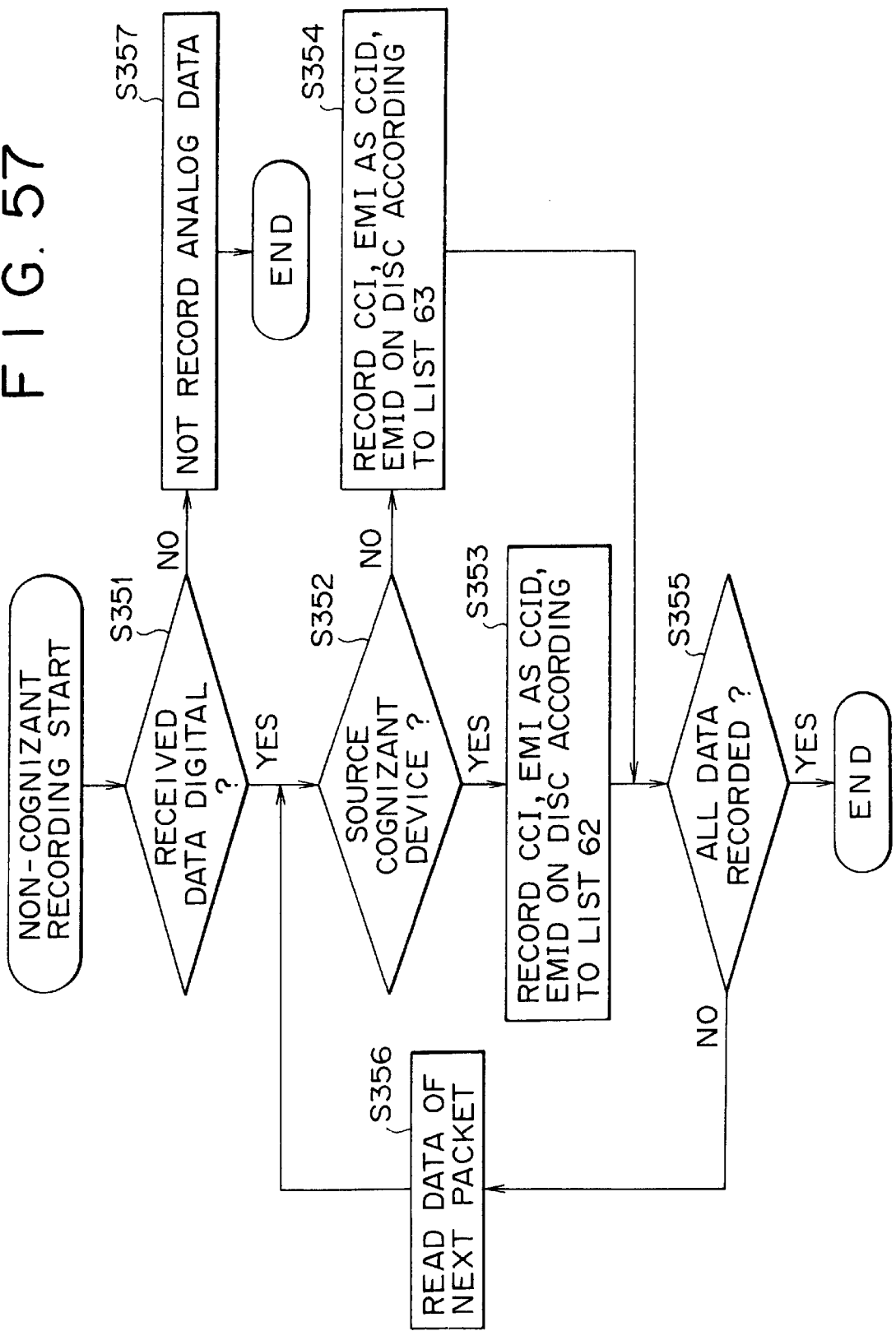
FIG. 57 is a flowchart showing a processing routine of non-cognizant recording executed in the sixth embodiment.

FIG. 57 is a flowchart showing a processing routine of non-cognizant recording executed in the sixth embodiment. First at step S351, a decision is made as to whether the received data to be recorded is digital one or not. In the case of digital data, another decision is made at step S352 as to whether the source of the transmitted data is a cognizant device or not.

In case the result of the decision at step S352 signifies that the source is a cognizant device, the operation proceeds to step S353. At this step, one EMID block is formed per isochronous packet, and EMI in the packet header is updated to EMID according to List 62 and then is recorded in the header of the EMID block. CCI in the data of the isochronous packet is updated to CCID according to List 62. In this case, however, CCID is substantially the same in content as CCI, as shown on List 62. Therefore, CCI may be used directly as CCID without being updated.

In case the result of the decision at step S352 signifies that the source is not a cognizant device (i.e., a non-cognizant device), the operation proceeds to step S354. At this step, one EMID block is formed per isochronous packet, and EMI in the packet header is updated to EMID according to List 63 and then is recorded in the header of the EMID block. CCI in the data of the isochronous packet is updated to CCID according to List 63. In this case, however, CCID is substantially the same in content as CCI, as shown on List 63. Therefore, CCI may be used directly as CCID without being updated.

After the processes at steps S353 and S354, the operation proceeds to step S355, where a decision is made as to whether the entire data have been completely recorded or not. If the result of this decision signifies that some data are still left unrecorded, the operation proceeds to step S356 to read the data of the next packet. Thereafter the operation returns to step S352, and the subsequent process is executed repeatedly.

In case the result of the decision at step S355 signifies that the entire data have been completely recorded, the routine of non-cognizant recording is terminated.

Meanwhile, if the result of the decision at step S351 signifies that the received data is not digital one (i.e., analog data), the operation proceeds to step S357. The analog data is not recorded at step S357, and the routine of non-cognizant recording is terminated.

Figure 58:
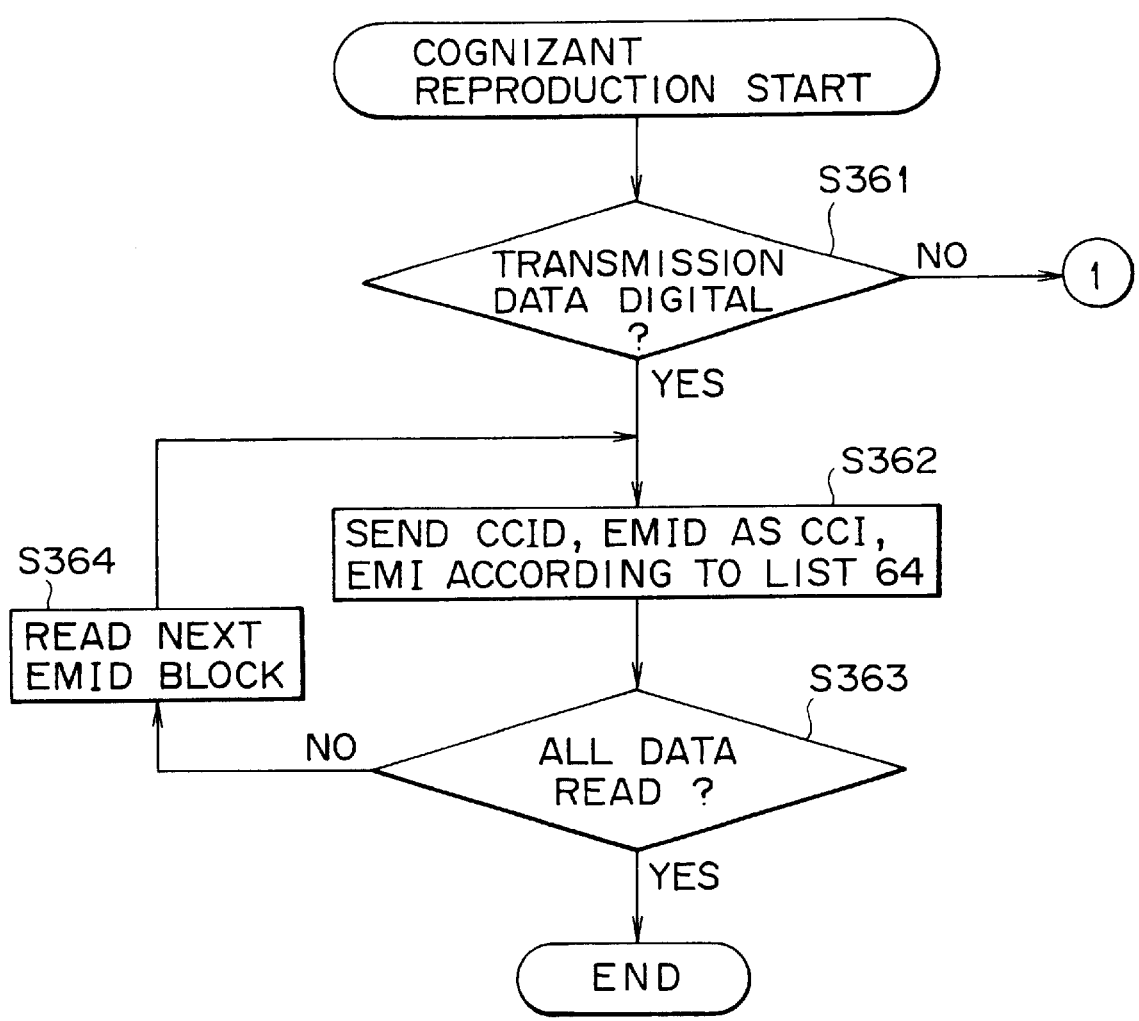
FIG. 58 is a flowchart showing a processing routine of cognizant reproduction executed in the sixth embodiment.

FIGS. 58 and 59 are flowcharts showing a processing routine of cognizant reproduction executed in the sixth embodiment. First at step S361, a decision is made as to whether the transmission data is digital one or not. And in the case of digital data, the operation proceeds to step S362, where one EMID block is formed into a transmission packet, and CCID included in the data of the EMID block is updated to CCI according to List 64 and then is disposed in the data of the transmission packet. Further, EMID disposed in the header of the EMID block is updated to EMI according to List 64 and then is disposed in the header of the transmission packet. And this packet is transmitted as an isochronous packet.

After the process at S362, the operation proceeds to step S363, where a decision is made as to whether the entire data have been completely reproduced or not. And if the result of this decision signifies that some data are still left unreproduced, the operation proceeds to step S364 to read the data of the next EMID block. Thereafter the operation returns to step S362, and the subsequent process is executed repeatedly.

In case the result of the decision at step S363 signifies that the entire data have been completely reproduced, the routine of cognizant reproduction is terminated.

Meanwhile, if the result of the decision at step S361 signifies that the transmission data is not digital one (i.e., analog data), the operation proceeds to step S365. At this step, CCID included in the data of the EMID block is updated to CCI according to List 65 and is set as CGMS-A in the transmission data.

After the process at step S365, the operation proceeds to step S366, where the transmission data is converted into analog data. Then the operation proceeds to step S367, where a decision is made as to whether the entire data have been completely reproduced or not. And if the result of this decision signifies that some data are still left unreproduced, the operation proceeds to step S368 to read the data of the next EMID block. Thereafter the operation returns to step S365, and the subsequent process is executed repeatedly.

In case the result of the decision at step S367 signifies that the entire data have been completely reproduced, the routine of cognizant reproduction is terminated.

FIG. 61 is a flowchart showing a processing routine of non-cognizant reproduction executed in the sixth embodiment. First at step S381, one EMID block is formed into a transmission packet, and EMID disposed in the header of the EMID block is updated to EMI according to List 66 and then is disposed in the header of the transmission packet. Further, CCID included in the data of the EMID block is updated to CCI according to List 66. In this case, however, CCI is substantially the same in content as CCID, as shown in List 66. Therefore, CCID may be used directly as CCI without being updated.

After the process at step S381, the operation proceeds to step S382, where a decision is made as to whether the entire data have been completely reproduced or not. And if the result of this decision signifies that some data are still left unreproduced, the operation proceeds to step S383 to read the data of the next EMID block. Thereafter the operation returns to step S381, and the subsequent process is executed repeatedly.

In case the result of the decision at step S382 signifies that the entire data have been completely reproduced, the routine of non-cognizant reproduction is terminated.

Referring next to FIGS. 62–71, an explanation will be given on a seventh embodiment where modes of EMI and EMID are increased to four kinds. In any of the first to sixth embodiments described above, the modes of EMI and EMID are three kinds of "copy free", "copy once", and "copy prohibit". In the seventh embodiment, however, these modes are changed to four kinds of "copy free", "copy once", "no-more copied", and "copy never". "No-more copied" indicates data obtained by recording once the data of "copy once", and signifies prohibition of subsequent copy. In this case, EMI of "copy once" is replaced with that of "no-more copied" in a recording operation. "Copy never" indicates data prohibited essentially from being copied.

In the seventh embodiment, copy control information is prescribed in conformity with the system adopted in the second embodiment to record RMID on the disc. Due to such prescription, proper copy control is achievable regardless of whether the disc is recorded and reproduced by either a cognizant device or a non-cognizant device. Moreover, it becomes possible to handle both a user-recorded disc and a prerecorded disc without a distinction. In this case, a prerecorded disc is regarded as a cognizant recorded disc.

When the information is recorded as CCID/EMID=once/ proh in the second embodiment, it is impossible to make a distinction between once non-cognizant recorded data ("copy prohibit" data) obtained from the data originally including the information of CCI/EMI=once/once, and prerecorded data ("copy once" data) including the information of such combination from the beginning on a prerecorded disc. Therefore, both of the data including the information of CCID/EMID=once/proh are handled as "copy prohibit" data. However, in the seventh embodiment where the modes of EMI and EMID are increased to four kinds, the combination of such information is recorded as CCID/EMID= once/no-more when data including CCI/EMI=once/once is copied once in non-cognizant recording, while the combination of the information is recorded as CCID/EMID=once/ never on any prerecorded disc. Consequently, these data can be distinguished from each other to thereby realize more exact copy generation management.

Figure 62:
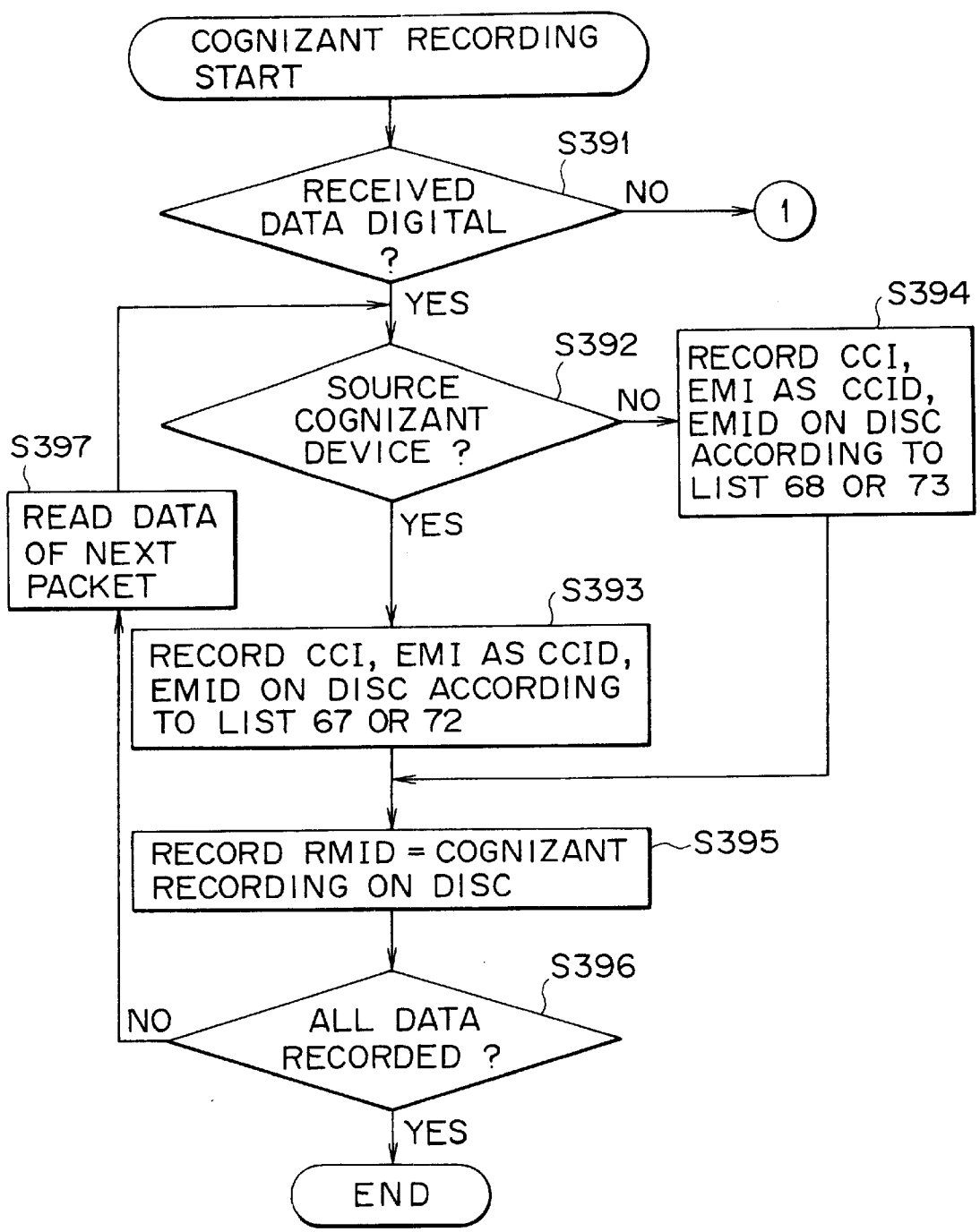
FIG. 62 is a flowchart showing a processing routine of cognizant recording executed in a seventh embodiment of the optical disc recorder/reproducer in FIG. 2.
Figure 63:
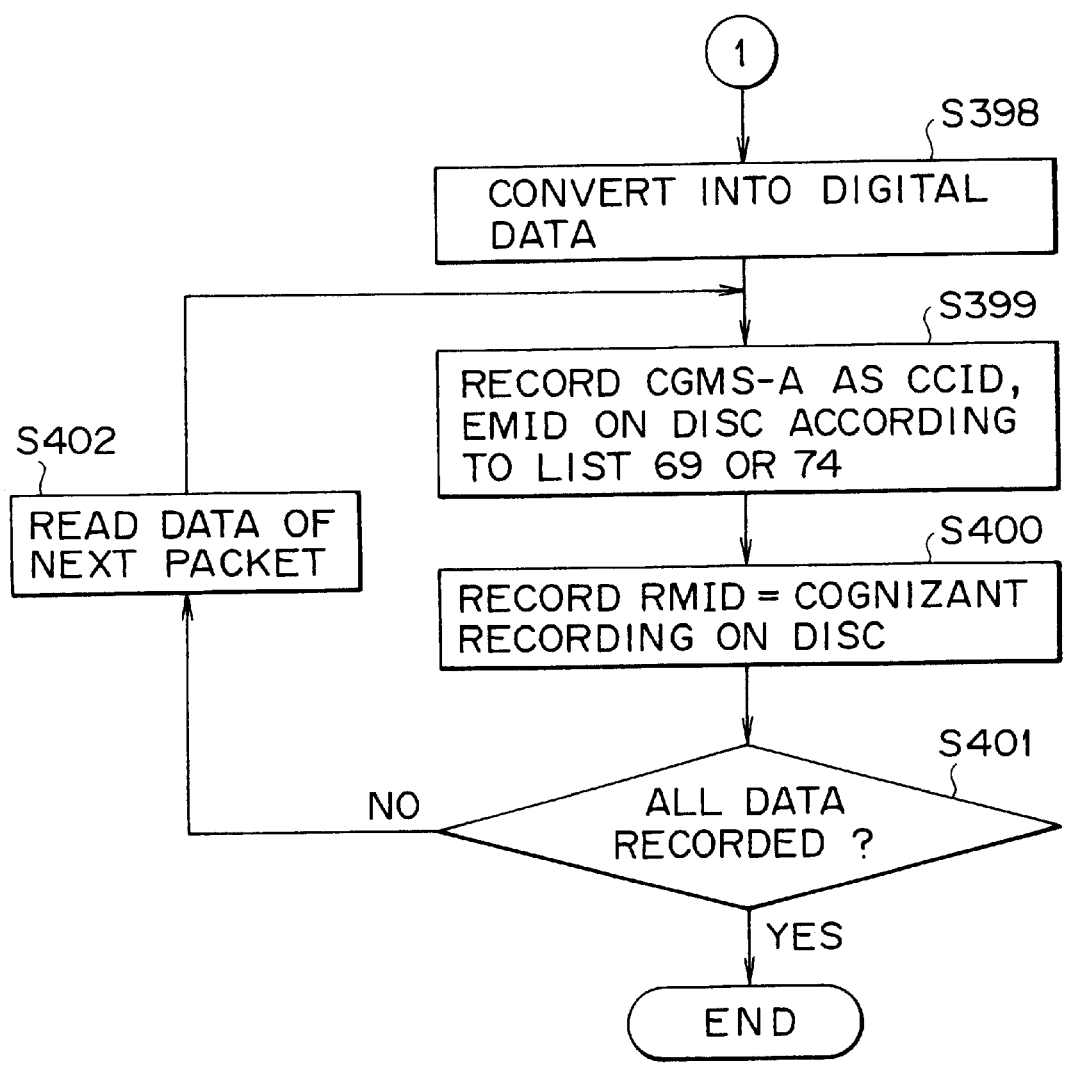
FIG. 63 shows the flowchart continued from FIG. 62.

FIGS. 62 and 63 are flowcharts showing a processing routine of cognizant recording executed in the seventh embodiment. First at step S391, a decision is made as to whether the received data to be recorded is digital one or not. And in the case of digital data, the operation proceeds to step S392, where another decision is made as to whether the source of the transmitted data is a cognizant device or not.

In case the result of the decision at step S392 signifies that the source is a cognizant device, the operation proceeds to step S393. At this step, one EMID block is formed per isochronous packet, and CCI included in the data of the relevant packet is updated to CCID according to List 67 or 72 and then is recorded in the data of the EMID block. Similarly, EMI stored in the header of the isochronous packet is updated to EMID according to List 67 or 72 and then is recorded in the header of the EMID block.

Meanwhile, if the result of the decision at step S392 signifies that the source is not a cognizant device (i.e., a non-cognizant device), the operation proceeds to step S394. At this step, one EMID block is formed per isochronous packet, and CCI included in the data of the relevant packet is updated to CCID according to List 68 or 73 and then is recorded in the data of the EMID block. Similarly, EMI stored in the header of the isochronous packet is updated to EMID according to List 68 or 73 and then is recorded in the header of the EMID block. Lists 67 and 68 are shown in Table 13-1 of FIG. 64. And Lists 72 and 73 are shown in Table 13-2 of FIG. 65. Table 13-1 represents an example where CCI and CCID are set to three kinds of "copy free", "copy once", and "copy prohibit"; while Table 13-2 represents another example where CCI and CCID are set to four kinds of "copy free", "copy once", "no-more copy", and "never copy".

After the processes at steps S393 and S394, the operation proceeds to step S395, where information of RMID= cognizant recording is recorded on the disc. At step S396, a decision is made as to whether the entire data have been completely recorded or not. If the result of this decision signifies that some data are still left unrecorded, the operation proceeds to step S397 to read the data of the next packet. Thereafter the operation returns to step S392, and the subsequent process is executed repeatedly.

In case the result of the decision at step S396 signifies that the entire data have been completely recorded, the routine of cognizant recording is terminated.

Meanwhile, if the result of the decision at step S391 signifies that the received data is not digital one (i.e., analog data), the operation proceeds to step S398 to execute a process of converting the received data into digital one.

At step S399, the CGMS-A control range is set to an EMID block, and CGMS-A included in the data is updated to CCID according to List 69 or 74 and then is recorded in the data of the EMID block. Since none of EMI is existent in the case of analog data, CCID is recorded directly as EMID in the header of the EMID block. List 69 is shown in Table 13-1 of FIG. 64. And List 74 is shown in Table 13-2 of FIG. 65.

After the process at step S399, the operation proceeds to step S400, where information of RMID=cognizant recording is recorded on the disc. At step S401, a decision is made as to whether the entire data have been completely recorded or not. If the result of this decision signifies that some data are still left unrecorded, the operation proceeds to step S402 to read the data of the next packet. Thereafter the operation returns to step S399, and the subsequent process is executed repeatedly.

In case the result of the decision at step S401 signifies that the entire data have been completely recorded, the routine of cognizant recording is terminated.

Figure 66:
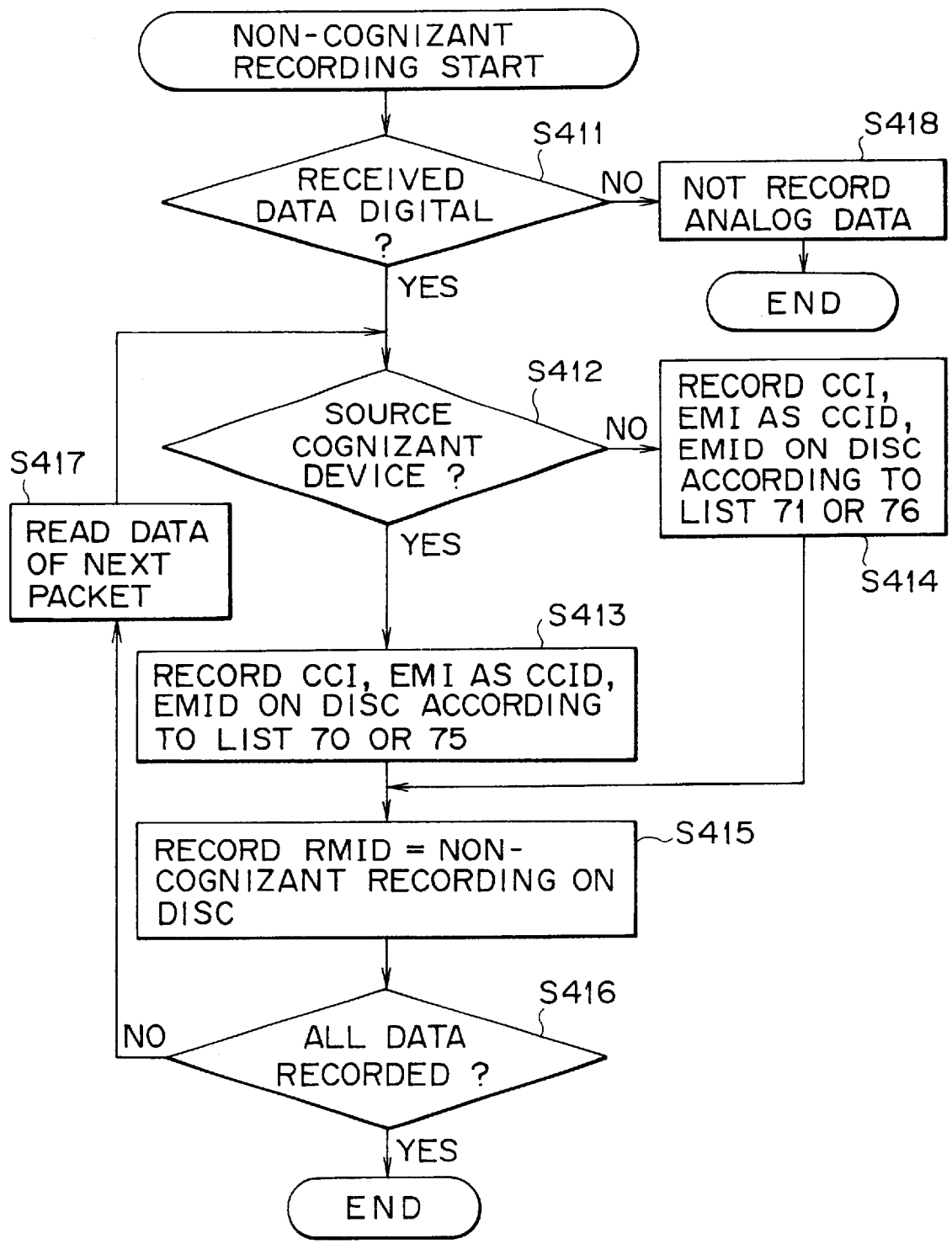
FIG. 66 is a flowchart showing a processing routine of non-cognizant recording executed in the seventh embodiment.

FIG. 66 is a flowchart showing a processing routine of non-cognizant recording executed in the seventh embodiment. First at step S411, a decision is made as to whether the received data to be recorded is digital one or not. In the case of digital data, another decision is made at step S412 as to whether the source of the transmitted data is a cognizant device or not.

In case the result of the decision at step S412 signifies that the source is a cognizant device, the operation proceeds to step S413. At this step, one EMID block is formed per isochronous packet, and EMI in the packet header is updated to EMID according to List 70 or 75 and then is recorded in the header of the EMID block. CCI in the data of the isochronous packet is updated to CCID according to List 70 or 75. In this case, however, CCID is substantially the same in content as CCI, as shown on Lists 70 and 75. Therefore, CCI may be used directly as CCID without being updated.

In case the result of the decision at step S412 signifies that the source is not a cognizant device (i.e., a non-cognizant device), the operation proceeds to step S144. At this step, one EMID block is formed per isochronous packet, and EMI in the packet header is updated to EMID according to List 71 or 76 and then is recorded in the header of the EMID block. CCI in the data of the isochronous packet is updated to CCID according to List 71 or 76. In this case, however, CCID is substantially the same in content as CCI, as shown on Lists 71 and 76. Therefore, CCI may be used directly as CCID without being updated.

After the processes at steps S413 and S414, the operation proceeds to step S415, where information of RMID=non- cognizant recording is recorded on the disc. At this step, a decision is made as to whether the entire data have been completely recorded or not. If the result of this decision signifies that some data are still left unrecorded, the operation proceeds to step S417 to read the data of the next packet. Thereafter the operation returns to step S412, and the subsequent process is executed repeatedly.

In case the result of the decision at step S416 signifies that the entire data have been completely recorded, the routine of non-cognizant recording is terminated.

Meanwhile, if the result of the decision at step S411 signifies that the received data is not digital one (i.e., analog data), the operation proceeds to step S418. The analog data is not recorded at step S418, and the routine of non-cognizant recording is terminated.

Figure 67:
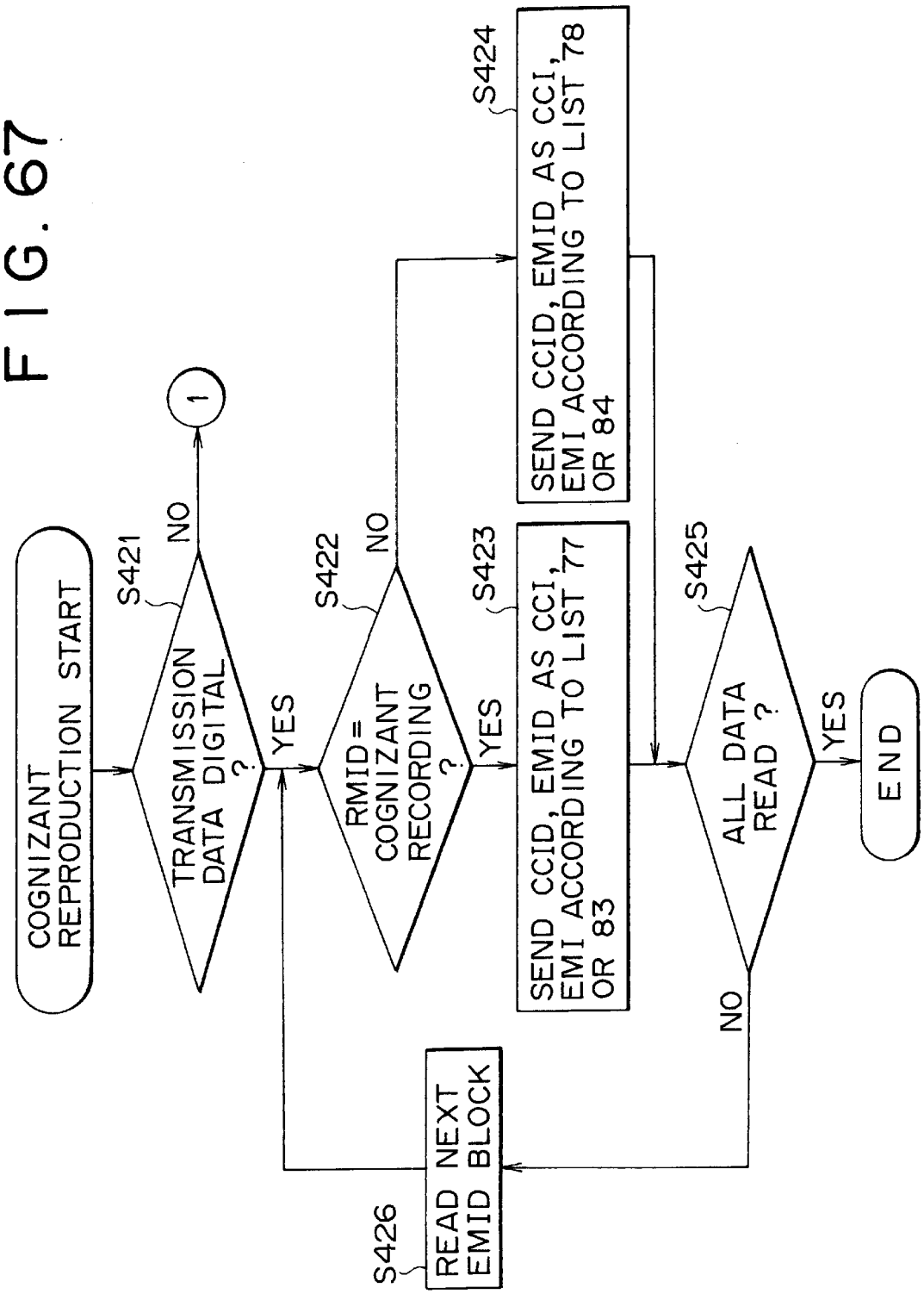
FIG. 67 is a flowchart showing a processing routine of cognizant reproduction executed in the seventh embodiment.
Figure 68:
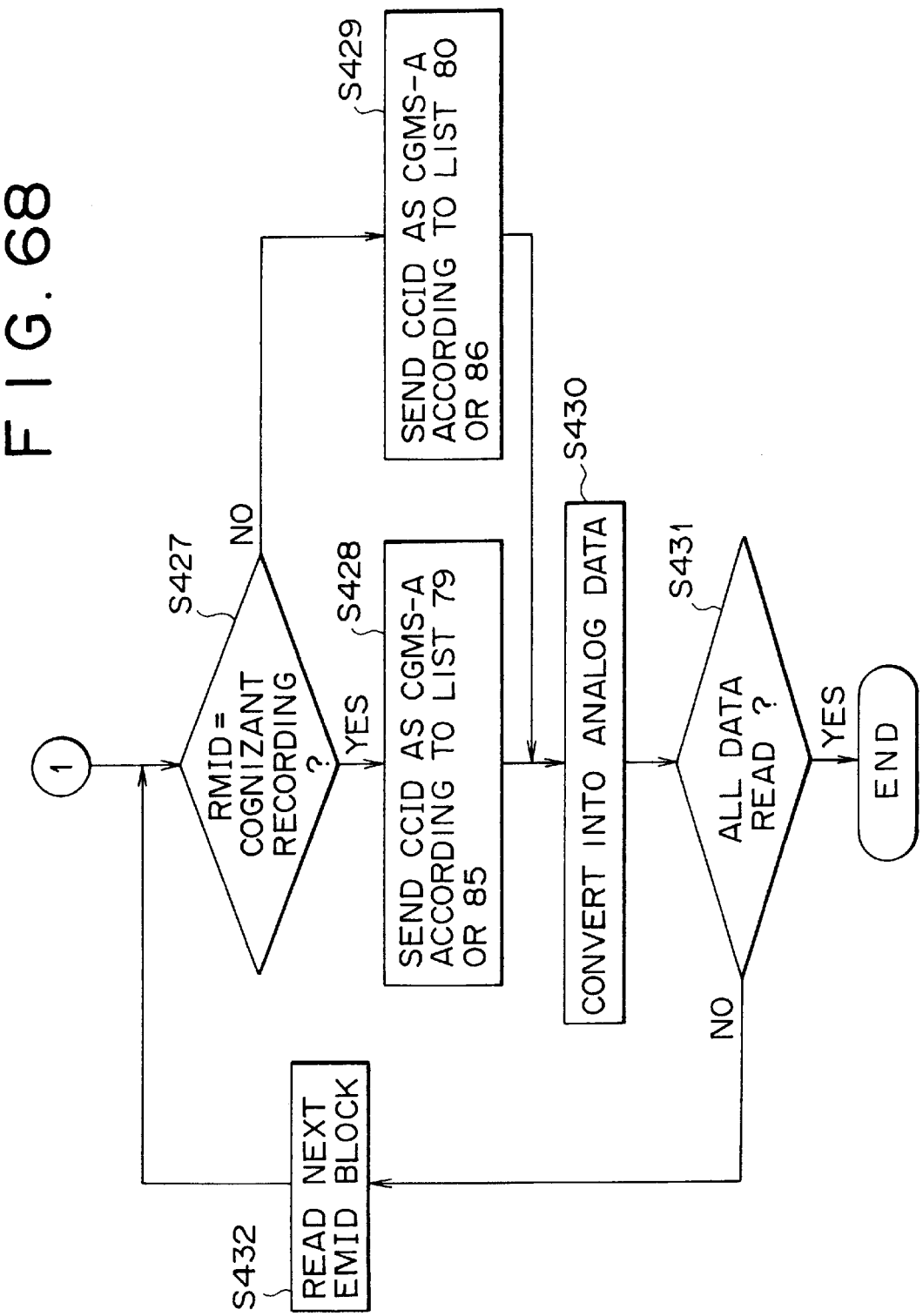
FIG. 68 shows the flowchart continued from FIG. 67.

FIGS. 67 and 68 are flowcharts showing a processing routine of cognizant reproduction executed in the seventh embodiment. First at step S421, a decision is made as to whether the transmission data is digital one or not. And in the case of digital data, the operation proceeds to step S422, where a decision is made as to whether RMID in the EMID block indicates cognizant recording or not.

In case the result of the decision at step S422 signifies that RMID indicates cognizant recording, the operation proceeds to step S423. At this step, one EMID block is formed into a transmission packet, and CCID included in the data of the EMID block is updated to CCI according to List 77 or 83 and then is disposed in the data of the transmission packet. Further, EMID disposed in the header of the EMID block is updated to EMI according to List 77 or 83 and then is disposed in the header of the transmission packet. Thereafter, this packet is transmitted as an isochronous packet.

In case the result of the decision at step S422 signifies that RMID does not indicate cognizant recording, the operation proceeds to step S424. At this step, one EMID block is formed into a transmission packet, and CCID included in the data of the EMID block is updated to CCI according to List 78 or 84 and then is disposed in the data of the transmission packet. Further, EMID disposed in the header of the EMID block is updated to EMI according to List 78 or 84 and then is disposed in the header of the transmission packet. Thereafter, this packet is transmitted as an isochronous packet.

Lists 77 and 82 are shown in Table 14-1, which represents an example where CCI and CCID are set to three kinds of "copy free", "copy once", and "copy prohibit". Lists 83 and 88 are shown in Table 14-2, which represents another example where CCI and CCID are set to four kinds of "copy free", "copy once", "no-more copy", and "never copy".

After the process at S423 or S424, the operation proceeds to step S425, where a decision is made as to whether the entire data have been completely reproduced or not. And if the result of this decision signifies that some data are still left unreproduced, the operation proceeds to step S426 to read the data of the next EMID block. Thereafter the operation returns to step S422, and the subsequent process is executed repeatedly.

In case the result of the decision at step S425 signifies that the entire data have been completely reproduced, the routine of cognizant reproduction is terminated.

Meanwhile, if the result of the decision at step S421 signifies that the transmission data is not digital one (i.e., analog data), the operation proceeds to step S427. At this step, a decision is made as to whether RMID in the EMID block indicates cognizant recording or not.

In case the result of the decision at step S427 signifies that RMID indicates cognizant recording, the operation proceeds to step S428. At this step, CCID included in the data of the EMID block is updated to CCI according to List 79 or 85 and is set as CGMS-A in the transmission data.

Meanwhile, if the result of the decision at step S427 signifies that RMID does not indicate cognizant recording, the operation proceeds to step S429. At this step, CCID included in the data of the EMID block is updated to CCI according to List 80 or 86 and is set as CGMS-A in the transmission data.

After the process at step S428 or S429, the operation proceeds to step S430, where the transmission data is converted into analog data. Then the operation proceeds to step S431, where a decision is made as to whether the entire data have been completely reproduced or not. And if the result of this decision signifies that some data are still left unreproduced, the operation proceeds to step S432 to read the data of the next EMID block. Thereafter the operation returns to step S427, and the subsequent process is executed repeatedly.

In case the result of the decision at step S431 signifies that the entire data have been completely reproduced, the routine of cognizant reproduction is terminated.

FIG. 71 is a flowchart showing a processing routine of non-cognizant reproduction executed in the seventh embodiment. First at step S441, a decision is made as to whether RMID in the EMID block indicates cognizant recording or not.

In case the result of the decision at step S441 signifies that RMID indicates cognizant recording, the operation proceeds to step S442. At this step, one EMID block is formed into a transmission packet, and EMID disposed in the header of the EMID block is updated to EMI according to List 81 or 87 and then is disposed in the header of the transmission packet. Further, CCID included in the data of the EMID block is updated to CCI according to List 81 or 87. In this case, however, CCI is substantially the same in content as CCID, as shown in Lists 81 and 87. Therefore, CCID may be used directly as CCI without being updated.

Meanwhile, if the result of the decision at step S441 signifies that RMID does not indicate cognizant recording, the operation proceeds to step S443. At this step, one EMID block is formed into a transmission packet, and EMID disposed in the header of the EMID block is updated to EMI according to List 82 or 88 and then is disposed in the header of the transmission packet. Further, CCID included in the data of the EMID block is updated to CCI according to List 82 or 88. In this case, however, CCI is substantially the same in content as CCID, as shown in Lists 82 and 88. Therefore, CCID may be used directly as CCI without being updated.

After the process at step S442 or S443, the operation proceeds to step S444, where a decision is made as to whether the entire data have been completely reproduced or not. And if the result of this decision signifies that some data are still left unreproduced, the operation proceeds to step S445 to read the data of the next EMID block. Thereafter the operation returns to step S441, and the subsequent process is executed repeatedly.

In case the result of the decision at step S444 signifies that the entire data have been completely reproduced, the routine of non-cognizant reproduction is terminated.

Although the present invention has been explained hereinabove with respect to an exemplary case of transferring data between apparatus which are connected mutually via a 1394 serial bus, it is a matter of course that the invention is applicable to some other communication system as well.

Regarding the provision medium which is employed for providing the computer program to the user to execute the above-described processes, any communication medium such as network or satellite may be utilized as well as a recording medium such as magnetic disc, CO-ROM or solid-state memory.

As described above, according to the information recording apparatus, the information recording method and the provision medium, a decision is made as to whether the transmitter is a first device or a second device, and the copy control information is updated in response to the result of such decision, so that enhanced management of the copy control information can be achieved more exactly.

Further according to the information reproducing apparatus, the information reproducing method and the provision medium, a decision is made as to whether the received data have been recorded in either a first recording mode or a second recording mode, and the copy control information is updated in response to the result of such decision, so that enhanced management of the copy control information can be achieved more exactly.

Thus, although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. An information recording apparatus for recording, in a recording medium, record information transmitted from a transmitter, comprising:

a receiving means for receiving the record information transmitted inclusively of copy control information from said transmitter;

a decision making means for making a decision as to whether said transmitter is a first device capable of cognizing the copy control information as being of a predetermined format, or a second device incapable of cognizing the copy control information;

a storage means for storing first update information to update the copy control information when said transmitter is the first device, or storing second update information to update the copy control information when said transmitter is the second device; and a recording means for updating, in response to the result of the decision obtained from said decision means, the copy control information included in the record information received by said receiving means, on the basis of the first or second update information stored in said storage means, and then recording, in said recording medium, the information inclusive of the updated copy control information.

2. The information recording apparatus according to claim 1, wherein said recording means further records, in the recording medium, a mode flag representing that the record information is recorded in a first recording mode or a second recording mode.

3. The information recording apparatus according to claim 1, further comprising a recording-medium decision means for making a decision as to whether the record information received by said receiving means is the information reproduced from a recording medium formed in a prerecorded state containing the record information.

4. The information recording apparatus according to claim 2, wherein said recording medium contains a prerecorded flag representing that said record information is recorded in a third recording mode.

5. The information recording apparatus according to claim 1, wherein said first update information and second update information are under predetermined restrictions in a recording medium formed in a state where the record information has been prerecorded.

6. The information recording apparatus according to claim 1, wherein said copy control information is classified into four kinds.

7. An information recording method carried out in an information recording apparatus to record, in a recording medium, record information transmitted from a transmitter, said method comprising the steps of:

receiving the record information transmitted from said transmitter inclusively of copy control information;

making a decision as to whether said transmitter is a first device capable of cognizing the copy control information as being of a predetermined format, or a second device incapable of cognizing the copy control information;

generating first update information to update the copy control information when said transmitter is the first device, or generating second update information to update the copy control information when said transmitter is the second device;

updating, in response to the result of the decision obtained at said decision step, the copy control information included in the record information received at said reception step, on the basis of the first update information for said first device or the second update information for said second device; and recording, in said recording medium, the information inclusive of the updated copy control information.

8. A provision medium for providing a program readable by a computer for enabling an information recording apparatus to execute processes that record, in a recording medium, record information transmitted from a transmitter, which comprise the steps of:

receiving the record information transmitted from said transmitter inclusively of copy control information;

making a decision as to whether said transmitter is a first device capable of cognizing the copy control information as being of a predetermined format, or a second device incapable of cognizing the copy control information;

generating first update information to update the copy control information when said transmitter is the first device, or generating second update information to update the copy control information when said transmitter is the second device;

updating, in response to the result of the decision obtained at said decision step, the copy control information included in the record information received at said reception step, on the basis of the first update information for said first device or the second update information for said second device; and recording, in said recording medium, the information inclusive of the updated copy control information.

9. An information reproducing apparatus for reproducing information recorded in a recording medium and outputting the reproduced information, comprising:

a reproducing means for reproducing the information from said recording medium;

a decision means for making a decision as to whether the information inclusive of copy control information reproduced by said reproducing means was recorded in a first recording mode by a first device capable of cognizing the copy control information as being of a predetermined format, or in a second recording mode by a second device incapable of cognizing the copy control information;

a storage means for storing at least either first update information to update the copy control information if the reproduced information is in said first recording mode, or second update information to update the copy control information if the reproduced information is in said second recording mode; and an output means for updating, in response to the result of the decision obtained from said decision means, the copy control information included in the information reproduced by said reproducing means, on the basis of the first or second update information stored in said storage means, and then outputting the reproduced information inclusive of the updated copy control information.

10. The information reproducing apparatus according to claim 9, further comprising a control means for controlling, in response to the result of the decision obtained from said decision means, reproduction of the recording medium executed by said reproducing means.

11. The information reproducing apparatus according to claim 9, wherein said storage means further stores, in addition to both of said first and second update information, third update information in another case different from said first and second recording modes; and said output means updates, in response to the result of the decision obtained from said decision means, the copy control information included in the information reproduced by said reproducing means, on the basis of the first, second or third update information stored in said storage means.

12. The information reproducing apparatus according to claim 9, wherein said output means further outputs a pre-record flag representing that said recording medium is the one formed in a state where said record information has been prerecorded.

13. An information reproducing method carried out in an information reproducing apparatus to reproduce information recorded in a recording medium and output the reproduced information, comprising the steps of:

reproducing the information inclusive of copy control information from said recording medium;

making a decision as to whether the information reproduced at said reproducing step was recorded in a first recording mode by a first device capable of cognizing the copy control information as being of a predetermined format, or in a second recording mode by a second device incapable of cognizing the copy control information;

generating first update information to update the copy control information if the reproduced information is in said first recording mode, or second update information to update the copy control information if the reproduced information is in said second recording mode; and updating, in response to the result of the decision obtained at said decision step, the copy control information included in the information reproduced at said reproducing step, on the basis of the first update information for said first device or the second update information for said second device, and then outputting the reproduced information inclusive of the updated copy control information.

14. A provision medium for providing a program readable by a computer for enabling an information reproducing apparatus to execute processes that reproduce information recorded in a recording medium and output the reproduced information, which comprise the steps of:

reproducing, by said information reproducing apparatus, information inclusive of copy control information from said recording medium;

making a decision as to whether the information reproduced at said reproducing step was recorded in a first recording mode by a first device capable of cognizing the copy control information as being of a predetermined format, or in a second recording mode by a second device incapable of cognizing the copy control information;

generating first update information to update the copy control information if the reproduced information is in said first recording mode, or second update information to update the copy control information if the reproduced information is in said second recording mode; and updating, in response to the result of the decision obtained at said decision step, the copy control information included in the information reproduced at said reproducing step, on the basis of the first update information for said first device or the second update information for said second device, and then outputting the reproduced information inclusive of the updated copy control information.

* * * * *